US006885902B2

(12) United States Patent
Crampton et al.

(10) Patent No.: US 6,885,902 B2
(45) Date of Patent: Apr. 26, 2005

(54) SYSTEM AND METHOD FOR REPLENISHMENT BY PURCHASE WITH ATTRIBUTE BASED PLANNING

(75) Inventors: Myrick Crampton, Germantown, MD (US); Sunil Soman, Falls Church, VA (US)

(73) Assignee: Manugistics, Inc., Rockville, MD (US)

( * ) Notice: Subject to any disclaimer, the term of this patent is extended or adjusted under 35 U.S.C. 154(b) by 164 days.

(21) Appl. No.: 10/287,805

(22) Filed: Nov. 5, 2002

(65) Prior Publication Data

US 2003/0126024 A1 Jul. 3, 2003

Related U.S. Application Data

(60) Provisional application No. 60/342,404, filed on Dec. 27, 2001, and provisional application No. 60/377,243, filed on May 3, 2002.

(51) Int. Cl.[7] ............................................. G06F 19/00
(52) U.S. Cl. ......................... 700/99; 700/32; 709/104; 705/8
(58) Field of Search ...................... 700/96–97, 99–104, 700/32, 106, 108; 709/104, 102; 705/8

(56) References Cited

U.S. PATENT DOCUMENTS

| | | | | |
|---|---|---|---|---|
| 5,231,567 A | * | 7/1993 | Matoba et al. ............. | 700/100 |
| 5,233,533 A | * | 8/1993 | Edstrom et al. ............ | 700/103 |
| 5,369,570 A | * | 11/1994 | Parad ............................ | 705/8 |
| 5,808,891 A | * | 9/1998 | Lee et al. ................... | 700/108 |
| 5,819,232 A | * | 10/1998 | Shipman ........................ | 705/8 |
| 6,064,982 A | * | 5/2000 | Puri ............................ | 705/27 |
| 6,088,626 A | * | 7/2000 | Lilly et al. .................. | 700/100 |
| 6,415,196 B1 | * | 7/2002 | Crampton et al. .......... | 700/100 |

OTHER PUBLICATIONS

International Search Report dated May 21, 2003, for Application No. PCT/US02/41573.

* cited by examiner

*Primary Examiner*—Kidest Bahta
(74) *Attorney, Agent, or Firm*—Hogan & Hartson LLP

(57) ABSTRACT

A system and method for determining whether a supply chain network resource may be replenished by purchase in order to meet demand as defined by an order. The system and method is an attribute-based system and method that may be part of an overall system and method for planning the use of supply chain network resources. The system and method may generate a planning output that may indicate the feasibility of replenishment by purchase. The system and method recognizes time events and takes into account the exact sequence of the events in order to obtain an optimal solution.

50 Claims, 34 Drawing Sheets

1550

1560

1570

1580

SYSTEM AND METHOD FOR REPLENISHMENT BY PURCHASE WITH ATTRIBUTE BASED PLANNING

CROSS REFERENCE TO RELATED APPLICATIONS

This application claims priority from U.S. Provisional Patent Applications Ser. Nos. 60/342,404 and 60/377,243, filed Dec. 27, 2001 and May 3, 2002, the disclosures of which are hereby incorporated by reference in their entirety.

BACKGROUND OF THE INVENTION

1. Field of the Invention

The present invention relates to systems and methods for planning the use of manufacturing resources, more particularly, the invention relates to attribute based planning systems and methods that can operate in highly complex and dynamic environments and generate plans for the use of multiple resources in order to fulfill demand.

2. Discussion of the Related Art

The problem of planning for the use of manufacturing resources in order to meet demand has always been a daunting task for any business having significant manufacturing capacity and/or multiple sourcing. The problem of planning the use of resources becomes even more acute in today's competitive environment because today's business climate forces many businesses to follow certain business philosophies, such as just-in-time concepts, that require highly discipline resource planning.

A business, such as a large manufacturer, is typically made up of a vast network of manufacturing, warehousing, marketing and other production/marketing sites. Further, each of these sites may consist of a number of resources such as assembly lines and storage facilities all interacting and working together to produce finished goods for customers. The complexity of manufacturing networks alone often makes it extremely difficult to plan and schedule the vast numbers of resources that typically make-up a manufacturing or supply chain network.

Several other factors add to the complexity of trying to plan and schedule resources in a manufacturing or supply chain network. For instance, businesses typically receive numerous orders from numerous customers, each order and each customer having different priorities and order requirements. Further, businesses will typically need to be able plan for forecasted future orders and to determine when material must be ordered and capacity reserved for expected customer orders. Automakers, for example, may receive an order from a fleet dealer, a rental car company, a private citizen or any number of both large and smaller volume customers. Each order may consist of several items. For automakers these could be different models of cars with different options. Each of these orders may also include other important information such as the date or range of dates that the customer would like to receive or be able to obtain the order goods, the location where the goods will be available such as a specific dealer site, the customer chosen option packages and possible substitute configurations. Thus, each order will typically have several parameters that define how, what, when and where that the order must be fulfilled.

Many manufacturers today adhere to one or more business philosophies such as just-in-time principles to reduce costs. Unfortunately each of these principles may be an obstacle to another principle that the manufacturer may also want to follow. Further, such philosophies add to the complexity of trying to plan the fulfillment of orders and may make it even more difficult to plan the use of resources in supply chain networks.

In order to plan effectively and accurately, planning systems will preferably be able to take into account the various constraints that may be associated with each network resource. These constraints may be based on a number of factors such as time, quantity, quality, types of goods available, and the like. Any model used to represent a resource network will also preferably be robust so that the dynamic nature of many resource networks may be accounted for. The addition of these fluid constraints in any model used with a planning system adds to the overall complexity of the planning process.

In addition, models used for planning must take into account timing issues. In order to plan network resources, realistic timing requirements must be taken into account. This means that actual time lags, for example, the advance time needed to order a component parts for an assembly line before the parts are actually needed, must be accounted for. In addition, time availability of items, such as finished goods, work in progress and raw materials, needs to be accounted for in any effective planning system.

For various reasons, some of which were described above, the cost of planning the use of resources to meet demand may be prohibitively high. In order to efficiently and effectively meet the planning needs of today's businesses, a planning system and method that is highly robust and that can recognize and accommodate the numerous constraints and the sometimes conflicting goals of businesses is highly desirable.

SUMMARY OF THE INVENTION

Accordingly, the present invention is directed to a system and method for planning the optimal use of resources of businesses to fulfill orders. More particularly, the present invention provides a system and method for generating, and maintaining constraint and attribute sensitive plans for the use of multiple resources at multiple locations to fulfill one or more orders.

Conventional planning systems for order scheduling and resource assignment are typically stock keeping unit ("SKU") driven. An alternative approach may be to use an attribute based approach. Constraints and business rules that govern supply chain planning are often driven by certain fundamental characteristics (attributes) of products, market, and the operational environment. The representation of the model should therefore be done in terms of these attributes.

According to one embodiment of the present invention, a system called an attribute based planning ("ABP") system is provided. The system may include a computing device in communication with a database. Demand, as defined by one or more orders having attributes, may be inputted into the system generating a plan for the optimal utilization of resources within a network. Orders may be either internally or externally generated orders or may even represent projected customer demand. Upon processing the orders, the ABP system may generate plans for the optimal utilization of network resources in order to fulfill demand.

According to another embodiment of the present invention, stock keeping unit attribute definition ("SAD") groups are created and defined. The ABP system, according to the present invention, may utilize SAD groups to provide various system functionalities. For instance, SAD groups may be used to prioritized orders and organize resources into groups as part of configurations and/or bill of materials ("BOMs"), and the like. In order to facilitate the various functionalities various tables may be created. For example, among the tables that may be created include a temporary table for unplanned orders, BOM and Configuration tables, SAD groups, and the like. In addition, a transportation matrix may also be created in order to track and to account for transportation issues.

According to another embodiment of the present invention, the process for planning the utilization of resources in order to meet demand may include initialization process. The initialization process may include several steps that may include a step for creating and/or loading a static model. In order to model the resource network, various items will preferably be defined. These include, available resources, locations, various types of constraints including capacity and auxiliary constraints, time buckets, business rules, user and customer preferences, configurations, transportation matrix and BOMs, and the like. The initialization steps may include the step of initializing buckets. Initialization of the buckets may be accomplished by associating one or more constraints to the buckets. The initialization process may also include the steps of placing initial assignments and allocating materials. The initialization process may also include the step of creating a temporary table or tables of unplanned orders.

According to another embodiment of the present invention, a process for processing orders may be included in the process for planning the utilization of network resources. This second process may include the steps of selecting a slice of orders based on a SAD group, loading a window with the slice of orders and their associated data, prioritizing each order in the window and processing each order in the window according to their priority. The ABP system may plan by processing orders in groups, one group at a time. Each group of orders being processed may be placed into a window. The orders in the window may be prioritized and processed for planning based on their priority. Data associated with each order may also be loaded into the window. Such data may include, for example, SKU based BOMs, configurations, subordinate stock keeping units, finished goods stock keeping units, and the like.

According to another embodiment, the process for processing orders may include the steps of processing each unplanned order in the window, one order at a time. Prior to planning for unplanned orders, the system may issue initial assignments for resources in order to freeze the resources for particular orders. Once initial assignments have been generated, planning for the unplanned orders may commence. The ABP system may review the BOMs, configurations, associated finished goods stock keeping units, subordinate stock keeping units, SAD groups, ant the like, in order to plan for each order. Each configuration (and its associated SAD groups, subordinate SKUs) associated with each order may be reviewed and checked to determine which location/resource/bucket opportunities provides the optimal opportunity.

According to another embodiment of the present invention, a determination of the best scheduling opportunity for each order may be accomplished by the following steps. First, selecting a configuration and prioritizing admissible locations. Then selecting highest priority location/ finished good stock keeping unit. Initializing the finished good stock keeping unit and determining a collection of admissible resources for the highest priority location. A material feasibility may be determined for each resource. In determining material feasibility, the ABP system may first check the resource inventory to determine if inventory can supply the requested quantity of goods. If the resource inventory is unable to fully supply sufficient quantity of goods under specified parameters as defined by, for example, the user or customer, such as by need date, then the system may check other possible methods for meeting the demand through that resource. The other methods for meeting demand include, for example, replenishment by manufacturer, replenishment by purchase and/or replenishment by substitution. Once material feasibility is determined for the resource, the ABP system may make an assessment of constraint feasibility and a check of material capacity compatibility. These steps may be repeated for each acceptable location/resource/bucket opportunity.

Each location/resource/bucket opportunity may then be evaluated based on various goals and customer preferences. The best location/resource/bucket opportunity may then be selected for purposes of planning the utilization of network resources and an output may be generated.

According to another embodiment of the present invention, freeze SAD groups may be created and used to freeze one or more orders. This may be used to ensure that an order is planned even if the order is infeasible.

According to another embodiment of the present invention, the ABP system recognizes a multi-level object function to determine the optimal location/resource/bucket opportunity. The multi-level object function provides criteria for reaching desirable planning results. The ABP system preferably incorporates a multi-level objective function to determine the best placement for an order on the plan. If the ABP system finds multiple opportunities for planning an order, the ABP grades each opportunity and selects the best opportunity based on multiple objectives.

According to another embodiment of the present invention, various tables may be created to provide a number of functionalities. These tables include, for example, a pre-determined assignment table, a BOM table, a SAD groups table, and the like.

According to another embodiment of the present invention, a determination of replenishment of a resource by purchase may be accomplished by determining time items, wherein the time items are specific points in time or time periods relating to the order, determining timing events based on the time items, creating a timeline comprising of the timing events and time items, selecting an applicable scenario based on the timeline from a group of predetermined scenarios and generating an output based on the applicable scenario.

According to another embodiment of the present invention, scheduling controls may be used to derive optimal resource utilization plans. Scheduling controls are schemes used to affect the manner in which buckets are searched to find feasible opportunities to place an order. There are several types of scheduling controls available including, forward, backward, just-in-time, frozen and do not schedule.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
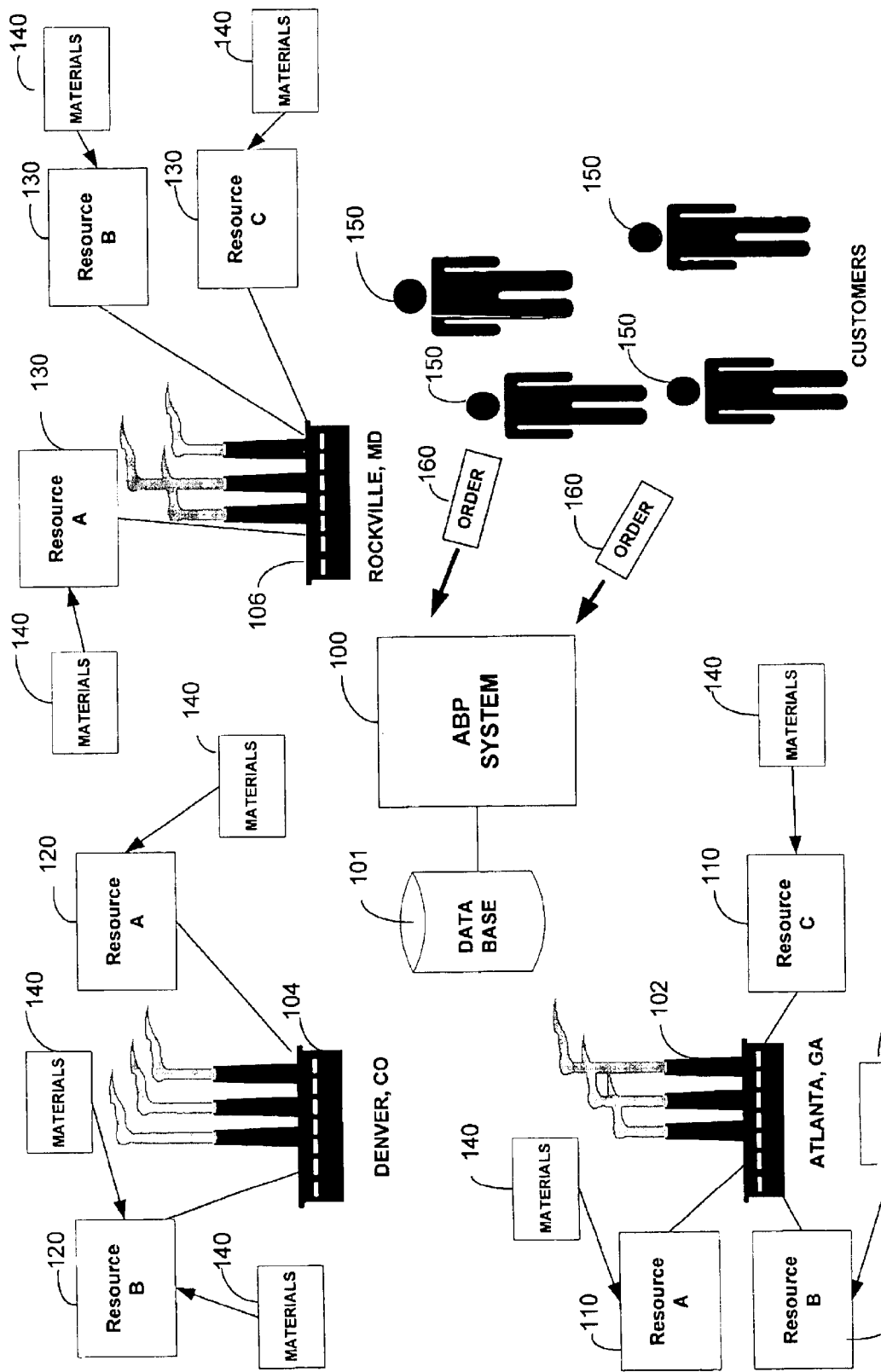
FIG. 1 is a block diagram of an exemplary environment where a system according to one embodiment of the present invention may operate.

Reference will now be made in detail to the preferred embodiment of the present invention, examples of which are illustrated in the accompanying drawings.

The invention disclosed herein incorporates by reference the subject matter of co-pending and commonly assigned U.S. Non-provisional Patent Applications "System and Method for Order Group Planning with Attribute Based Planning," Crampton et al., Ser. No. 10/287,788, filed on Nov. 5, 2002; "System and Method for Replenishment by Manufacture with Attribute Based Planning," Crampton et al., Ser. No. 10/287,775, filed on Nov. 5, 2002; "System and Method for Order Planning with Attribute Based Planning," Crampton et al., Ser. No. 10/287,773, filed on Nov. 5, 2002; "Strategic Shipping Planning System and Method," Weber et al., Ser. No. 09/903,855, filed on Jul. 13, 2001; and "System and Method for Supply Chain Management Including Collaboration," Zarefoss et al., Ser. No. 09/965,854, filed on Oct. 1, 2001.

The present invention provides a system and method for optimal planning and scheduling of resources in a manufacturing or supply chain network. The system, called an attribute based planning ("ABP") system, can model SKUs as well as attributes. The ABP system and the process implemented by the system generate an output that defines a plan for using the resources of a supply chain. The output may be in text, raw data, graphical or any other form useful for planning purposes. The ABP system may interface with various other business planning, scheduling, purchasing, collaboration, and promising type systems and applications as are known in the art, including NetWORKS Strategy™, NetWORKS Sequencing™, and NetWORKS Collaborate™, all commercially available from Manugistics, Inc. The various functionalities associated with the ABP system may be best understood by the following description together with the accompanying drawings describing the various concepts used to implement the novel aspects of the present invention.

The following description of the invention makes reference to various terms, some of which are broadly defined in the following glossary.

Glossary

ABP System: Attribute Based Planning system. A planning system for planning the utilization of resources in order to satisfy demand.

BOM: Bill of Material. A structure that describes the various ways a SKU can be manufactured. Each record typically associates a parent item with a child item and a draw quantity that tells how many child units are required for each parent unit. Additionally, attribute restrictions may be present that tell when the record may be applied.

Bucket: A time interval typically used for constraints and allocations. In a supply chain optimization system, the planning horizon is usually divided into a number of buckets. The buckets may have the same length or they may be telescoping in that bucket durations may increase. For example, buckets may be defined for a week at the day level, three weeks at the week level, and three months at the month level. This would give 13 buckets that cover 4 months. If buckets are modeled at the day level for 4 months, approximately 120 buckets would be modeled. The number of buckets is important because the fewer buckets the system models, the smaller the model and the faster the algorithm.

Configuration: A set of BOM records that completely defines a specific buildable configuration for an order for a SKU.

Constraints: Any limitation placed on any entity, such as resource, that is recognized by the ABP system. Constraints may be hard (a solution should never violate) or soft (a solution should attempt to accommodate).

Constraint Bucket: A bucket associated with a constraint that has a capacity limitation. Typically there will be a maximum. There may also be relaxation information that tells how much the capacity can be overused and the cost for doing so.

Constraint Rules: A shorthand way for defining the capacities of constraint buckets. For example, a calendar may be associated with a constraint bucketed at the weekly level where each unit of availability converts into an amount of capacity. If, for example, there is a labor constraint bucketed at the weekly level that was associated with one person and there is a calendar that defines the available shifts as two shifts available Monday to Thursday (1 person*4 days*2 shifts/day*8 hours/shift=64 hours) and one shift available on Fri (1 person*1 day*1 shift/day*8 hours=8 hours), then the capacity for a week would be 64+8=72 person hours.

Demand: The demand on a system consists of external demand and dependent demand. The external demand consists of customer orders and forecast. The dependent demand is additional demand required to meet the independent demand.

Dependant Demand: This is the set of orders that the system generates that are consequences of the way material and capacity are allocated to the independent demand.

Effective Need Date: The need date less transportation time required to deliver the goods to a specified location.

FG SKU: Finished good stock keeping unit. A SKU that is a finished good.

Flag: Flags are used to indicate the existence of a specific condition, a preference, a constraint, and the like. Flags may also be used to control the planning process. Flags are used to indicate, for example, that a scheduling opportunity is not feasible, therefore, the ABP system needs to look at other scheduling opportunities.

Freeze Group: A SAD group whereby each order associated with the group is frozen. This is used in the planning cycle ensuring that an order will be scheduled even if infeasible.

Freeze Group Table: This table identifies the SAD groups that should be treated as frozen.

Independent Demand: This is the set of orders that is given to the system as opposed to dependent demand, which is related to orders generated by the ABP system.

Initial Assignment: An assignment that is given to the system that represents previous commitments that should be honored whether feasible or not. Each time the planning process is run, initial assignments will be placed into buckets before any other orders are planned. This placement of initial assignments ensures that frozen orders are always in the same place on the plan.

Location: A location is a place in the supply chain. Every location has a name.

Need Date: The most desirable date for order delivery and/or availability.

Maximum Earliness: The time interval before the need date that the requested good will be accepted. This value is specified by a SAD Group.

Maximum Lateness: The time interval after the need date that the requested good will be accepted. This value is specified by a SAD Group.

Multi-level Objective Function: Criteria for reaching desirable planning results. The ABP system preferably incorporates a multi-level objective function to determine the best placement for an order on the plan. If the ABP system finds multiple opportunities for planning an order, the ABP grades each opportunity and selects the best opportunity based on multiple objectives. These objectives include, for example, lateness (a measure of where the order was planned versus the effective need date for the order), total use (a measure of how full the bucket on the capacity constraint in which the order is planned), and transportation (the transportation cost between the location of the resource on which the order is manufactured and the customer location on the order).

Order: Each order consists of predefined and user defined attributes. Predefined attributes may include, for example, an identifier, SKU, quantity, start date (optional), need date, customer, priority, and effective need date. Note that orders and SKUs can both have values for user defined attributes. If both have values, the value for the order always takes precedence. For example, an order could be for a blue truck with sunroof and alloy wheels for a customer by the name of Joe Dealer. Therefore, the finished good, i.e., the order, is for a truck with the following attributes, blue, sunroof, alloy wheels and Joe Dealer.

Parent Item: A BOM record relates a parent item and a subordinate item. See BOM.

Plan: An assignment of demand to resources through time used to fulfill one or more customer orders over a certain time period (i.e., planning horizon).

Period Maximums: Maximum quantity of goods that may be available for a specified bucket.

Resource: A resource may be any entity that is a source of a good including assembly lines, manufacturing machine, a warehouse, storage facility, storage tanks, suppliers, and the like. Generally each resource may be uniquely identified by a name and a location.

SAD Group: SKU attribute description group. SAD groups are associated with various modeling concepts and tell which orders are applicable. Each SAD Group can have a list of SKUs and lists of attribute values for some or all of the attributes associated with orders. For example, if SKUs for model1 @1, model1@2, and model2@2 exist, with attributes for color (red, blue), and sunroof (yes/no) then one could define a SAD Group across all model1 vehicles that are red conceptually by writing (Sku: (model1@1 or model1@2) and color (red)). SAD groups may be used to control how the ABP system schedules orders and plan the use of resources. For instance, order groups may be used to determine how orders are sorted before the orders are process, the maximum early and maximum late time for groups of orders, scheduling controls for groups of orders, metrics and objective that define the "best" placement for an order, and the like. Each SAD group may be prioritized such that orders belonging to one SAD group may be scheduled prior to orders belonging to a lower prioritized SAD group.

Scheduling Controls: Schemes used to affect the manner in which buckets are searched to find feasible place to an order. There are several types of scheduling controls available including, forward, backward, just-in-time, frozen and do not schedule.

Scheduling Opportunity: A location/resource/bucket or resource/bucket defined opportunity to schedule an order that satisfies all the constraints applicable to the order and the bucket, resource and/or location.

SKU: Each SKU associates an Item and a Location. The SKU has predefined attributes and user defined attributes. The SKU may be raw material, work-in-process ("WIP"), finished good, or both WIP and finished good. The SKU may be hard or soft constrained and if raw material will have a replenishment model that tells whether the material can be replenished, and if so, how.

Smoothing Constraint: a type of constraint that directs the system to compute the average amount of capacity per unit time for a constraint based on the load and the total amount of time available in a horizon. The maximum in each bucket is set to the amount of available time times the average amount per time unit.

Subordinate Item: A BOM record relates a parent item and a subordinate item. See BOM definition.

User Defined Attribute (UDA): An attribute that is implementation specific. For example, a customer in an automotive implementation may have a color attribute for each car. A customer in a computer implementation may not have color but may have the hard disk size.

General Concepts

The present invention relates to an attribute based system for planning orders and resources. In order to facilitate an understanding of the various novel features of the invention, examples along with an explanation of various concepts are provided below. The following example introduces concepts that may be of use in understanding the novel aspects of the present invention.

The ABP system, according to one embodiment of the present invention, is a robust planning system that can operate in a highly complex and highly dynamic environment.

Referring to FIG. 1, which is a block diagram depicting an ABP system 100 operating in an exemplary environment. The ABP system 100 may be implemented using a combination of both hardware and software. The ABP system 100 may include a database 101 or may interface with one or more databases located on a single or multiple computer devices such as personal computers, workstations, servers, and the like. FIG. 1 depicts a manufacturing network of an automaker that manufactures three basic models of cars, Sedans, SUVs, and Minivan. Since a number of options (e.g., power windows, sunroof, and the like) are offered by the automaker, the network must be able to make many variations of the three basic model types. The network comprises of three manufacturing sites 102 to 106 in Atlanta, Denver and Rockville. Each site 102 to 106 in turn comprises of multiple resources 110, 120 and 130. A resource 110 to 130 may be an assembly line, a warehouse, plant equipment, inventory or any other entity that is a source for any finished goods that may be requested by a customer. Each resource 110 to 130 may be unique in the sense that each may have differing capacity, operating time, product lines, and other constraints. Constraints may exist that are specific to a resource, to a group of resources, to a location or a group of resources. Further, the automaker may implement certain rules that place more limitations on the resources and locations. Each resource 110 to 130 may be associated with one or more materials 140. Material 140 is any component part or component material or even finished goods that may be needed by a resource to produce finished goods. One way to view the resources 110 to 130 is to view them as a well that may be replenished by, for example, manufacture, purchase or substitution. Although not shown, other materials may also support materials 140. That is, materials 140 that go into resources 110 to 130 may be made from other materials. The automaker has several customers 150 who submit orders 160 to the automaker. The orders are parsed by the ABP system 100 and a plan is generated for the optimal use of the resources for fulfilling multiple orders. Each order contains relevant information that may be used to create certain parameters when scheduling orders. These include requested delivery date and location, identification of the requested goods, quantity of requested goods, customer identification, transportation mode, and the like. The finished goods requested in the order may be viewed as a "finished good stock keeping unit" ("FG SKU"). Typically there will be multiple configurations and component materials that meet the requirements of each FG SKU ordered. For example, suppose that a customer orders a Sedan. Suppose further that to build the Sedan, all that is needed are three components, components A, B and either C or D. In this case, there are at least two configurations possible, a Sedan built with components A, B and C, and a Sedan built with components A, B and D. These differing configurations and component materials may be listed in a bill of material (herein "BOM").

In addition to the constraints and order parameters described above, ideally a robust manufacturing resource planning system will preferably be able to accommodate a number of other important factors when planning the utilization of network resources. For instance, ordering and/or manufacturing component parts and material at the right time is required if the finished goods are to be delivered on or near the desirable date. If materials are not ordered at the proper time, then there will be insufficient material to fulfill orders. Ordering of component parts prior to the time when the parts are needed is one of the keys to having efficient and timely manufacturing capabilities.

Planning and scheduling is a continuous process. Thus, any effective planning system must be able to accommodate already scheduled assignments or orders that have been scheduled before attempting to fulfill new orders using the manufacturing resources available.

Preferably a reliable planning system will be able to accommodate idiosyncrasies, business rules and goals of many types of manufacturers including those having large and complex manufacturing networks. For example, a manufacturer may follow Just-in-Time concepts and would therefore want the ordered goods to be made just before the requested delivery date. On the other hand, the manufacturer may prefer to deliver goods on the earliest date that is acceptable to the customer. These goals are specific to each manufacturer and may be specific to certain types of orders (through model, customer, priority, etc) and may help a manufacturer to realize its long-term goals. Thus, a system that recognizes and accommodates the particular needs of a manufacturer may be highly desirable.

A business, such as large manufacturer, typically receives a number of orders from multiple customers and/or may make forecasts for customers who have yet to submit their orders. A customer may be a third party, a division within the same business, a supply chain partner or any other buyer. Each order received by the business may be defined by its attributes such as customer name, order identification, requested SKU, need date, quantity and the like. Typically a SKU will be defined by at least two attributes, name of good[s] and location. An SKU may have values for user-defined attributes. SKUs may also be grouped into finished good ("FG") SKUs, work in process (WIP) SKUs, or raw material SKUs. The items for raw material and WIP SKUs may be subordinate in the BOM. A subordinate item is a component part or material that is needed to create another item. Note that the values for user defined attributes for orders may override the values for user-defined attributes for SKUs. For example, a SKU may have a default value of false for a sunroof user defined attribute (meaning no sunroof). A particular order can override this value and set the sunroof user defined attribute to true. These concepts may be best understood with the following example. Suppose a FG SKU can be defined by the following attributes [item=sedan, location=Atlanta, options=power steering]. Suppose further that to build the FG SKU assembly parts A, B, and C for the basic sedan model and an additional component, "steering assembly," for the power steering option are needed. In this case, there are four subordinate SKUs: assembly A in Atlanta, assembly B in Atlanta, assembly C in Atlanta and steering assembly in Atlanta The ABP system 100 may organize SKUs, and user defined attribute values into SKU attribute description (herein "SAD") groups. A SAD group for orders will be associated with any orders having "at least" the same attributes that define the SAD group. Thus, orders that have more attributes than the attributes that define the SAD group may belong to the SAD group as long as they have "at least" the attributes that define the SAD group. For example, suppose a SAD group is defined by the following two attributes [item=Sedan and Location=Atlanta], then all orders having those two attributes, regardless of whether the orders are associated with other attributes, will belong to that SAD group. For instance, an order having the attributes [item=Sedan, Location=Atlanta and Power Windows=Yes] will belong to the SAD group. Orders that meet the conditions defined by a SAD group are considered to be part of that group. The ABP system 100 uses SAD groups to provide a number of functionalities. For instance, among other functionalities, SAD groups may be used to: define attribute-sensitive bills of materials ("BOM") for orders; define attribute sensitive inventory; define attribute-sensitive substitutions; apply constraints to orders; define maximum, early/late dates for orders; define dedicated resource groups for orders; apply metrics to orders; define scheduling controls for orders; define sort criteria to sort orders before the planning process is run; apply rate models to orders for a location; and apply violations to orders. An order violation indicates when an order violates a soft constraints or when an order could not be planned because it would have violated a hard constraint. It typically has an ID and some associated values that can be displayed to the user in a internationalized, localized format. In grouping various items into SAD groups, the planning process may be simplified providing optimal planning solutions.

A SAD group's data may be stored in a SAD group table. An example of a simple SAD group is a group that is defined by a single attribute name and value set: attribute name=Color, attribute value=Red. All orders with a value of red in the color attribute would be a part of this group. Certain fields in the table may make up the definition for each attribute name/attribute value pair in the SAD group. These include, for example, attribute type, attribute name, attribute value, index, attribute match flag, attribute present flag, and the like. Attribute type and attribute name identify which order attribute to compare against. Attribute value is the value to compare against the data from the order. An index may be used to specify how multiple name value pairs within a group may be associated (e.g., "and" or "or" connector relationships). An index of −1 means that the name/value pair is evaluated and 'or'ed with the rest of the group. Name/value pairs with the same index are 'and'ed together and 'or'ed with the rest of the group. The attribute match flag specifies if the attribute value from the order should match or not match the attribute value from the name/value pair. The attribute present flag specifies the behavior if the attribute is not present on the order. For instance, if the attribute value is color, the allowable values could be "red", "blue", or no value present. This flag indicates whether no value present matches or not.

A number of attributes may be used to define a SAD group. These attributes include, for example, item identifier, planned location, requested location, start date-begin, start date-end, need date-begin, need date-end, preference date begin, preference date end, minimum quantity, maximum quantity, minimum priority, maximum priority, customer name, customer location, SKU and any other user defined attributes useful for implementing the ABP system 100. A planned location attribute may be used to group orders by the location at which they are planned. The requested location attribute may be used to group orders by each order's requested location. The start date-begin and start date-end dates attributes are used to group orders by a range of start dates. The start date-begin and start date-end attributes may be used individually or in combination to define a range of start dates. A start date can identify the soonest (i.e., earliest) bucket that an order can be planned in. This is an optional field, which may use the latest of the following dates [horizon start, the order start date, order need date–maximum earliness]. The start date identifies the soonest bucket that the order is allowed to be planned in. Note that capacity or material feasibility can make the actual start date later but no earlier than the earliest start date. The need date-begin and need date-end attributes are used to group orders by a range of need dates. Need date-begin and need date-end may be used individually or in combination to define a range of need dates. The preference date-begin and preference date-end attributes may be used to group together orders by a range of preference dates. They may be used individually or in combination to define a range of preference dates. The minimum and maximum quantity attributes may be used to group together orders based on each order's requested acceptable minimum and/or maximum quantities. The minimum priority and maximum priority attributes may be used to group orders by priority.

The ABP system 100 supports an attribute-based bill of materials (herein "BOM"). However, unlike the BOMs in traditional planning systems, the BOMs associated with the ABP system 100 allow the modeling of option-based and rule-based material requirements. For example, in the automobile industry, car models typically have a number of features and options. Each feature or option, such as power windows, drives the types of components that will be needed to provide such a feature or option. For cars with power windows, materials (i.e., component parts) such as power window assembly and a 4W motor (for driving the power window) will be needed. The presence of specific combination of features or options may also affect the materials needed for the combination. For example, if, in addition to the power window option in the above example, a second option, an automatic sunroof, is needed. This may result in the addition of a sunroof assembly and changing the 4W motor requirement (originally required only when the power window was present) to a 10 W motor requirement. BOMs are essentially recipes for SKUs or finished goods and show the required component parts or material for all possible configurations of the finished good that satisfies the attribute requirements of a SKU. For the auto industry example above, a BOM for a SKU (e.g., car model) may show the components (e.g., power window assembly, 4W motor, engine, brakes, etc.) used to build the various acceptable configurations of the SKU. Therefore, the more components that exist, the more configurations are possible and more component parts or materials may be needed. The presence or absence of a feature therefore drives the requirements for materials. Substitutions s may be used as necessary to attempt to make a configuration feasible. A substitution model may be created to facilitate substitutions. The substitution model identifies the substitutable SKUs for a given SKU, the priority, and the substitute draw quantity. If the base configuration is not feasible, then a substitute SKU may be tried. Chaining is allowed in that one may be allowed to substitute SKU2 for SKU1. If SKU2 is not feasible and has a substitute SKU3, then SKU3 may be tried. Circular substitution is detected and not allowed. Substitutes may be limited by the present of SAD Groups.

SAD groups may be used to group other items. For example, SAD groups may be used to created dedicated resource groups. Dedicated resource groups may be created and used to restrict the orders that can be planned for specified resources. Dedicated resource groups may be implemented using SAD groups. Any resource that references a dedicated resource group will only be able to manufacture orders that belong to the SAD group associated with the dedicated resource group. SAD groups may be used to group other items, some of which will be described in the following sections.

In a preferred embodiment, the ABP system 100 is a bucketed planning system. That means that the ABP system 100 attempts to plan orders into buckets. Buckets may be defined by several parameters such as time, constraints, resource, and the like. For example, an order that need to be scheduled on one of the resources depicted in FIG. 1 may be assigned to a bucket that is defined by a time interval and is specific to the resource at that location. For instance, suppose an order has been assigned to resource "A" 110 at the Atlanta location 102. The order may then be assigned to a bucket that is defined by a time interval, a resource and a location such as "September 11 to September 12," "resource A," and "Atlanta, Ga."

To support the various features provided by the present invention, a number of database tables may be created. The tables are made up of rows and columns. The value of the rows and columns will depend upon the type of tables they are. Tables may be created for a number of entities including BOM, buckets, SKU groups, SAD groups, inventory table, Items (all finished goods and subordinate materials should be listed), Locations, Resource, Resource groups, and the like.

The Overall Process

Figure 2A:
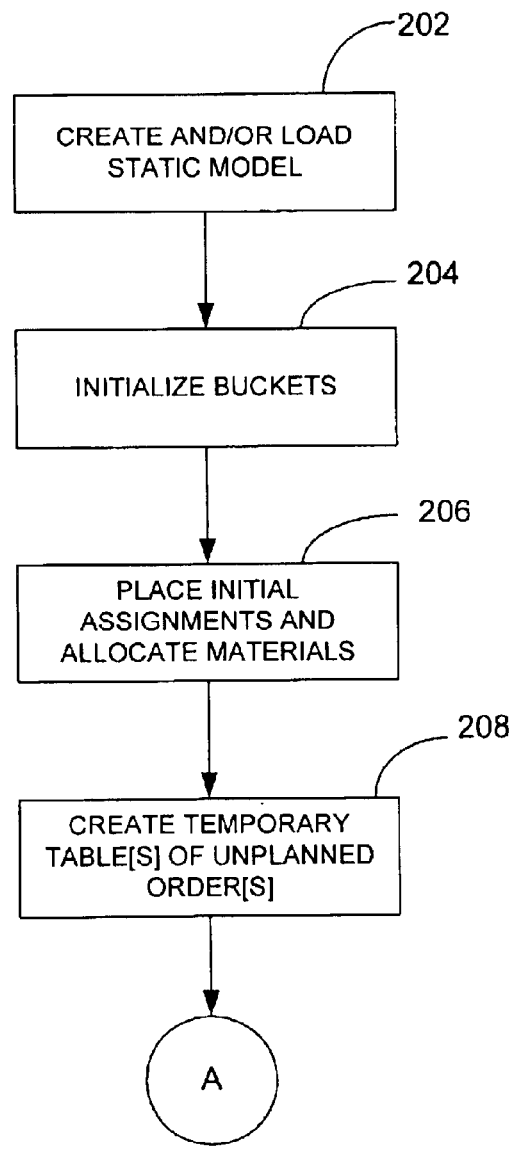
FIG. 2A is a flow diagram of an initialization process according to one embodiment of the present invention.
Figure 2B:
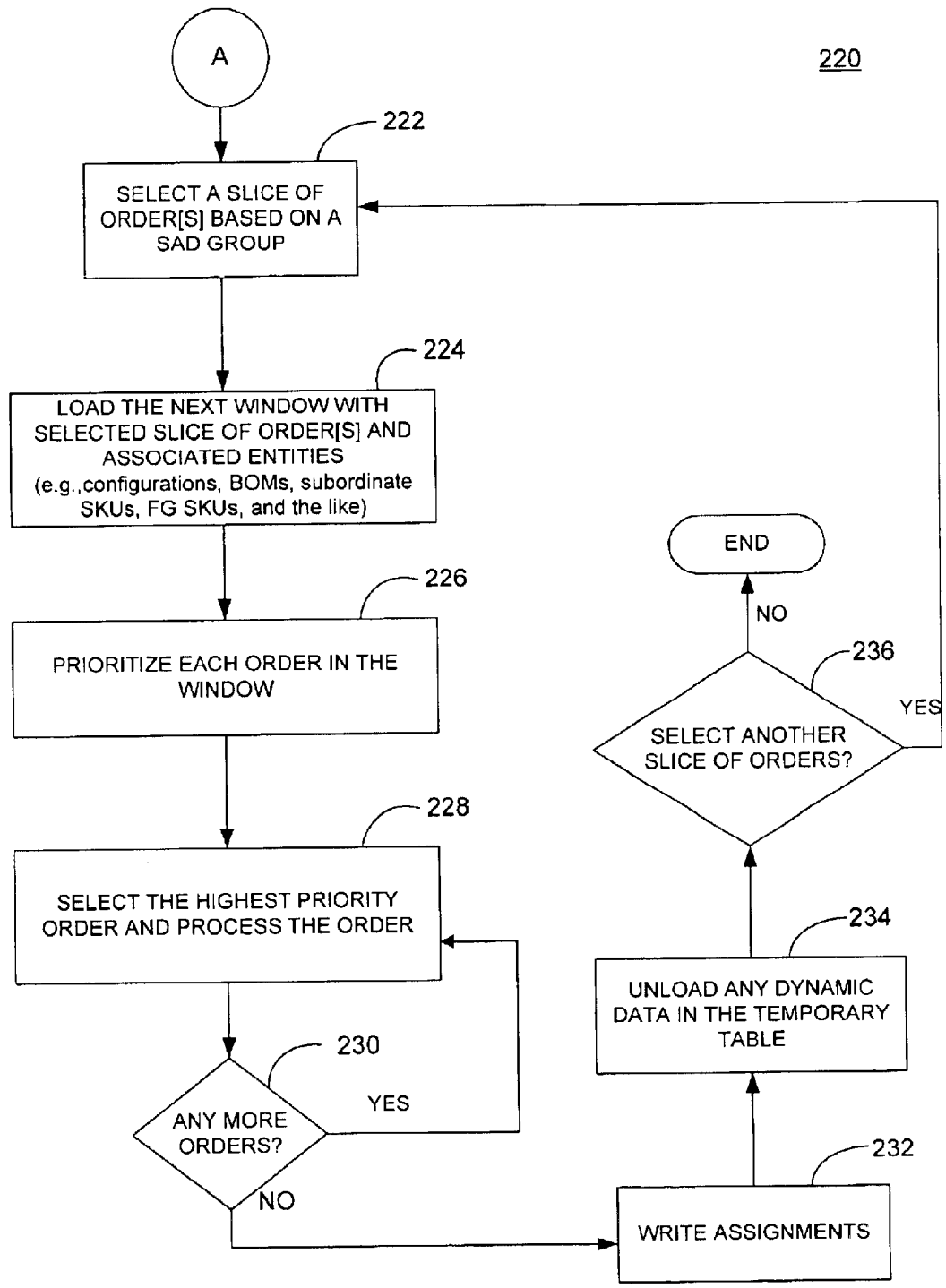
FIG. 2B is a flow diagram of a process for planning the utilization of resources in order to meet demand according to one embodiment of the present invention.

The entire process for generating a plan for utilizing resources in order to meet demand may be divided into two sub-processes. Referring to FIGS. 2A and 2B, which are two high-level flow processes 200 and 220 for creating a plan or modifying an existing plan for utilizing network resources in order to fulfill demand according to one embodiment of the present invention. For illustrative purposes, the flow process 200 will be called an initializing flow process and flow process 220 will be called an order planning flow process. For each process 200 and 220, a discussing that briefly introduces the various steps defined for each flow processes 200 and 220 is provided below followed by a more detailed discussion of specific steps and concepts introduced in the two processes.

In brief, the process 200 begins at step 202 when a static model is loaded and/or created. The static model may be modeled by defining or loading, for example, data relating to available resources, locations, calendars, metrics, constraints, business rules, SKU SAD groups, bills of materials ("BOM"), dedicated resource groups and the like. This includes SKUs that may be marked as "keep in memory" and BOM relationships that are referred by these SKUs. At step 204, initialize buckets. To initialize buckets, each bucket may be associated and/or defined by constraints. These constraints may include, for example, capacity constraints. At step 206, place initial assignments and allocate materials accordingly. At step 208, create temporary table of unplanned order or orders. A more detailed description of some of these steps is provided below. After the initialization process 200 is completed, a second process 222, for processing orders, may commence.

The second overall process 220 is for planning the utilization of network resources in order to fulfill demand as defined by, for example, orders that have not yet been planned (i.e., unplanned orders). In brief, the process 220 begins when a slice of one or more orders is selected at step 222. A slice of orders is a group of orders that are each associated with a particular SAD group based on the SAD group's attribute values. At step 224, load the next window with the selected slice of order or orders and its associated items. The items that may be associated with the order or orders include for example, configurations, BOMs, subordinate SKUs, Finished Good SKUs ("FG SKUs"), and the like. At step 226, prioritize each order in the window. Those with higher priority will generally be scheduled before those that have lower priority. At step 228 select the highest prioritized order not yet planned and plan the order. If there are any more unplanned orders in the window then the next highest prioritized order is scheduled as indicated by step 230. Otherwise at step 232, write assignments so that appropriate resources and/or materials that are needed to fulfill the orders may be reserved. Once the assignments have been written, the dynamic data in the temporary table may be unloaded at step 234. At step 236, determine whether other slices of orders need to be processed and if so, return to step 222 to begin the process 220 over again.

A more detailed description of specific steps and concepts introduced above for processes 200 and 220 follows. The initialization process 200 typically begins when the static portions of the planning model is defined at step 202. For example, the relationships between resources, dedicated resource groups and its location (e.g., manufacturing or warehouse sites) may be defined. Specific information relating to each of the resources such as capacity and the types of goods available at a particular resource may also be defined. Constraints that are generally static may be defined during initial modeling. A transportation matrix may be created to define the transportation time required for various legs of the supply chain including time required for delivery to particular customers. Items such as calendars, buckets, business rules, SKUs, BOMs may also be defined. Those skilled in the art will recognize that a number of other generally static entities may also be defined during the modeling stage of the planning process.

Generally, it will be preferable that some data not be inputted until the last moment. For example, highly dynamic data that tend to constantly change or data that may not be available until the last moment will preferably be inputted just before orders are planned. Thus, the dynamic portions of the model may be inputted sometime after the static portions have already been defined. Data such as new order or modified orders will generally be inputted just before the planning process begins. Even generally static data, such as data relating to constraints, resources and business rules, may have to be updated periodically and data relating to those updates may be inputted just before order planning commences. New constraints may also be added just before order planning for specific planning horizons or for specific conditions such as for a one-time customer. New or emended business rules may also be added at the last moment to reflect the constantly changing needs of businesses. Finally, the most recent orders will typically be inputted at the last moment before order planning is implemented.

Preferably the processes 200 and 220 generate plans for using resources for fulfilling demand (e.g., both independent and dependent orders). Specific buckets may be reserved for specific orders. Buckets are time intervals that may be associated with, for example, a resource and represents scheduling opportunities. At step 204, buckets are initialized by placing constraints on them. These constraints may include quantitative constraints as well as qualitative constraints. During the initialization step 204, the states (buckets) on all the constraints are created and the capacities on these states are set. Constraints may be incrementized and implemented in buckets. These constraint buckets may parallel resource buckets. Thus, for example, a specific constraint, such as a resource capacity constraint, may be defined for specified buckets. For instance, the total capacity for a particular resource may be restricted at one level during one time period while it may be restricted to another level at a different time period. Constraints may be modeled using three database tables, a constraint table, a constraint rule table, and a bucket table.

Before the ABP system 100 makes plans for fulfilling any not-yet-planned orders, it may plan for orders with pre-defined assignments during the initialization step at step 206. Initial assignments are used to "freeze" orders. That is, they may be used to reserve a location/resource/bucket[s] for fulfilling a particular order[s] before the planning process is run. This may be accomplished by initial assignments that are typically placed into buckets before any other orders are planned to ensure that they are always in the same place on the plan. Before planning order, orders with pre-determined assignments will preferably be scheduled. This may be accomplished by invoking an initial assignment placement routine.

Figure 3A:
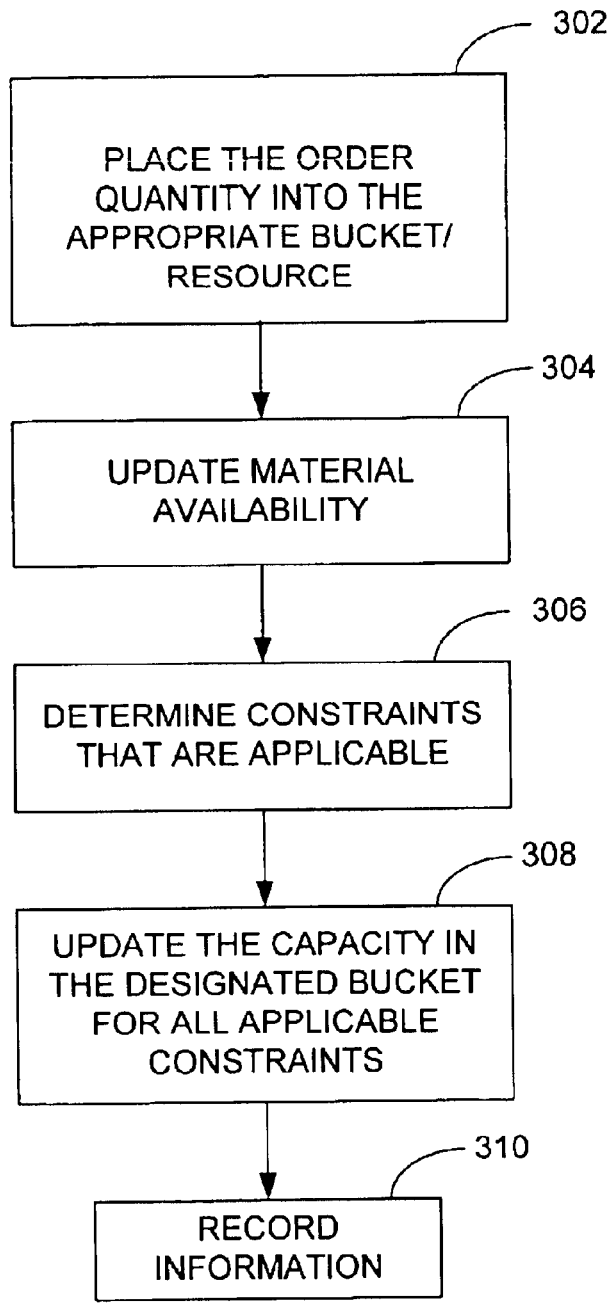
FIG. 3A is a flow diagram for a process to place initial assignments.

In some situations, a pre-assignment table may be created to define pre-determined assignments. Such a table may contain information such as: the ID of the order to be assigned, the resource to which the order is assigned, the scheduled bucket for order, and the quantity of the order to be associated with this assignment (probably does not belong here). The BOM configuration information for initial assignments may be stored in a BOM table. Upon invocation, the initial assignments may be processed in the pre-assignment table. Referring to FIG. 3A, which is a flow process 300 for the placement of an initial assignment. At step 302, place the quantity of the order in the initial assignment on the designated resource in the designated bucket using the designated BOM configuration. At step 304, update material availability without assessing material feasibility for the order. Material, in this context, may be any component material or finished goods used to replenish a resource. At step 306, determine constraints that are applicable to the bucket/resource. Constraints are typically bucket/resource/location dependent. Two factors may be used to determine whether constraints are applicable. First, only constraints that apply to the designated resource on the initial assignment are considered. In other words, either the name of the resource for which the constraint is configured must exactly match the name of the designated resource or the resource group for which the constraint is configured must include the designated resource on the initial assignment. Second, constraint violations should not prevent the initial assignment from being placed in the designated bucket on the designated resource. At step 308, update the capacity in the designated bucket for all applicable constraints. At step 310, record the information relating to the assignment of the order.

At step 208 of process 200, temporary database table or tables for unplanned order or orders may be created. These unplanned orders are the targeted orders that are yet to be planned by the processes 200 and 220. The tables may identify all orders that have not been fully fulfilled through initial assignments. The tables may be used to restrict the loading of orders through the remainder of the planning process 200 to only those orders identified in the tables. In processing orders by slices or groups of orders, memory requirements of the ABP system 100 may be reduced.

In step 226 of FIG. 2B, the orders are prioritized and sorted. In general, when multiple orders are present, the orders are processed one after the other. Orders that are processed first generally get the first access to materials and capacity. Since it is preferable that certain orders be process before others, preferably the ABP system 100 uses a mechanism for prioritizing orders. This mechanism for prioritizing orders is called sorting.

Figure 3B:
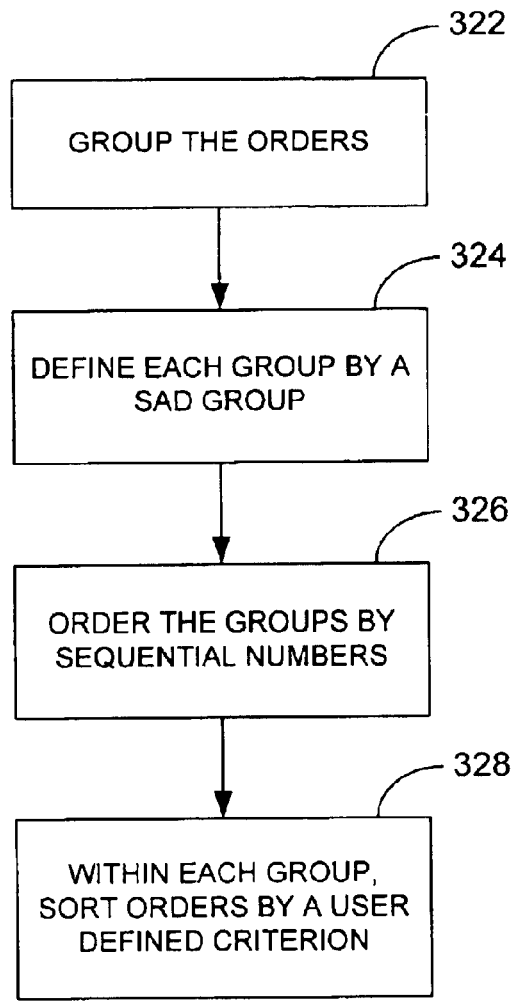
FIG. 3B is a flow diagram for a process to prioritize orders.

The order sorting mechanism allows for modeling order groups and sorting criteria in such a way that the highest priority orders get processed first. If two orders have the same priority, they may be processed in the sequence returned by the database. Referring to FIG. 3B, which is a flow process 320 for prioritizing orders. At step 322 organize orders into order groups. At step 324, define each group by a SAD group. At step 326, prioritize each SAD group by, for example, sequential numbers. A sequence number is used to model the relative priority of these order SAD groups. Lower sequence numbers are associated with higher priority. Within each order group, orders may be sorted, ascending or descending, based on one or more attributes. At step 328, sort orders within each group by a user defined criterion. The criteria may be different for each group. For example, orders within one group may be sorted by need dates while orders for another group may be by a pre-defined priority number.

To illustrate some of the concepts described, the following example is provided. Suppose a car manufacturer makes model X cars and accepts orders for fleet, retails and stock sales. The manufacturer has three distinct groups of orders: fleet orders, retail orders and stock orders. As a result, the relative priority of these three groups may be modeled. Suppose further that the fleet orders are the most important, followed by retail orders and finally, stock orders. For each group, a separate priority criterion for sorting the various orders within that group may also be defined. For example, orders in the retail group may be sorted, ascending, by need date where as the order in the fleet group may be sorted, descending, by revenue (a user defined attribute).

The retrieval of order groups and sorting within the groups may be accomplished using an extensible interface. The ABP system 100 may support a base implementation for this interface that works as follows. SAD groups may be used to define order groups. Sequence numbers may be used to model the relative priority of these order groups. Lower sequence numbers are associated with higher priority. Within each order group, order may be sorted ascending or descending, by a single attribute. For example,

| Sequence Number | Order Group Descriptor (SAD Group) | Sort Attribute | Sort Order |
|---|---|---|---|
| 1 | Order Type = Fleet | Revenue | Descending |
| 2 | Order Type = Retail | Dealer | Descending |
| 3 | Order Type = Stock | Need Date | Ascending |

The above table shows that fleet orders are more important than retail orders, which in turn, are more important than stock orders. Within the group of fleet orders, the higher revenue orders are more important than lower revenue orders. Within each group, orders may be sorted on a different basis. For example, for the group of retail orders, orders from dealers with a higher category number may be made to be more important than orders from dealers with a lower category number. Thus, the manufacturer may define three tiers of dealers: category number '3' is top tier, '2' is middle tier and '1' is the bottom tier. As a result, those dealers belonging to the top tier may have their orders processed first. In another example, suppose the manufacturer is concern about on-time delivery. In such a scenario, orders within a SAD group may be sorted by need date. In that situation, a need date attribute may be defined in the orders and used to set the relative priority of each order within the SAD group.

In addition to the sorting mechanism, the ABP system 100 may use two other mechanisms that help ensure that orders of the highest significance are fulfilled satisfactorily. The two mechanisms are capacity allocation and material allocation. The capacity allocation mechanism help temper the greedy behavior of the system in the event that undesirable orders get processed first (despite order sorting). According to this mechanism, the system constraint models may be created that may be used to allocate capacity based on meaningful attributes. For instance, capacity of a particular resource may be designated for certain customers. The third mechanism for assuring that the highest priority orders be satisfactorily processed first is called material allocation. The system allows for earmarking inventory and scheduling receipts using attributes in order to force material allocations to desired orders. For example, suppose 100 units of inventory for an item has been assigned an attribute "Customer= Jay-Mart." This attribute, in essence, flags the 100 units and basically reserves the 100 units for Jay Mart. This ensures that these 100 units can only be netted against independent/dependent demand arising from a Jay-Mart order.

In one embodiment of the present invention, the ABP system 100 uses an order window[s], which can display an unscheduled orders list. The unscheduled orders list ensures that the same order is not scheduled twice because it may match multiple criteria in the SAD Groups. For example, suppose that a SAD Group with priority 1 (e.g., high priority) was all the red cars and a SAD Group with priority 2 was all the cars with ABS brakes. A red car with ABS brakes would be planned in the first group. We would also encounter it in the second group but since it was not in the unscheduled orders list, it would be skipped.

In order to manage memory efficiently and to improve performance by making as few database calls as possible, the ABP system 100, according to one embodiment of the invention, may follow certain rules while loading and unloading entities into and out of memory. The order window provides a way to view and process orders. The size of the order window depends on the hardware configuration and the size of the model and is set by a user. Only unscheduled orders will be processed, these are kept on the temporary list in the unscheduled order table. The following rules apply when loading information into memory: the orders in the order window, for orders requesting specific SKUs, the SKUs are loaded into memory; for orders that are defined by items only (not SKUs), the items and all SKUs associated with the items are loaded; BOM relationships for the SAD groups that apply to the loaded SKUs and items; substitute SKU information for the SAD groups that apply to the loaded SKUs and items; only SKUs which are hard constrained (from a material perspective) will be loaded; and material availability information for the inventory related to the loaded SKUs and items.

For unloading, the SKUs, items, and BOMs loaded into memory at the beginning of an order window will be unloaded from memory after the order windows is processed except in the following exceptions: each SKU will have a flag to determine whether it will ever be unloaded from memory once it has been loaded, SKUs with this flag set will not be unloaded; a parameter may be set on the algorithm to provide window memory. This parameter will give the number of order windows that use of a SKU will be remembered, i.e., if a SKU has been modified or considered in the last N windows, it will not be unloaded; BOM configuration will not be unloaded unless the present SKU is unloaded; and SKUs which are unloaded from memory shall have their availability state updated in the persistent store.

To illustrate these concepts, the following example is provided. Assume that a sorted list of orders (the output of the order sorting process) is as follows:

| GROUP | ORDER ID |
|---|---|
| Fleet | 01 |
| Fleet | 03 |
| Retail | 02 |
| Retail | 06 |
| Stock | 05 |
| Stock | 04 |

There are six orders in the above table, 01 is the highest priority order and 04 is the lowest priority order. Assume that the user has configured a window size of three orders. When the order window loader process is invoked for the first item, the routine will load into memory the orders with IDs 01, 03, and 02. When the order window loader is invoked again, the routine will load into memory the orders with the following IDs: 06, 05 and 04. The order window loader is generally invoked only after all the orders in the current order window have been processed.

The manner in which an order is processed may depend on whether the order is frozen or not. An order may be frozen if it belongs to a SAD group in a freeze groups table. This table contains a collection of SAD group names. Orders described by one of the SAD groups are preferably scheduled on their need dates. It is important to note that frozen orders are different from initial assignments. Initial assignments are essentially orders that were "frozen" after a previous run of the planning process 200. After making necessary adjustments to the ABP output, a system user may freeze orders that the user does not want moved during a subsequent ABP run. Initial assignments may have an assigned date, location and resource. However, "Frozen Orders" are typically used to force "certain" orders to be assigned to a particular date and/or location. For example, an auto manufacturer may have a business rule that states, "fleet orders must get their need dates." In order to model this business rule, a frozen SAD group "order type=fleet" is preferably created. Frozen orders are scheduled in their need bucket. The need bucket is the bucket that contains the need date (in this case, the need date of the frozen SAD group). If a location is not specified, then the first feasible location may be used.

Figure 3C:
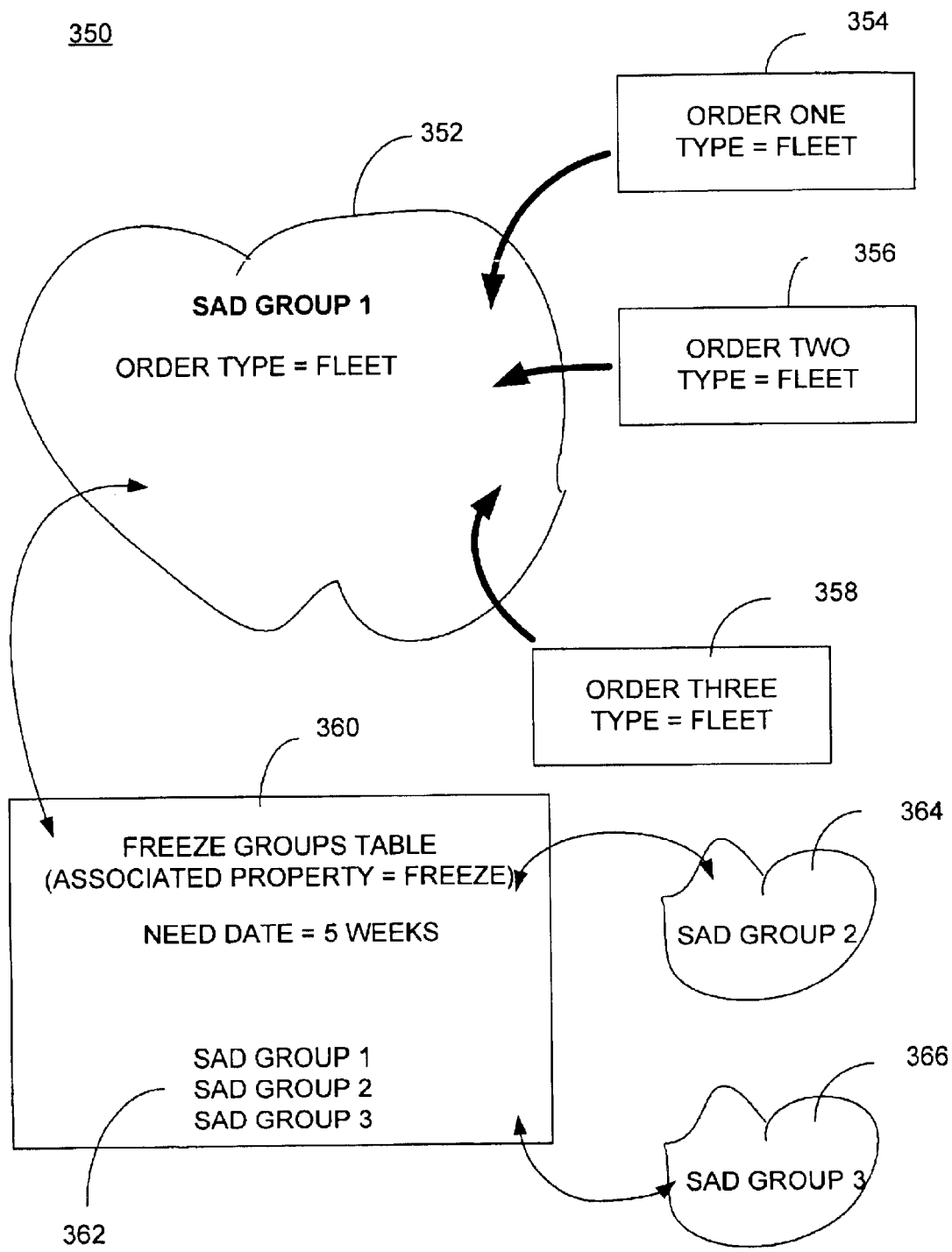
FIG. 3C is a block diagram depicting the relationship between a SAD group, orders and a freeze group table.

Referring to FIG. 3C, which is a block diagram 350 that depicts the relationship between a SAD group 352, orders 354 to 358 and a freeze group table 360. Each of the orders 354 to 358 has an attribute for order type, "fleet." Based on this attribute, the orders 354 to 358 are associated with the SAD group 352. The freeze group table 360 is associated with three SAD groups 352, 362 and 364. Because the SAD group 352 is associated with the freeze group table 360, each order associated with the SAD group 352 will be frozen and thus, orders 354 to 358 will be assigned to the specified time (e.g., 5 weeks).

Order Planning

At step 228 of FIG. 2B, the use of resources for fulfilling one or more orders is planned. The ABP system 100 may implement a prioritized greedy algorithm. The algorithm processes orders, one at a time, evaluating potential assignments (bucket, resource and location) for the order. The algorithm selects the most suitable assignment for the order by assessing the assignment using a user-defined multi-tiered objective function and ensuring that the assignment is feasible with respect to both material and capacity constraints.

Figure 4:
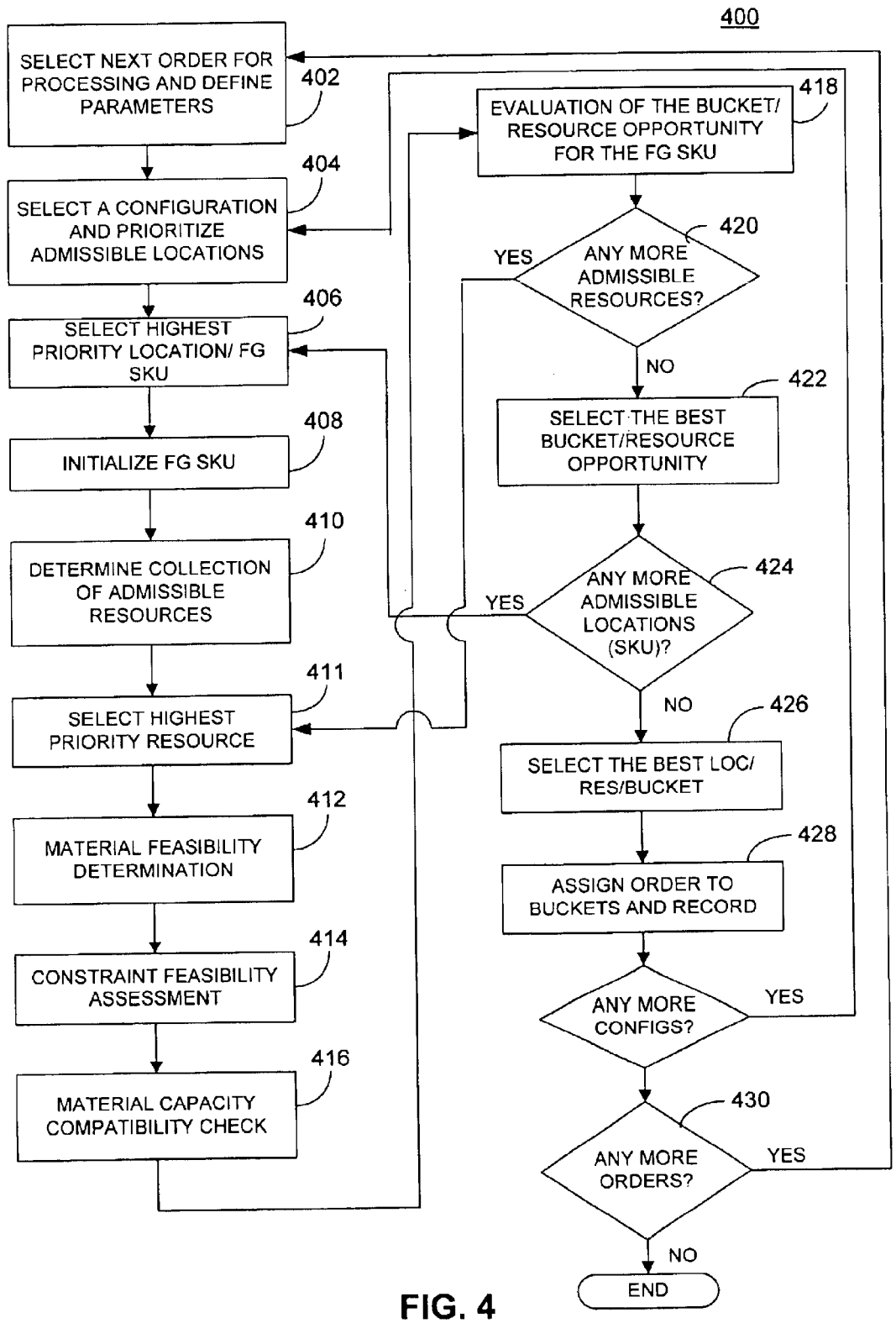
FIG. 4 is a flow diagram of process for resource planning in order to fulfill demand as defined by order[s]

FIG. 4 is a flow process 400 for resource planning in order to fulfill demand as defined by order[s] and generally represents step 228 of FIG. 2B. In particular, this is an attribute based planning process. The process 400 processes the orders that were prioritized and generates a plan for fulfilling the orders by optimal utilization of resources. A brief description of each of the steps depicted in FIG. 4 is provided below followed by a more detailed description of the steps. In step 402, an order is selected for processing. The process step 402 may also include the step of defining parameters for planning the order. At step 404, select a configuration and prioritize admissible locations. Every order has an item and it may have a location preference. If it has both, the finished good SKU has been identified. If it only has an item, then the system will preferably generate a prioritized list of SKUs (the item with a feasible location) identify the finished goods associated with the selected order and create a collection of finished goods SKUs (herein "FG SKU") from the order. Step 404 results in the determination of admissible locations for each FG SKU in the collection since an SKU will typically define a locations. One or more configurations may be associated with each SKU. Therefore at step 404, a configuration is selected (permissible configurations were loaded previously—see flow process 220, FIG. 2B, step 224). In step 406, a SKU from the collection of FG SKUs is selected for planning. The FG SKU selected will generally be the SKU having the highest priority in the collection that is yet to be planned. At step 408 initialize FG SKU so that the FG SKU will have all the attributes of the corresponding order and/or item. Based on the selected SKU, determine which of the resources are acceptable resources to use for planning the SKU and sort the resources according to priority at step 410. Note that a list of admissible resources may have been loaded and/or determined when the slice of orders together with associated date were loaded into the window at step 224 of FIG. 2B. At step 411 select the resource with the highest priority on the list. At step 412, a material feasibility determination is made to determine whether the location/resource has sufficient materials to satisfy demand as defined by the order and if not, whether the material is replenishable. In step 414, a constraint feasibility assessment is made on the resource. A material capacity compatibility check is made at step 416. At step 418, the bucket/resource opportunities for the FG SKU are evaluated and the best opportunity is selected as the "best one" for the location. After evaluating the bucket/resource opportunity for a specific location at step 418, determine whether there are any more resources to be checked at step 420. If there are other acceptable resources for the same location then return to step 411 and select another resource for evaluation. If there are no more acceptable resources at the same location than select and memorize the best bucket/resource opportunity at step 422. At step 424, determine whether there are any more acceptable locations. If so, then return to step 406 and select another location. If there are no more acceptable locations, then select the best location/resource/bucket at step 426. At step 428, assign the order to the best location/resource/bucket. At step 430 determine whether any more orders need to be planned. If there are other orders need to be planned then the process 400 restarts from step 402, otherwise the process ends.

Figure 5A:
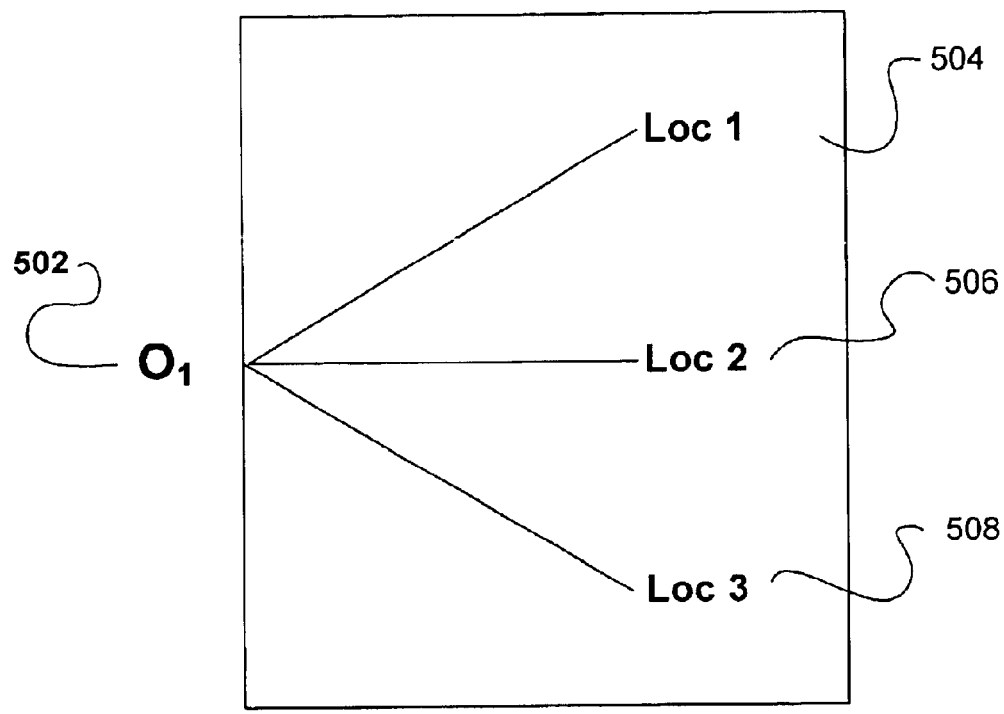
FIGS. 5A to 5H are block diagrams depicting an exemplary process for resource planning in order to fulfill an order.

The following simplified example, together with FIGS. 5A to 5H, illustrates how the process 400 for planning the utilization of resources for fulfilling demand may be implemented. In this example, an order $O_1$ 502 has been selected for planning as shown in FIG. 5A. The order $O_1$ 502 was selected from a list of prioritized orders (not shown). Based on the information associated with order $O_1$ 502, a list of FG SKU (and hence admissible locations, Loc1, Loc2 and Loc3) can be determined. The admissible locations, in this case, are determined to be Loc1 504, Loc2 506 and Loc3 508. The admissible locations may also be sorted by preference. Thus, in this example, Loc1 504 is above Loc2 506 because Loc1 504 is more preferable than Loc2 506 and Loc2 506 is above Loc3 508 because Loc2 506 is more preferable than Loc3 508. This first step generally corresponds to step 404 of FIG. 4.

Figure 5B:
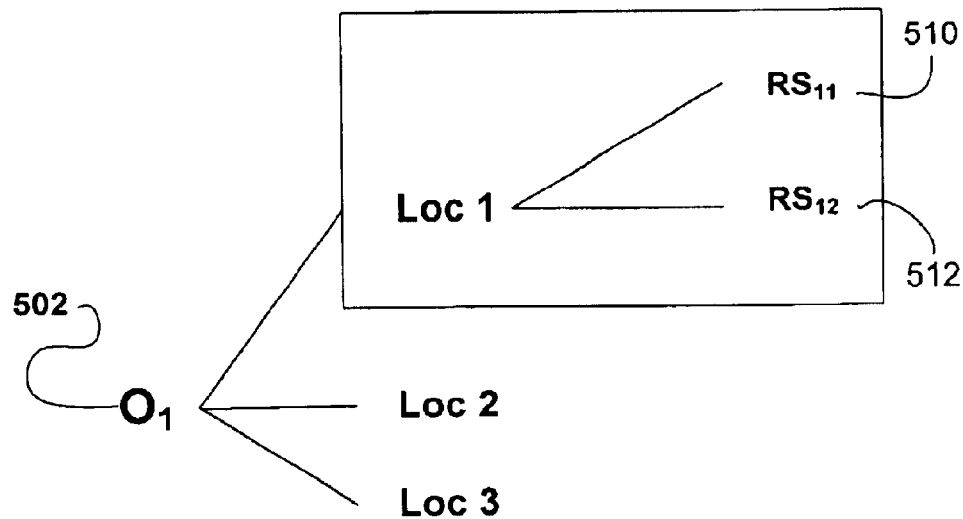
Figure 5C:
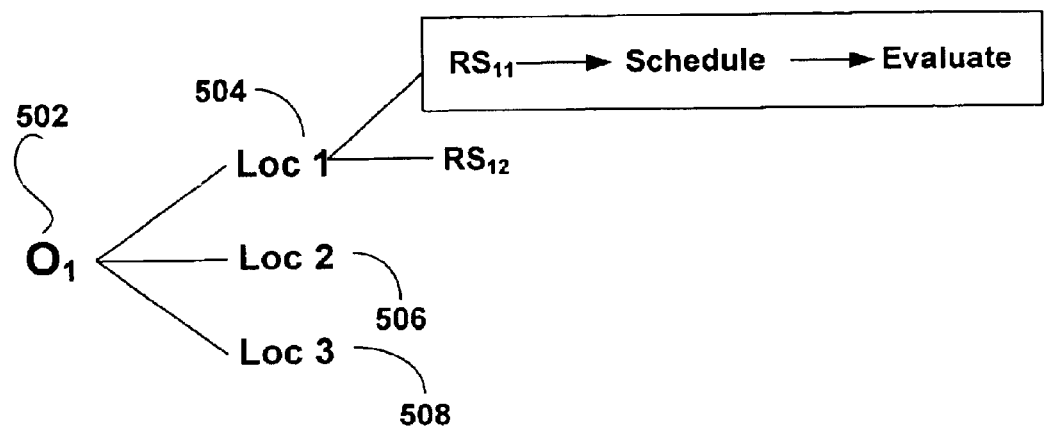

Next, the order-location pair ($O_1$, Loc1) is reviewed and a determination of the list of admissible resources for manufacturing the order $O_1$ at Loc1 is made. Once the list of admissible resources is determined, the list is sorted by preference as shown in FIG. 5B. In this figure, Resource $RS_{11}$ 510 is above Resource $RS_{12}$ 512 because Resource $RS_{11}$ 510 is of higher preference than Resource $RS_{12}$ 512. This step generally corresponds to step 410 of FIG. 4. In the next step (which generally corresponding to step 412), an attempt is made to schedule the order at the first resource $RS_{11}$ 510 on which the order can potentially be manufactured at location Loc1 504. The scheduling opportunity for the combination ($O_1$–Loc1–$RS_{11}$) is then scheduled, evaluated and graded (this step generally corresponds to step 414) as shown in FIG. 5C.

Figure 5D:
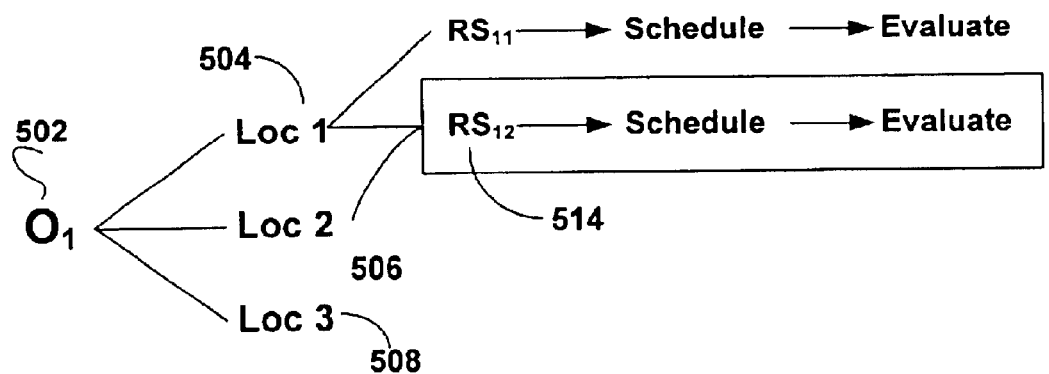
Figure 5E:
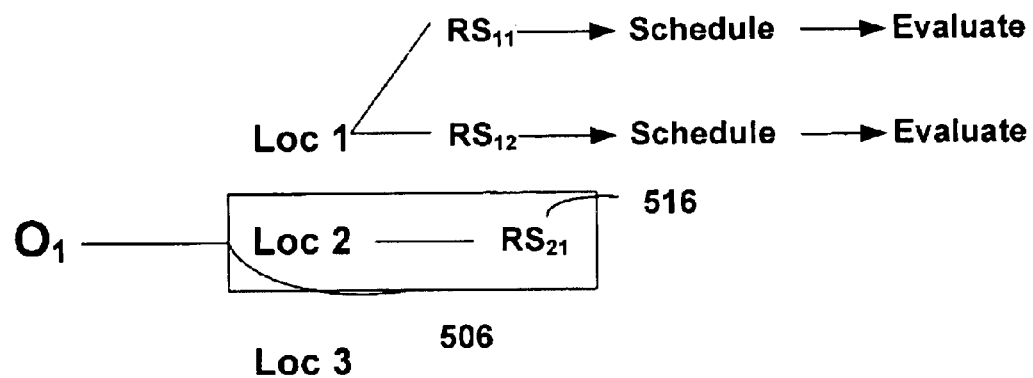

Next, the last two steps (i.e., steps 412 and 414 of FIG. 4) are repeated for resource $RS_{12}$ 514 as shown in FIG. 5D. In this case, the grade for the scheduling opportunity for (O.sub.1–Loc1–$RS_{12}$) is found to be better than the one calculated for ($O_1$–Loc1–$RS_{12}$), thus the scheduling opportunity on ($O_1$–Loc1–$RS_{12}$) is the best scheduling opportunity found so far and is memorized as the best for Loc1 504.

Once all of the admissible resources in Loc1 504 have been evaluated, the next location (location Loc2 516) in the list of admissible locations is examined as depicted in FIG.

Figure 5F:
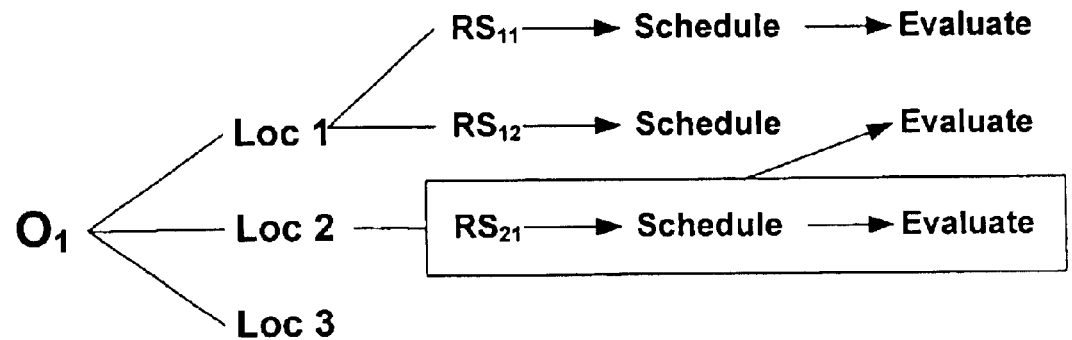

5E. There is only one admissible resource, $RS_{21}$ 518 at Loc 2 506 for order $O_1$ 502. An attempt to schedule on resource $RS_2$, 516 is made as shown in FIG. 5F and the results evaluated. If successful, the scheduling opportunity for ($O_1$-Loc2-$RS_{12}$) is compared to the scheduling opportunity for ($O_1$-Loc1-$RS_{12}$) to determine the best order/location/resource combination. A comparison may be made to compare the fitness computed with the "best so far" and save the current scheduling opportunity as the "best scheduling opportunity found so far" if its fitness exceeds the best fitness found so far. In this case, the scheduling opportunity for ($O_1$-Loc2-$RS_{12}$) is found to be the "best so far."

Figure 5G:
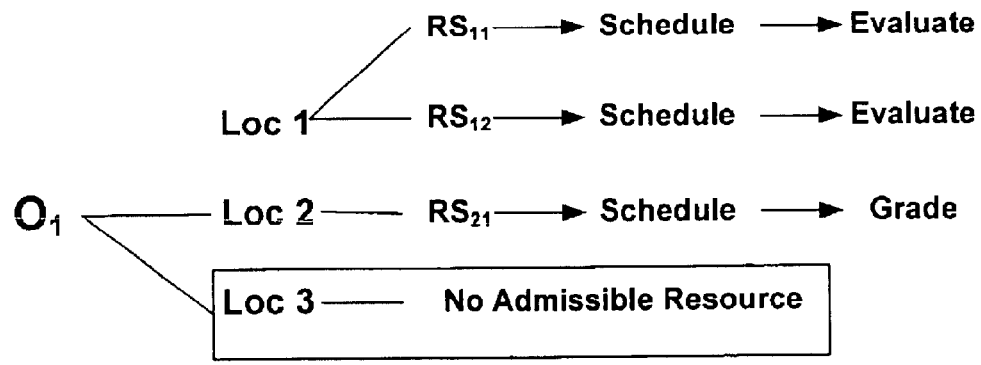
Figure 5H:
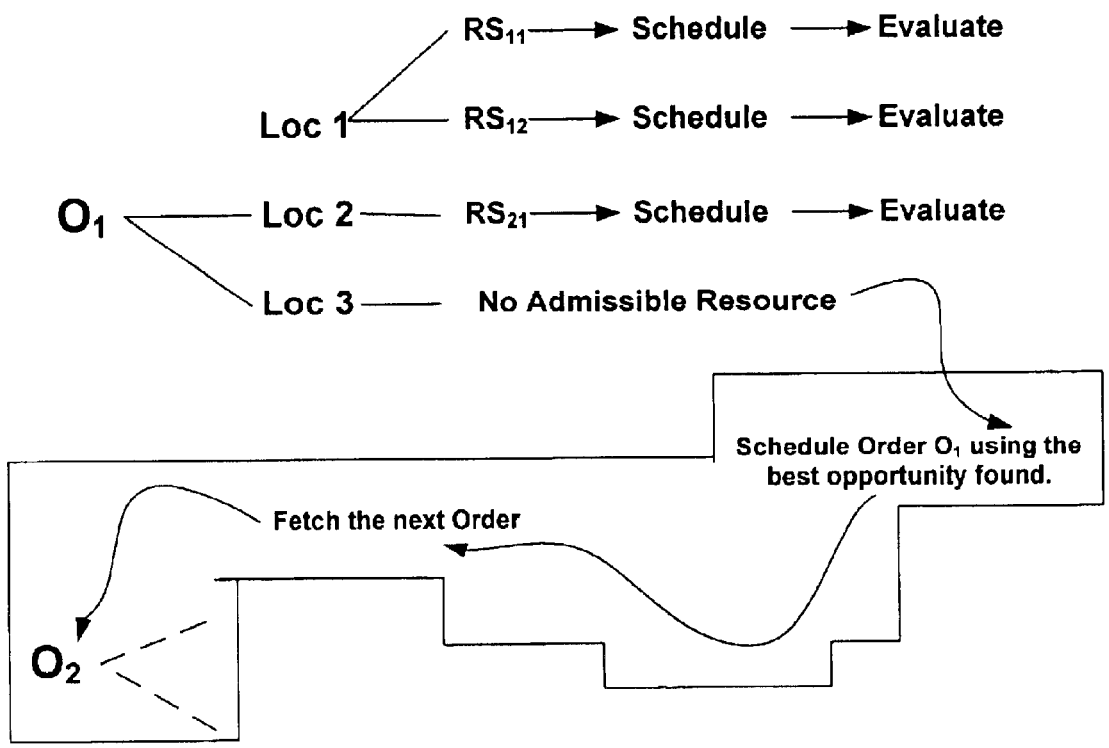

Since all the resources in the list of admissible resources for $O_1$ at Loc 2, the next location in the list of locations for $O_1$ is reviewed. However, as depicted in FIG. 5G, there are no admissible resources for Loc3 518. The scheduling information for the best scheduling opportunity found so far, ($O_1$-Loc2-$RS_{12}$), is then memorized, update availabilities on all the constraints, and fetch the next order and process it in a similar manner as shown in FIG. 5H.

A more detailed description of specific steps and concepts introduced in flow process 400 of FIG. 4 are provided below. In step 402, the next or the first priority order (i.e., from the sorted order list) is selected for processing. During this step, constraints and/or rules may be defined providing parameters for planning the order. The constraints and/or rules will generally be based on the information associated with the order selected. Note that this step and all subsequent steps may be repeated in a loop until all the orders in the current priority group are processed. Also note that the feasibility for all configurations and all resources need not be checked. Once a good enough result has been obtained, the process may be stopped.

Figure 5I:
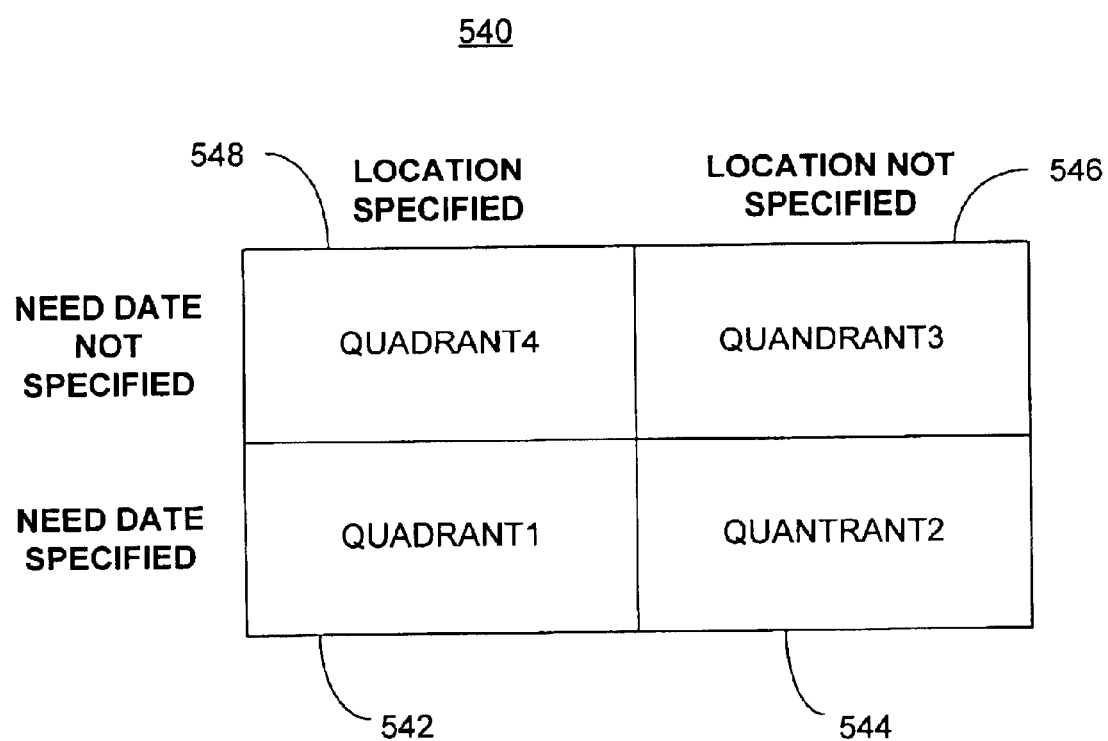
FIG. 5I is a black diagram depicting various combinations of order attribute values for exemplary orders.

To illustrate how parameters defined in the processing step 402 may affect the way an order is scheduled, the following simplified order-processing example is provided. Suppose an auto manufacturer accepts orders having three attributes: item name, location and need date. The item name could be the name of the model of an automobile built by the manufacturer. The location is the plant location or any delivery location such as the customer's location. The need date indicates the completion date of the auto. Referring now to FIG. 5I, which is a block diagram 540 showing the various combinations of order attribute values possible for orders for auto model "Sedan." Quadrant1 542 represents an order that specifies both the need date and location from which the order has to be fulfilled. The order in quadrant1 542 would specifies SKU="Sedan" (i.e., item name), "Atlanta" (i.e., location), and "Week 5" (i.e., need date). In this case, the ABP system 100 may solve for a suitable bucket/resource opportunity for the order, subject to certain conditions. For example, preferably the bucket will fall in the acceptable scheduling interval for the order. The acceptable scheduling interval is, for instance, between [need date−maximum earliness allowed] and [need date+ maximum lateness allowed]. The resource is preferably at the location specified on the order (implied by the SKU specified on the order). The assignment is preferably feasible with respect to both material and other applicable hard constraints. The bucket/resource opportunity should preferably be the best across all potential opportunities or be one where the grade corresponding to every objective in the objective function is below a specified threshold. A multi-level objective function is used to assess the best bucket/resource opportunity. The ABP system 100 may allow for a number of metrics, each having a level. A user may choose from a predefined, extensible list of metrics and assigns SAD Groups (to tell which orders are applicable) and levels of the metrics. The user can also specify a tolerance that tells how close two metrics need to be before the values are considered equal. For example, if the difference is 0.1 then two metrics having values 2.01 and 2.02 are considered as having the same value. When two opportunities are compared for a given order, levels in the metric are checked from highest priority to lowest priority. The first level that is different within the tolerance tells which opportunity is better.

Quadrant2 544 represents an order that specifies a need date but no location is specified. For example, the order specifies the item as sedan and need date as week 5. In this case, the ABP system 100 solves for a suitable bucket/resource opportunity for the order, subject to certain conditions. Preferably the bucket fall in the acceptable scheduling interval for the order. The resource can be at any location. The assignment must be feasible with respect to both material and all applicable constraints. The bucket/resource opportunity preferably is either the best across all potential opportunities or is one where the grade corresponding to every objective in the objective function is below a specified threshold.

Quadrant3 546 represents an order that does not specify either a need date or location. For example, the order specifies just the item, Sedan. In this case, the ABP system 100 solves for a suitable time bucket/resource opportunity for the order, subject to certain conditions. For example, preferably the time bucket can be anywhere in the planning horizon. The resource may be at any location. The assignment will preferably be feasible with respect to both material and all applicable constraints. The bucket/resource opportunity will preferably be either the best across all potential opportunities or be one where the grade corresponding to every objective in the objective function is below a specified threshold.

Quadrant4 548 represents an order that does not specify a need date but does specify a location. For example, the order may specify an item, Sedan, and a location, Atlanta. In this case, the ABP system 100 may solve for a suitable bucket/resource opportunity for the order based on certain constraints. For example, the bucket may be anywhere in the planning horizon. The resource is preferably at the location specified on the order. The assignment is preferably feasible with respect to both material and all applicable constraints. The bucket/resource opportunity is preferably either the best across all potential opportunities or is one where the grade corresponding to every objective in the objective function is below specified threshold.

At step 404 (of FIG. 4), a configuration is selected for the order that was selected in step 492 admissible locations are determined and prioritized based on the order attributes. A collection of finished good SKUs for the order may be determined. The FG SKU may have been loaded into the orders window in step 224 of FIG. 2B. The collection may be determined based on certain criteria. For example, if a SKU has been specified on the order, that SKU is the only finished good SKU in the collection. To illustrate, suppose an order is for a sedan in Atlanta, then only that FG SKU may be included in the collection. On the other hand, if the order specifies an item, then all SKUs for that item are possible finished good SKUs regardless of location. For instance, if the order only specifies Sedan, any SKU having Sedan as the item regardless of location (i.e., Atlanta or any other city), are possible finished good SKUs (assuming that these SKUs exist). If there are multiple FG SKUs in the collection, these FG SKUs may be sorted using an extensible interface. Sorting is done to guide the ABP system 100 to plan the order using the most preferred SKUs (and therefore, at the most preferable locations) before planning for the SKUs with a lower preference. The ABP system 100 may support a base implementation of the interface that sorts the SKU collection according to transportation costs from the SKU location to the destination location on the order. These costs may be modeled using a location-by-location transportation matrix. For instance, a table may be created that allows the user to specify that Atlanta→Denver costs 1.0 per unit, Atlanta→Dallas costs 0.75 per unit, etc. If no entry is present, then the finished goods may not be moved between the given locations.

The determination of the collection of FG SKUs will, in essence, result in the determination of a list of admissible locations. SKUs are location dependent. Therefore, once all acceptable SKUs are identified, admissible locations will also be identified.

The collection of FG SKU may be sorted by preference. That is, certain FG SKU may have a higher priority than other FG SKUs based on, for example, location preference. This location preference may be due to customer preference or manufacturer's preference or some third party's preference.

In step 406 (of FIG. 4), select an admissible location for planning with the highest priority. Generally this will be a location based preference. Therefore, the FG SKU with the most preferable location will be selected first for planning.

At Step 406 (of FIG. 4), initialize the FG SKUs specific to a single finished goods SKU-Order combination whereby attributes are copied to the order not to the SKU. Attributes associated with various entities (e.g., orders, SKUs, items and the like) in the ABP system 100 may be modeled at three levels, Item, SKU and Order levels. Production, design or marketing related attributes that are specific to an item (and have a bearing on planning), may be modeled at an item level. Attributes modeled at the item level generally apply to all SKUs (regardless of location) for the given item. Attributes that are specific to an item at a given location and that apply to all orders planned at that location is preferably modeled at the SKU level. Attributes that are specific to an order (that tend to vary across orders based on customer preferences) may be modeled at the Order level. If an order has a value for an attribute it is used. If an order does not have a value for an attribute but its associated SKU does, then the SKU value is used. If neither the order nor the SKU have a value for an attribute and the item does, then the item value is used. If the order, the SKU, and the item do not have a value for an attribute, no value is used for the order.

During the Initialization step, a determination of all applicable SAD groups may be made. All the SAD groups that describe the FG SKU Object are determined. This may be done by matching the attributes (Boolean combination of name-value pairs) on the SAD group against the attributes (name-value pairs) on the FG SKU Object. In doing this, determine which SAD groups are location (and thus resource) dependent. This step may be, undertaken so that multiple checks on SAD group applicability will not be done twice for the same order, or for the same order/resource combination (for location-dependent SAD groups). The initialization step may also include the step of calculating the effective need date of the order. The effective need date is the actual date when the finished goods are needed when taking into account the transportation time for delivering the goods to the requested location. The effective need date of the order may be calculated if the order is to be fulfilled using the given finished good SKU. This calculation may be accomplished, for example, by following certain steps. For example, if there is an arrival date on the order, then [Effective Need Date=Arrival Date−Transportation Time from the Customer location on the order to the given finished good SKU's location]. If there is no arrival date on the order and there is a need date on the order, then [Effective Need Date=Need Date on the order]. If there is neither an arrival date nor a need date on the order, then [Effective Need Date=NULL]. The initialization step may include the step of calculating the valid scheduling interval for the FG SKU object. If there is an effective need date, preferably use the maximum earliness and lateness parameters to calculate the valid scheduling interval. If there is no effective need date, the valid scheduling interval is the planning interval. An early/late table may be created and defines by SAD group, how late or how early orders may be scheduled relative to their effective need dates. If the order has no need date, this table has no effect. Sequence numbers that determines priority may be assigned to the SAD groups of this table. If multiple SAD groups in this table apply to the FG SKU object, then the sequence numbers can be used to determine the SAD Group (and therefore the maximum earliness and maximum lateness parameters) that has the highest priority.

In step 410, the ABP system 100 determines which resources are acceptable or admissible resources for the FG SKU and creates a list of potential resources. These admissible resources may then be sorted so that those resources that have higher priority or preference than resources with lower priority will be checked first before the lower priority resources are checked to determine scheduling opportunity. The determination of admissible resources will generally depend upon several factors. For example, only those resources located at an available location will typically be considered as possible resources. Other factors may prevent specific resources from being considered. For instance, conceptually, there are at least two factors that may limit this set of resources, resource location and dedicated resource groups. The resource location factor is when a resource is not at a location defined for the finished good SKU object. Such a resource would be excluded from being considered as a potential resource. The dedicated resource groups factor is when a resource is associated with a dedicated resource group. The exclusivity of dedicated resource groups may be defined by creating dedicated resource SAD Groups. For example, suppose a dedicated resource group includes the assembly line 1 in Atlanta and the assembly line 1 in Denver. The exclusivity of this dedicated resource groups may be defined by the SAD Group "Item=Sedan OR Item= Minivan". The FG SKU Object under consideration may be "SUV in Atlanta, Color=Red, Power Window=Yes, Interior= Leather". In this case, Line 1 in Atlanta is part of a dedicated resource group that manufactures only Sedans and Minivans. Although location for the FG SKU Object is Atlanta, assembly line 1 is not an admissible resource since the item corresponding to our FG SKU Object is a SUV. When admissible resources are identified, they may be sorted such that the most preferred resources are checked first for scheduling opportunities before less preferred resources are checked.

At step 411, select the resource with the highest priority if the resources have been sorted. If the collection of admissible resources have not been sorted by priority than the system may select randomly or by any other selection methods defined by system users.

In step 412, the material feasibility of FG SKU Object is assessed. This step determines whether the resource[s] previously selected will have sufficient "material" supplies to provide the needed quantity of the FG SKU object within the acceptable time period. "Material" may be component parts or materials or the finished goods itself for the requested finished good. Based on the FG SKU Object determined previously, the ABP system 100 may search multiple configurations (in the order of preference) at each level in the Bill of Material ("BOM"). The search may allow for substitutions in order to find the best material configuration for the finished good SKU.

To appreciate the material feasibility capabilities of the ABP system 100, the concept of "buckets" is described as follows. The ABP system 100 is preferably a bucketed planning system. That means that the system attempts to plan orders into buckets. Buckets may be created for each constraint. Buckets for a constraint may be defined by a combination of a calendar, the model horizon and properties of the constraint. A calendar may be created and used to define the number of buckets and the duration of each bucket available. The model start is used to determine the actual start date and end date of each bucket The plan horizon+the constraint start delta determines where the first bucket start will be. This is because the ABP system 100 needs to roll from period to period. For instance, suppose a user is making plans on a Monday, the $1^{st}$, for the following Monday, the $8^{th}$. The horizon start will be Monday the 8th and the constraints will typically have a zero offset so that the first bucket for all of the constraints will be Monday the 8th. When the following week arrives, the user will be planning on Monday the 8th for Monday the 15th and the user's plan horizon will be set to Monday the 15t. Since my offsets are zero, my bucket starts will be Monday the 15th. Note that by changing the plan horizon start causes the entire system to adjust. Obviously if there were a constraint that started one week after the horizon start, when planning for Monday the 8h, the first bucket would be Monday the 15h. When the following week arrives and planning commences for the following Monday the 15h, the first bucket will be 7 days after that or Monday the $22^{nd}$. Each bucket may comprise of one or more components including time (the width or duration of the bucket), maximum capacity (the desired maximum number of orders that should be placed in the bucket), relaxed maximum capacity (the absolute maximum number of orders that can be placed in the bucket), and minimum capacity (the minimum number of orders that should be placed in the bucket).

The capacity of each bucket may be controlled by constraint rules. Constraint rules essentially restrict the capacity of each bucket or a group of buckets. According to one embodiment of the invention, at least three types of constraint rules are possible, value, percent and smooth. The value constraint rule provides a mechanism for defining an incremental change of a capacity from one bucket to the next. The percent constraint rule is similar to the value rule except that the value defined on the constraint is interpreted as a percentage rather than some set amount. The incremental change from one bucket to the next is a percentage of the constraints' capacity. The smooth constraint rule interprets the value defined on the constraint rule as a percentage of the total potential load against the constraint. This percentage of the load is distributed among the planning buckets defined by the bucket range columns, prorated among the buckets based on the total available time in the bucket. The number of orders that the constraint applies to is divided by the number of buckets to get the maximum capacity for each bucket. The remainder may be spread among the buckets according to some round off rule (randomly, forward from the first bucket or backwards from the last bucket, or by incrementing all buckets). Note that the smoothing rule handles telescoping buckets by computing the amount of load per unit available time and multiplying this ratio by the amount of available time for each bucket.

Material Feasibility

Figure 6:
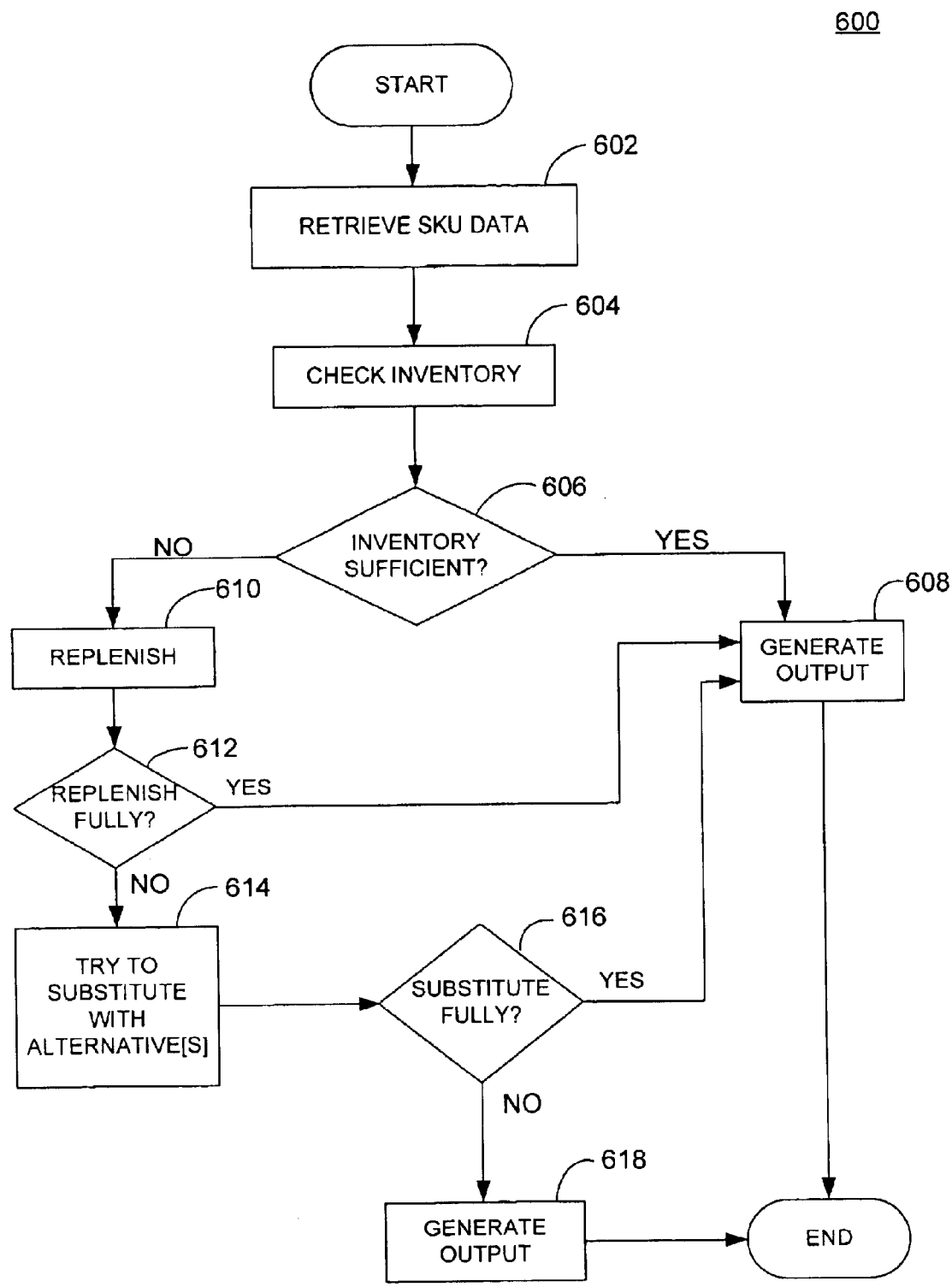
FIG. 6 is a flow diagram for a process to determine material feasibility.

Referring to FIG. 6, which is a flow process 600 for determining material feasibility. The output of the process 600 is information relating to the feasibility of the material needed and may be highly useful for the overall planning process. Such information may include, for example, material available date, material available quantity, feasibility flag, and the like. The output may be in a form of graphical, text or quantitative report. The feasibility flag indicates whether the process 600 was successful in finding the material supply needed for the selected resource[s]. If the feasibility flag indicates that the process has been successful then the quantity available will generally be equal to the quantity needed, and the quantity will be available before or on the last day that is acceptable (need date+maximum lateness). If one or the other or both conditions have not been met, the feasibility flag will indicate that the process has been unsuccessful. Preferably, an attempt is made to find the earliest available supply on or before the maximum earliest date that satisfies the need quantity. At step 602 retrieve order data. At step 604, check the inventory of the selected resource to determine material inventory levels. After a determination on the sufficiency of the inventory, the ABP system 100 may generate an output relating to the availability date of the inventory and the inventory quantity that will be available. The availability date of the inventory will be the date when the inventory will be available for use. The available inventory quantity may be, for example, the inventory and scheduled receipts amounts by the available date. At step 606, determine whether the quantity available will meet the need quantity. To check the inventory and make the determination on whether the inventory will meet the need date and quantity, data relating to, for example, order attributes, Effective Need Date, Need Qty, Maximum Earliness, Maximum Lateness, and the like, may be used. If the inventory is determined to be sufficient then generate an output at step 608. If on the other hand, there is insufficient amount in the inventory to fulfill the need quantity, then the inventory must be replenished at step 610 by either making and/or purchasing new inventory. Replenishment of the inventory may be accomplished by making, purchasing and/or substituting the inventory. The making, purchasing and/or substitution replenishment functionalities of the system are discussed in greater detail below. At step 612, determine whether the replenishment step 610 was sufficient to satisfy the need quantity. If so, then an output is generated at step 608. If the replenishment step 610 was insufficient, then attempt to make up the difference with an alternatives at step 614. The substitution step 614 is discussed in greater detail below. At step 616 determine whether the substitution step 614 was successful in making up the shortfall of the replenishment step 610. If the substitution step 614 was successful then generate an output. If the substitution step 614 was not successful then generate an output at step 618. Note that the outputs generated by steps 608 and 618 will be different. The output generated at step 608 will preferably contain the available quantity (which should be the same as the need quantity), available date and an indication such as the feasibility flag indicating a "yes" that the need quantity was satisfied before or on the last acceptable date (Need date+Maximum Lateness). The output generated at step 618 will preferably contain the available quantity (which will be less than the need quantity), available date and an indication such as the feasibility flag indicating a "no" that the need quantity was not satisfied before or on the last acceptable date (Need date+Maximum Lateness).

The check inventory step 604 will generally require that the there be an exact match between the attributes of the FG SKU object and the inventory attributes. However, in an alternative embodiment, an exact match of certain attributes may not be required for certain attributes called reserve attributes. For example, suppose if the attributes of a order is the following, item=Sedan, color=red, and power windows=yes. Generally for an inventory to match this SKU, each of these attributes must exactly match. However, suppose that an additional attribute for "customer," which is a reserve attribute, is included. The attributes for the order could now be item=Sedan, color=red, power windows=yes, and customer=Southwest dealers. If the inventory has the same first attributes (item=Sedan, color=red, power windows=yes), but does not have a customer attribute present, than the inventory attribute matches attributes of the FG SKU object. However, on the other hand, if the inventory did have a customer attribute as Northwest dealers than there would be no match.

Figure 7A:
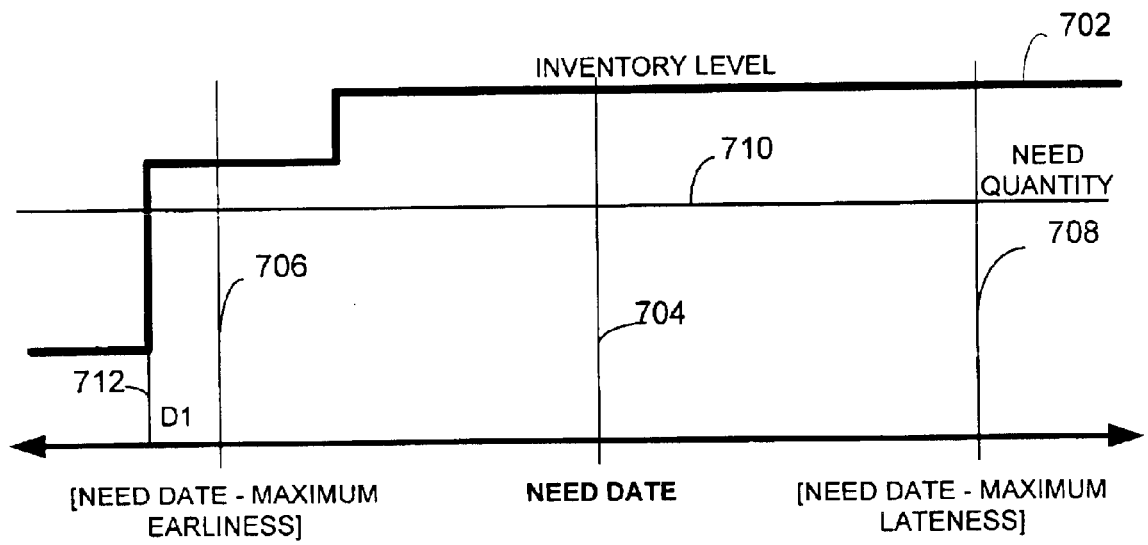
FIGS. 7A to 7D are timelines that depicts an exemplary inventory level and need quantity over a period of time.
Figure 7B:
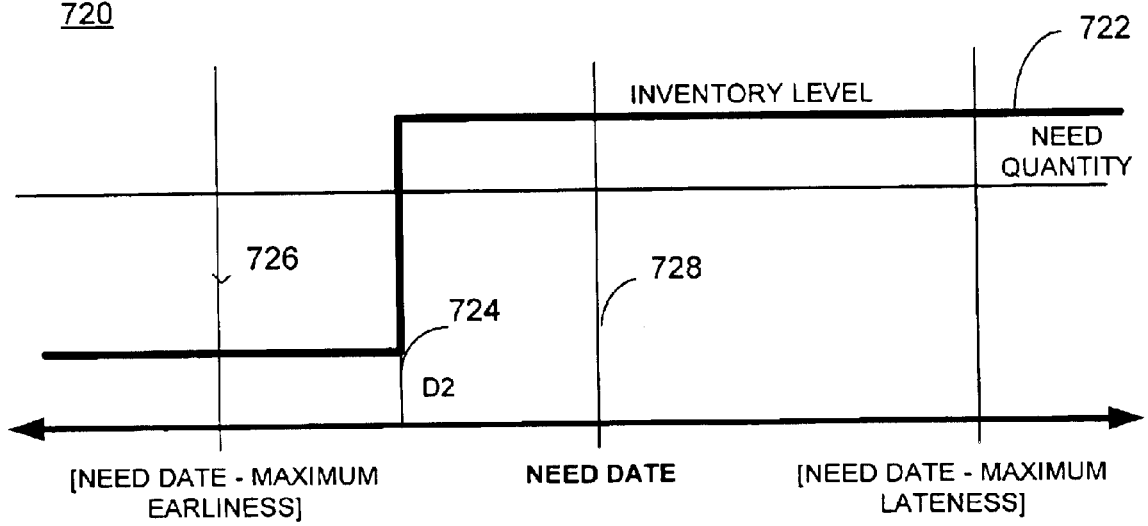
Figure 7C:
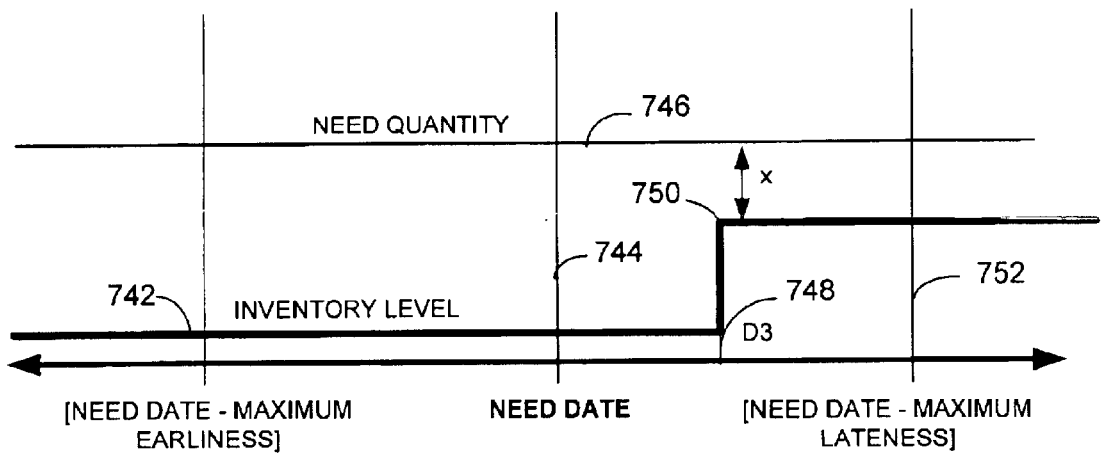
Figure 7D:
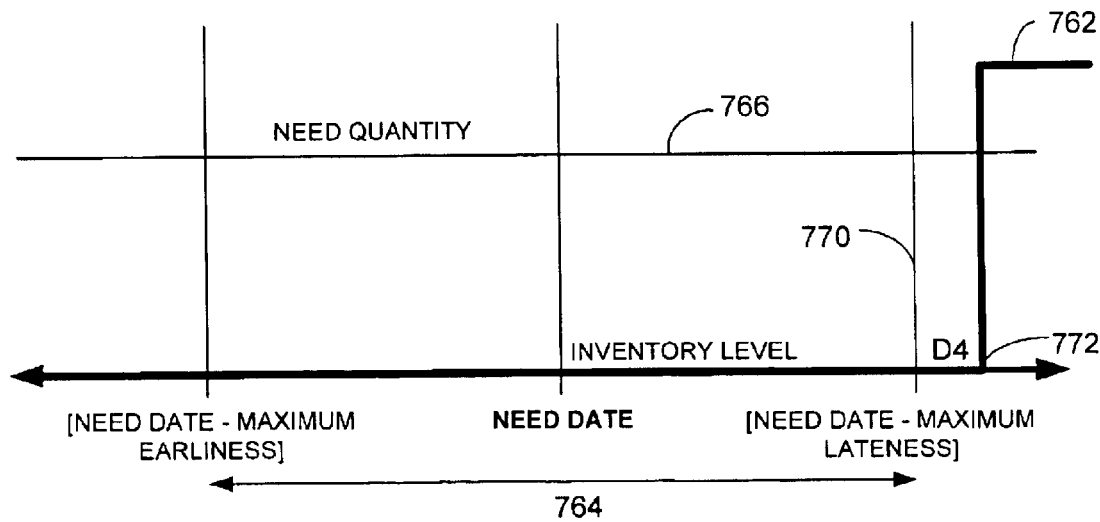

The netting logic of the inventory check step, 606 of FIG. 6 may be best understood with reference to FIGS. 7A to 7D, which are exemplary timelines depicting inventory levels and need quantity over a period of time. FIG. 7A depicts inventory levels 702 rising during the early part of the timeline 700. The need date is depicting as vertical line 704. The earliest acceptable date is indicated by the vertical line 906, which is equal to the need date minus maximum earliness. The latest acceptable date is indicated by vertical line 708, which is equal to the need date plus maximum lateness. Thus, the time interval between vertical lines 706 and 708 is the acceptable time period. The need quantity is indicated by horizontal line 710. Since in this timeline 700, the inventory level 702 rises early in the timeline 700, the inventory available date D1 710 is before the earliest acceptable date 706. The inventory available date 712 is the date in which the inventory is at its maximum or the first date in which the inventory level exceeds or equals the need quantity. Therefore, in this timeline 700, the inventory needed is available from the earliest acceptable date 706. In the timeline 720 of FIG. 7B, the inventory level 722 rises much slower than the inventory level 702 of FIG. 7A. As a result, the, the inventory available date 724 is after the earliest acceptable date 726 but before the need date 728. Referring to FIG. 7C, which is another exemplary timeline 740. In this time line 740, the inventory level 742 rises even later in the timeline (after the need date 744) and never reaches the need quantity 746. The available inventory date 748 in this case will be earliest date in which the inventory is at its maximum (as indicated by 750) prior to the latest acceptable date 752. To make up the difference between the maximum inventory level 750 and the needed quantity 746, the inventory may be replenished and/or partially or fully substituted with alternatives (as depicted in steps 610 to 614 in FIG. 6). FIG. 7D is exemplary timeline when the inventory level 762 remains zero throughout the acceptable time period 764 and does not rise to the need quantity 766 until after the latest acceptable date 770 as indicated by the inventory available date D4 772.

Replenishment

To better understand the multiple approaches that may be used to replenish, the following sections describes several concepts and terms including bill of material (herein "BOM") and Configurations.

In order to fully appreciate novel aspects of the present invention, it may be helpful to first briefly discuss the overall high level relationships between orders, BOMs, SAD groups, configurations and the like. The ABP system 100 plans the use of resources based on orders received. Orders may represent customer demand, forecasted customer demand and/or a safety stock (to provide a hedge against unforeseen demand). Each order will have attributes. There may be more than one order for the same SKU. For example, suppose there is a SKU with the attributes sedan@Atlanta. Two orders may be associated with that SKU, one for a sedan@Atlanta with a request for an optional feature, power windows, while a second order for sedan@Atlanta with no request for power windows. SAD groups are separate from the orders and may be used to group the orders. One way to view a SAD group is to view it as a filter. SAD groups are used in multiple places. For example, they are used to define the processing sequence as well as determining which orders can be made on which resources. A configuration may be viewed as a way to or a road map to building an item. It will typically list all the materials needed to fully build the item being sought. For example, in the above example, a configuration for the above sedan@Atlanta would list the materials (i.e., components) needed to build the sedan. There may be more than one configuration for each item because some materials may be substituted. The BOM defines or identifies all the configurations for the item being sought. The BOM also defines parent-child relationships. SAD Groups are used by the BOM in two ways. Each parent child relationship has a parent item and a child item. If one replaces the parent item with a SAD group one has an additional level of control. For example, one might say that the relationship applies to all orders for item sedan but only if they have an attribute for power windows. If desired, one could say that a relationship applies to all orders that have an attribute of power window regardless of the item. The other way that configuration use SAD groups is when deciding the allowable substitutions. Each substitution has a parent and a child item. The user may substitute a SAD group for the either item and have a finer level of control of the substitutions. The order rather than the associated SAD groups will have all the attributes necessary to identify all the materials (and configurations) that will be needed for the item being sought.

The BOM used by the ABP system 100 according to one embodiment of the present invention is attribute based. Unlike the BOM in traditional planning systems, the BOM used according to the present invention permits the modeling of option and rule based material requirements. The following example is provided to introduce concepts relating to BOMs. It is very common to find the following rules in, for example, today's automotive industries: all Sedans must have (regardless of what other options are present) a base set of common sub-assemblies A, B and C. Sedan models having sunroofs (but not power windows) require a sun roof assembly and a 10 W motor per car; Sedan models having Power Windows (but not sun roofs) require a power window assembly and a 10 W motor; and Sedan models having both Power Windows and sun roofs require a power window assembly, a sun roof assembly and a 15 W motor, a motor of higher wattage is required because of the additional load. Note that in this example, the presence or absence of options drives the requirements for materials. Also, material requirements may depend on the combinations of options that are present. In order to model these requirements, SAD groups are preferably included in the BOM. The SAD groups may be a SKU along with a Boolean combination of attributes.

A BOM plays an important role in determining material configurations for each order planned. In order to use BOMs of finished good, a BOM table is preferably created. The ABP system 100 attempts to find a feasible configuration of materials for each order by looking at the inventory of the finished good of the order, and exploding the BOM as necessary, checking each defined recipe. The necessary subordinates for a material are determined as follows, for each SAD group that describes the order, and for the item requested by the order, at least one recipe defined in the BOM table is generally necessary to manufacture the order. The same is true for subordinate materials, for example, the item and applicable SAD groups may be determined for the subordinate material and at least one recipe for each of these must be used to manufacture the subordinate materials. The SAD groups referred here are SAD groups related to materials rather than orders.

An "offset" can be defined for any item in the BOM. This offset defines the amount of time after production of the finished good SKU begins that this item is needed. The ABP system 100 may ensure that the lead time for starting production of the finished good SKU will always be at least as long as the longest offset of any item in the BOM for that finished good SKU.

Figure 8A:
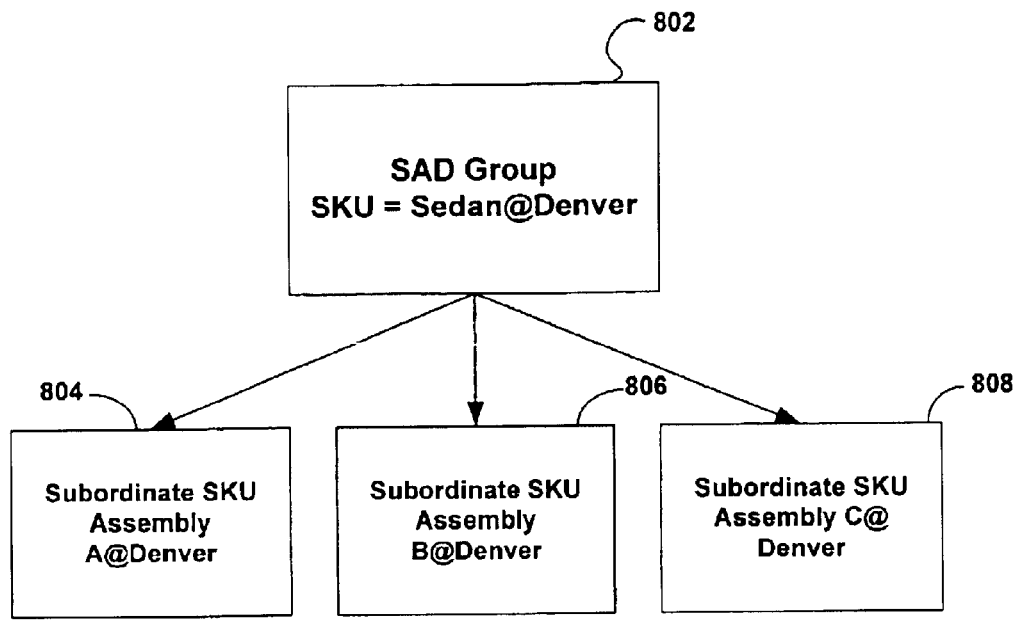
FIGS. 8A to 8C are block diagrams depicting visual representations of exemplary relationships between SAD groups and SKUs in the BOM.
Figure 8B:
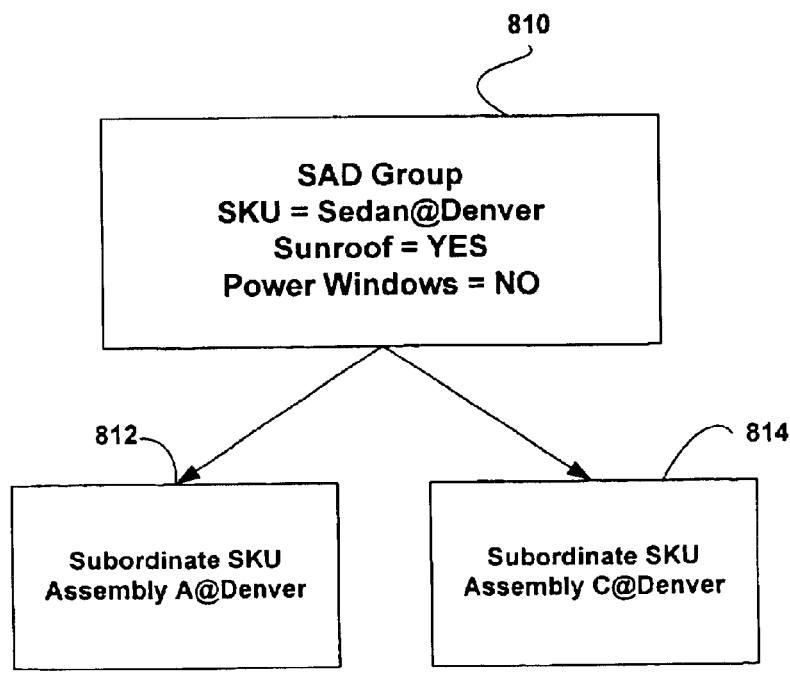
Figure 8C:
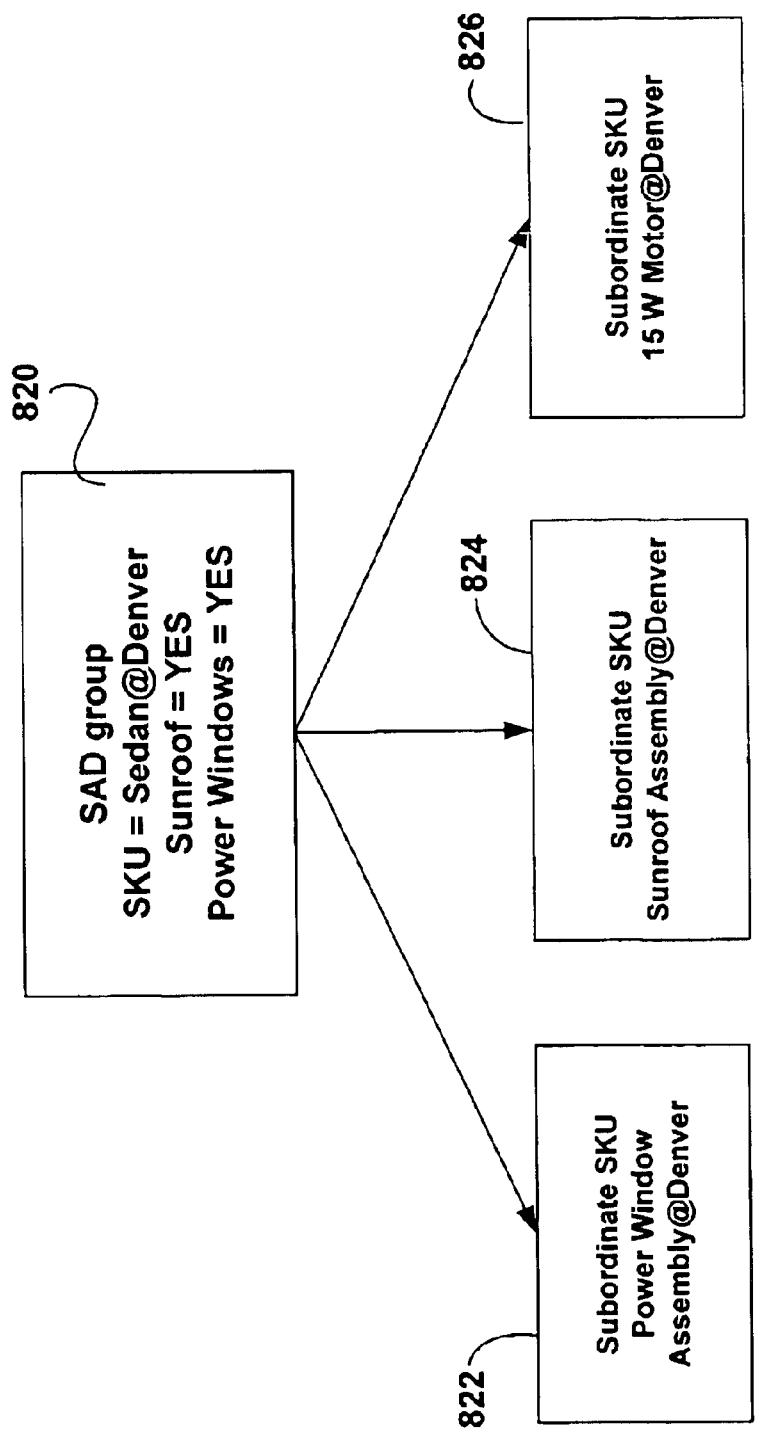

A configuration is essentially a list of subordinates that are required in order to manufacture the parent item, which may be, for example, the object of the order or an intermediate item used to manufacture other items. The parent can be replenished feasibly as long as at least one configuration can be replenished feasibly. The ABP system 100 provides two mechanisms for search and optimization when there are multiple configurations, greedy feasibility and best-fit. In greedy feasible, once the system finds a configuration that works, it stops searching for an acceptable configuration. An acceptable configuration may be defined as one that fulfills the need quantity for the SAD group within the planning interval [(need date–maximum earliness) or plan horizon start if there is no maximum earliness, (need date+maximum lateness) plan horizon end if there is no maximum lateness]. In best fit, the system search through all the configurations for the SAD group and selects the best configuration with respect to the scheduling goal. Preferably, the ABP system 100 uses SAD groups in the BOM to model subordinates based material requirements. Referring to FIGS. 8A to 8C, which are visual representations of exemplary relationships between SAD groups and SKUs in the BOM. FIG. 8A is a block diagram of a BOM that shows the "base" bill of materials for a Sedan in Denver. Thus, in this example, the BOM comprises of a relationships (which can use SAD groups), which defines the base material (e.g., parent item) and the associated subordinate SKUs. In this example, a SAD group 802 is defined by two SKU attributes, Sedan and Denver. Each Sedan manufactured in Denver requires certain materials regardless of other options or features that may be present. In this case, these required materials include subordinate SKUs 804 to 808 such as assembly A at Denver 804, assembly B at Denver 806 and assembly C at Denver 808. The relationship illustrated between the SAD group 802 and its subordinate SKUs 804 to 808 can be thought of as a level one BOM for a Sedan at Denver.

FIG. 8B is a block diagram representing another BOM. The BOM depicted here shows the components that are "additionally" required (above the three assembly components required by the level one BOM depicted in FIG. 8A) if a sunroof is configured as an option but not power windows. In FIG. 8B, a SAD group 810 is defined by several attributes including "SKU=Sedan@Denver", "Sunroof= Yes" and "Power Windows=NO." The SAD group 810 is associated with subordinate SKUs 812 and 814 for Sunroof Assembly at Denver and 10 W Motor at Denver. The subordinate SKUs 812 and 814 are the additional materials that will be needed if the Sunroof option is requested.

Referring to FIG. 8C, which is a block diagram of another BOM. This BOM shows the components that are "additionally" required if both a Sunroof and Power Windows are selected as options. The SAD group 820 is defined by several attributes including "SKU=Sedan@Denver", "Sunroof=YES," and "Power Windows=YES." The requirement for the sunroof and power windows option drives the need for additional materials. In this case, the SAD group 820 is associated with three subordinate SKUs 822 to 826, Power Window Assembly at Denver, Sunroof Assembly at Denver and 15 W Motor at Denver. Notice that a more powerful motor is required in this BOM than the BOM depicted in FIG. 8B (where only a 10 W motor was needed). This is because in the second scenario (i.e., FIG. 8C), there is a request for both a power windows and sunroof options whereas in the first scenario (i.e., FIG. 8B), the request was for only one power consuming option, the sunroof.

A key ingredient in planning is a concept called "configuration." A configuration is essentially a list of subordinate SKUs that must be used in order to manufacture a parent SKU. The concept of configuration may be understood with the following example. For each SKU, there is a corresponding BOM that has a list of recipes, which shows ways that it can be manufactured. An entire recipe is needed much as it would be needed when baking a cake. Also, as in baking, if there is a shortage of an ingredient, one may be able to substitute an ingredient with an alternative ingredient. The SAD Groups in the BOM records will determine when a subordinate is applicable. For example, suppose a Sedan requires a 10W motor, but a Sedan with a sunroof requires a 20W motor. The Parent SKU Sedan would have two BOM records, each with a SAD Group either specifying sunroof or no sunroof and 20W or 10W motor respectively. A configuration tells us which material needs to be used in which quantities. One would take a recipe+replenishments+ substitutions to get something that is buildable. As part of the work, netting is done against on-hand and future supplies of materials. For example, suppose a 10 W motor is needed and there is one on-hand. An order for a single car could come along and use it. The next order that comes along may also need a 10W motor. In order to supply the needed 10W motor, the motor must be either replenished (purchased), substituted, or not plan the order at all because not all of the material we need will be available. If it is manufactured, it is typically a subassembly and the subassembly has a set of material in various quantities that are needed.

Order 1 for Sedan could have the following set of material
   Sedan
      10W Motor
Order 2 for Sedan could have the following set of material
   Sedan
      10W Motor
         Motor casing So two orders for the same SKU and with the same user defined attributes could have different sets of materials supporting their manufacture.

An order is material feasible if at least one configuration can be replenished within the planning interval. Different configurations may have different material dates since they have different material and/or quantities in them. At least two mechanisms may be used for search and optimization when there are multiple configurations, "greedy feasible" and "best fit." In greedy feasible, the ABP system 100 selects the first configuration that is feasible rather than search through all alternative configurations for the best configuration. In contrast, in "best fit," the system searches through all the configurations for the corresponding order and selects the best configuration with respect to the scheduling goal. In greedy feasibility, once a configuration that is feasible is determined ("Feasibility" is defined as follows: the need quantity for the order can be fulfilled on or before the need date, the ABP system 100 does not search alternate configurations. For example, suppose two configurations, Config 1 and Config 2, are possible for an Order $_j$. If Config 1 is processed first and it is found that Available Quantity (Order $_j$)=Need Quantity using Config 1 by the need date (if present), the ABP system 100 will generally not look at any more configurations for the Order$_j$. In other words, Config 2 is not even considered. The process exits the loop and processes the next Order. In best fit, the system does not stop searching once it finds a feasible configuration. Instead it searches through all the configurations for the Order $_j$, and selects the best configuration with respect to the scheduling goal. So both Config 1 and Config 2 are processed. The better configuration is selected.

Figure 9:
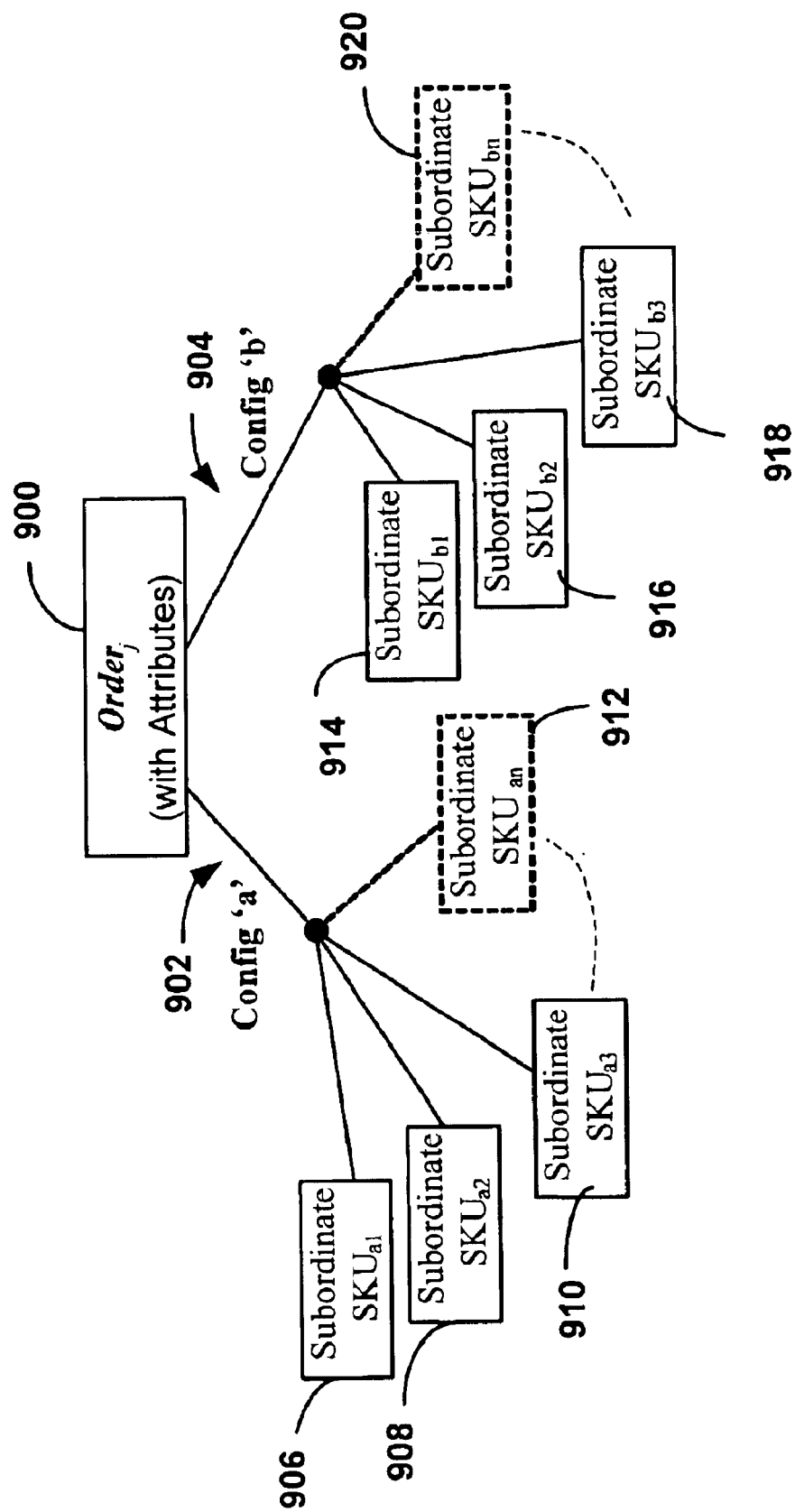
FIG. 9 is a block diagram depicting an exemplary relationship between a, configurations and subordinate SKUs.

The relationship between configurations, orders and SKUs is described in the following example together with FIG. 9. In this example, a configuration for an Order (Config 1, Config 2, and the like.) is essentially a set of subordinate relationships. In this example, the Order$_j$ 900 has two configurations: CONFIG A 902 and CONFIG B 904. Each configuration is a set of subordinate SKUs 906 to 920. For example, CONFIG A 902 is a set of subordinate SKUs 906 to 912 while CONFIG B 904 is a set of subordinate SKUs 914 to 920. The Order$_j$ 900 is feasible if at least one of its configurations is feasible by the end of the planning interval. In other words, the Order $_j$ 900 is feasible if it is possible to find at least one configuration, Config $_j$ of Order$_j$ such that the Available Quantity (Config $_j$)=Need Quantity, where the Available Quantity (Config $_j$) is the quantity that can be replenished using Configuration 'Config $_{ij}$' on or before Max Late Day (=Need Date+Max Lateness). Here "Configj should be read as the "j$^{th}$" configuration of the order. The Available Quantity of the order will be the same across both configurations A configuration Config $_j$ is feasible only if all the subordinates (e.g., component materials) in the configuration are feasible. In other words, a configuration Config $_j$ is said to be feasible only if feasible for all 'k' (where k is an index for a subordinate in Config $_j$), the Available Quantity (Subordinate SKU$_{jk}$)=Need Quantity (Subordinate SKU$_{jk}$), $1 \leq k \leq n$, whereby 'n' is the number of immediate materials.

The Available Quantities and Dates for each configuration may be calculated as follows. The Available Quantity (Config $_j$)=MIN [Available Quantity (Subordinate SKU$_{jk}$)/ Draw Quantity (Subordinate SKU$_{jk}$)], where the minimum is taken across all subordinates in Config$_j$. The Available Date (Config $_j$)=MAX [Available Date (Subordinate SKU$_{jk}$)+ Lead Time (to replenish subordinate)–Offset (Subordinate SKU$_{jk}$)], where the maximum is taken across all subordinates in Config $_{ij}$. The lead-time is the time needed to replenish an item. For example, suppose it takes five days to build a component material, the lead-time, in this case would be five days. Thus, note that in certain situations, there may be no lead-time (Lead time=0). In summary, for a configuration to be feasible, each subordinate SKUs (i.e., component material) must be feasible in terms of availability of the needed subordinate SKU by the time that the subordinate is needed and there is sufficient quantity in stock on that date or if not sufficient supply then the supply is fully replenished to meet the demand by manufacturing, purchasing and/or substitution.

Replenishment Through Manufacturing

Figure 10A:
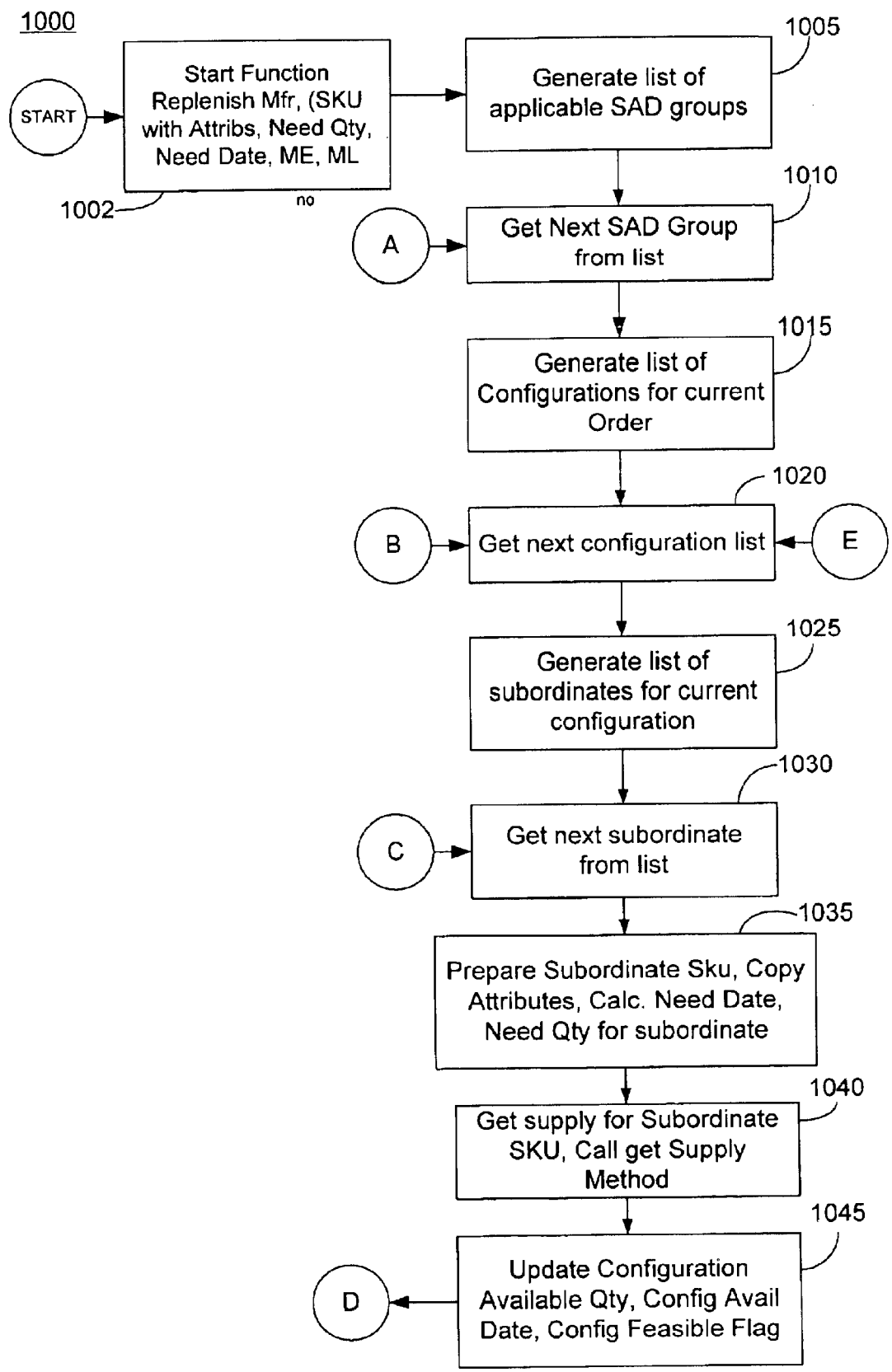
FIGS. 10A and 10B is a flow diagram for a process for replenishment by manufacture.
Figure 10B:
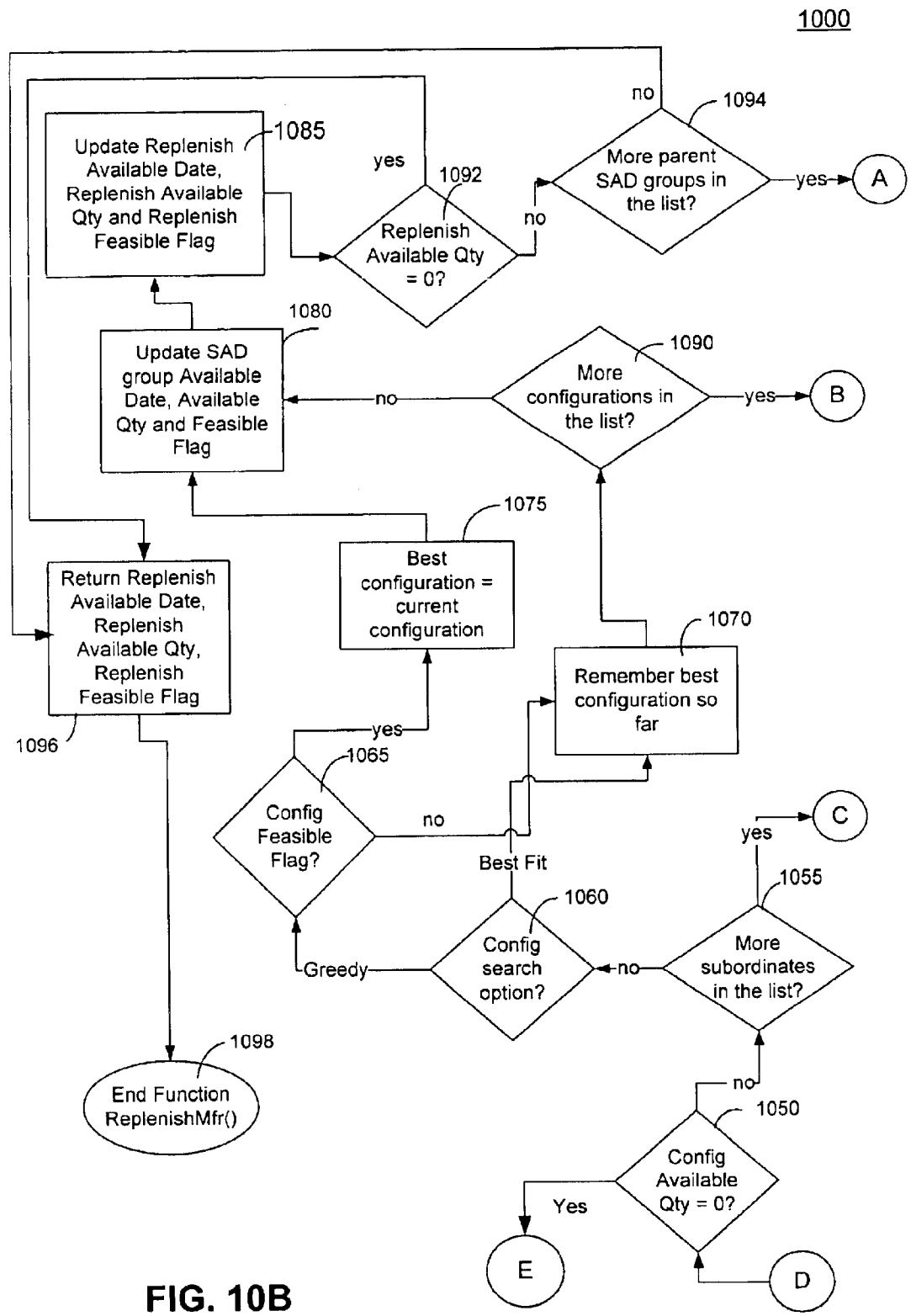

Material replenishment by manufacture is described hereinafter along with reference to flow process 1000 in FIGS. 10A and 10B. Flow process 1000 is a flow process for material replenishment by manufacture. To determine replenishment through manufacture, certain data will preferably be inputted as shown at Step 1002. Such data may include data relating to the SKU, the orders, replenish need date, ME (maximum-earliness), ML (maximum-lateness) parameters and replenish need quantity and the soonest replenishment start (the soonest replenishment start is a date that may occur before the planning horizon start. For example, suppose planning is being performed on Monday the 1st for Monday the 8th. Suppose further that the planner releases the schedule on Wednesday the third and starts counting the replenishment start on Thursday the 4th, instead of Monday the 8th. In this case, the replenishment start would be set at to Thursday the 4th instead of Monday the 8th. The process, as depicted in FIGS. 10A and 10B, generates an output that shows the quantity that could be replenished through manufacturing ("replenish available quantity") on or before the latest acceptable date (Need Date+ML), the date on which the replenish available quantity is available and a flag indicating whether 100% of the replenish need quantity could be satisfied through manufacturing on or before the latest acceptable date (Need date+ ML).

Figure 10C:
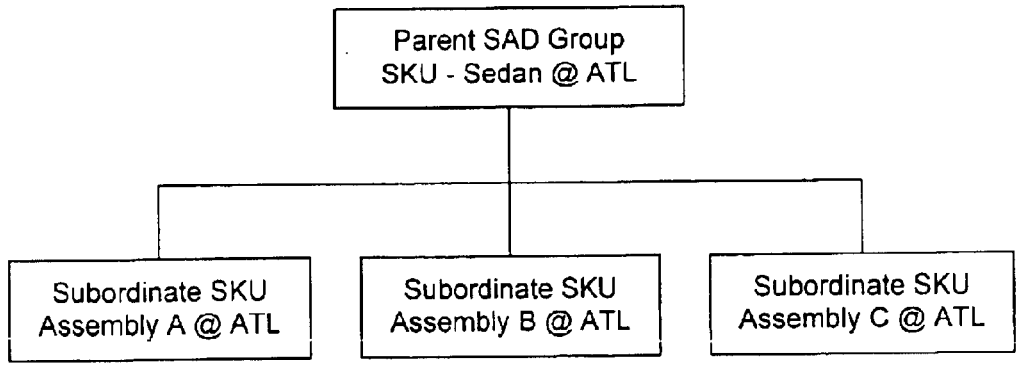
FIGS. 10C to 10F are block diagrams depicting BOM sets.
Figure 10D:
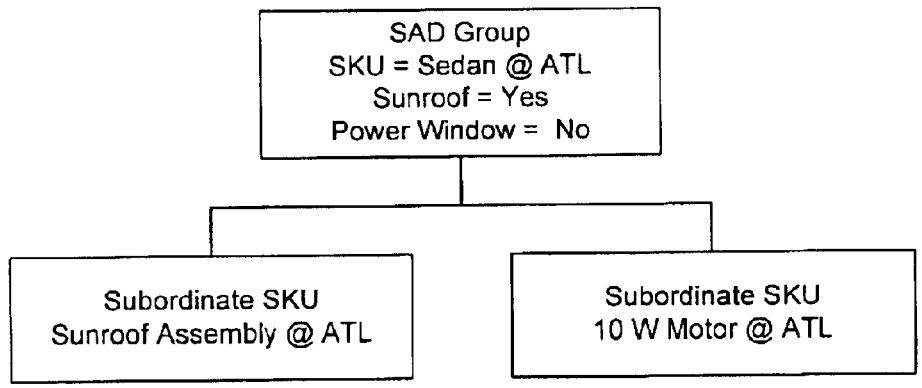
Figure 10E:
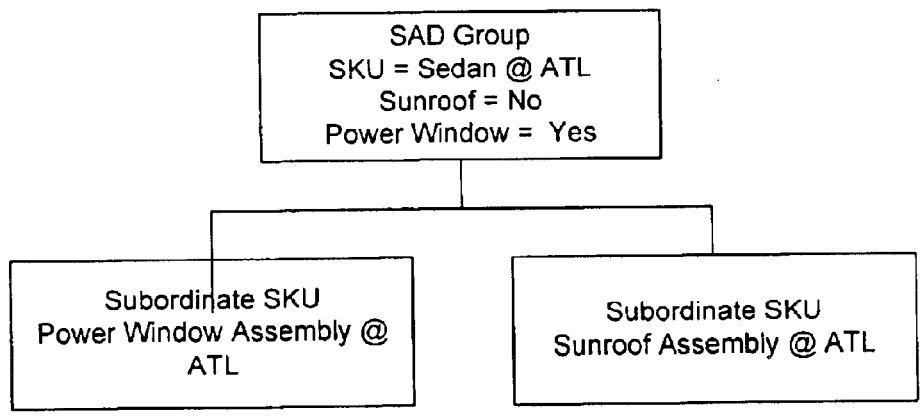
Figure 10F:
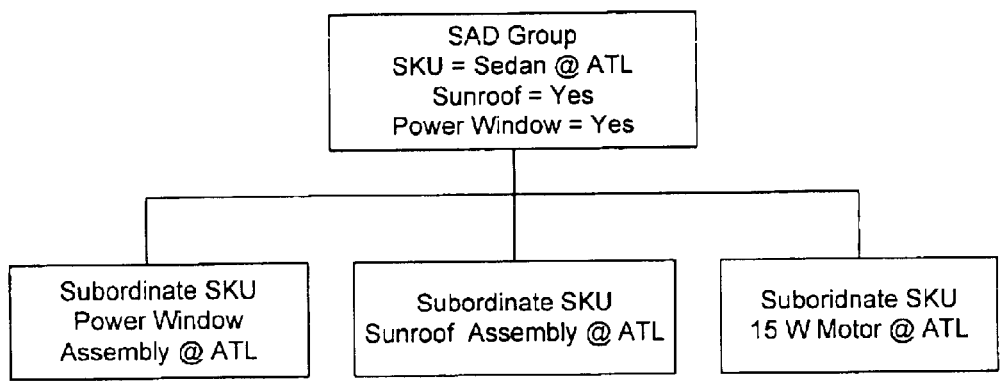
Figure 10G:
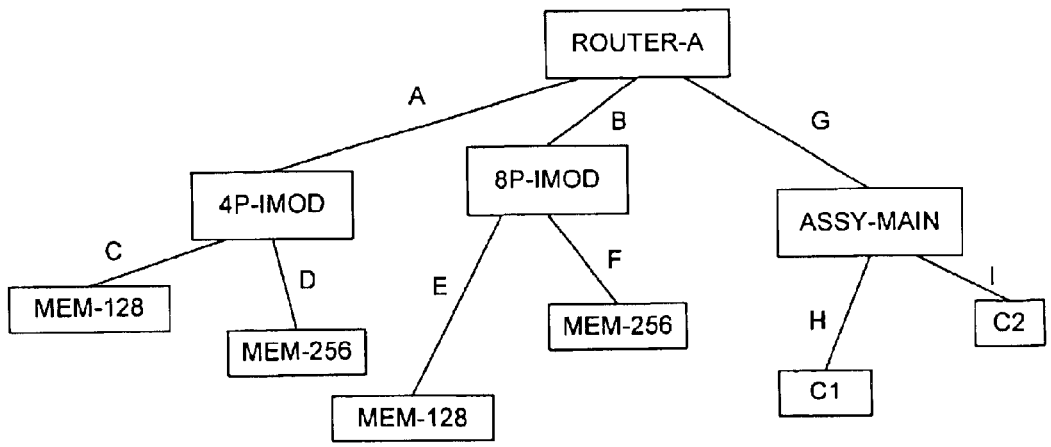
FIG. 10G is a block diagram depicting an exemplary BOM.

In step 1005, a list of applicable SAD groups is generated based on the data relating to the order being planned. Thus, in determining applicable SAD group, the ABP system 100 reviews all the SAD groups in the BOM that applies to the order and selects only those SAD groups that are applicable. To generate the list of applicable SAD groups, the ABP system 100 first determines all SAD groups in the BOM that apply to the SKU with attributes. For example, suppose that an order being planned can be defined by certain attributes as follows: Sedan@ATL, Sun Roof=Yes, Power Window= Yes. Based on the order, an associated BOM may be identified for the order. This concept may be best illustrated in reference to the following example. Referring to FIGS. 10C to 10F, which depicts four alternative BOM sets. FIG. 10C shows a "base" one level BOM for Sedan@ATL. This BOM set may be thought of as a "base" one level BOM for a Sedan regardless of what options are selected (must-have assemblies). Therefore, the SAD group in this BOM set is just "SKU=Sedan@ATL." FIG. 10D shows a second BOM set. This set shows the components that are additionally required if a Sunroof is configured as an option, but not a Power window. So, the SAD group in the second set is "SKU=Sedan@ATL, Sunroof Yes AND Power Window= No." Of course, to actually create the sedan defined by the SAD group in FIG. 10D, all of the subordinate SKUs depicted in the first BOM set (i.e., FIG. 10C) will be needed in addition to the subordinate SKUs depicted in the second set (i.e., FIG. 10D). FIG. 10E is a third BOM set that shows the components that are additionally required if a Power Window is configured as an option, but not a sunroof. The SAD group for this set is "SKU=Sedan@ATL AND Sunroof=No AND Power Window=Yes." The last BOM set, as depicted in FIG. 10, shows the components that are additionally required if both Sunroof and Power Window are selected as options. The SAD group for the fourth set is "SKU=Sedan@ALT AND Sunroof=Yes AND Power Window=Yes". Notice that each of the second, third and fourth SAD group depicted in FIGS. 10D to 10F still requires the subordinate SKUs of the base BOM (of FIG. 1C).

Accordingly, among these four sets, only the SAD groups in sets one and four describe the inputted order with attributes (i.e., the attributes of the fourth SAD group matches exactly with the attributes of the inputted order with attributes while the attributes of the first SAD group does not have any attributes that conflict with those of the inputted order with attributes). Note that the order may override attributes that are present on the SKU or Item so that the user always has to look at the order and not the SKU or Item. Therefore, at step 1005, a list of qualifying SAD groups may be generated. The list generated at step 1005, in this example, would only include the first and fourth SAD groups. The total number of SAD groups in the SAD group list is P and $1 \leq i \leq P$. All the SAD groups found in step 1005 are processed through the remaining steps, in turn using a loop, until the ABP system 100 finds a 'SAD Group$_i$' that satisfies one of two conditions:

(1) Availably Quantity (SAD Group$_i$)=0, which means that one of the SAD groups have zero availability on or before (Need Date+ML). Once it appears that availably Quantity=0, there is no need to process any more SAD groups in the list; or (2) i=P, which means the system has looped through all the parent SAD groups in the list.

In step 1010, the ABP system 100 retrieves the first (or next) SAD group in the list for processing. Therefore, the index 'i' in the list of SAD groups is advanced by one(i.e., i→i+1). Next, the ABP system 100 retrieves all the BOM configurations for the selected SAD group based on the order being planned in step 1015. This is because the SAD group will not contain all the attributes of the order. Thus, in order to obtain the proper BOMs, the ABP system 100 looks to the originating order. For purposes of explanation, 'Config $_{ij}$' is defined as the jth configuration in the list of configurations for 'SAD group' and the total number of the configurations in the list is Q, in which $1 \leq j \leq Q$. Configurations are always specific to an order because the order has attributes that may not exist in the SKU/Item or the order attributes may override those that are present in the SKU/Item. In step 1020, the system retrieves the next configuration in the list of configurations for 'Parent SAD Group$_i$' for further processing. Similarly, in index 'j', the list of configuration is advanced by one (i.e., j←j+1).

As described above, each configuration is essentially a list of subordinates that are required in order to manufacture the parent. The parent can be replenished feasibly as long as at least one configuration can be replenished feasibly. Therefore, the ABP system 100, in step 1025 generates a collection of subordinates for Config $_{ij}$, and in step 1030, retrieves the next subordinate in the list of subordinates for 'Config $_{ij}$' for further processing. In the preferred embodiment, it denotes an index 'k' on the list of configurations. That is, 'Subordinate SKU $_{ijk}$' indicates the kth subordinate in the list of subordinates for 'Config $_{ij}$'. The total number of subordinates in the list is R and $1 \leq k \leq R$. In a similar manner, in step 1030, the index 'k' on the list of configuration is advanced by one (i.e., k←k+1).

The ABP system 100 then prepares the subordinate SKU by copying attributes of the order [Preferably, subordinates are copied to the order. Subordinates SKUs, as included in the configuration, can temporarily add attributes to the order. When the next configuration comes along, the attributes have to be restored on the order.] and calculating the Need Date and the Need Quantity for the subordinate in step 1035. This step may require that the ABP system 100 first extract the Draw Quantity the Offset and the Copy Instructions associated with the BOM relationship between the order and the 'Subordinate SKU $_{jk}$'. The draw quantity is the amount of component materials (e.g., subordinate SKU) needed per unit item sought (e.g., parent unit). For example, for an order for a car, the draw quantity for headlights would be two. According to the embodiment of the present invention, the Need Date (subordinate SKU$_{jk}$ may be calculated by the following equation:

Need Date=Replenish Need Date–Lead time (Parent SAD Group$_j$)+Offset (subordinate SKU$_{ijk}$)

The Need Quantity may be calculated as follow:

Need Quantity (Subordinate SKU$_{ijk}$)=Replenish Need Quantity*Draw Quantity (Subordinate SKU$_{ijk}$)

Select attributes of the order and/or the input SKU with attributes and/or item corresponding to input SKU with attributes is preferably copied to the Subordinate SKU $_{ijk}$ using copy instructions on the BOM table. Copy instructions are used to propagate relevant attributes of the order/parent SKU/parent item to the subordinate SKUs. Copy instructions tell what attributes need to be copied.

After the process of step 1035, the ABP system 100 outputs Subordinate SKU$_{ijk}$ with relevant attributes (denoted by SubSKU withATtribs$_{ijk}$). The Need Qty and Need Date are also known by the above calculation.

Copy instructions may be used in order to propagate the appropriate attributes to subordinates as exploding the bill of materials. Propagation of the appropriate attributes to the lower level subordinates is needed to find inventory of and replenish the right subordinate materials. An example of copy instructions is now described with reference to FIG. 10G, which illustrates a BOM, in which the item names are shown within parentheses. As shown, the bill is an attribute-based bill. Not all the parent-child relationships shown are applicable for every order of Router-A. For example, the BOM relationship denoted by "A" (between ROUTER-A and 4P-IMOD) is valid only if the customer has selected "Interface Type=4-port". Similarly, the BOM relationship denoted by "E" is traversed only if the customer has selected "Interface Type=8-port" AND "memory=128 MB".

As mentioned above, the attribute dependencies are modeled using parent SAD groups. Therefore, the copy instructions of each BOM relationship of FIG. 10E are shown in the following Table I.

TABLE I

| Reference in the Diagram | Parent SAD Group | Subordinates SKU | Copy Instructions |
| --- | --- | --- | --- |
| A | "Item = ROUTER-A" AND "Interface = 4-port" | 4P-IMOD | From Attribute=Memory, To Attribute = Memory, to Value = ' ' |
| B | "Item = ROUTER-A" AND "Interface = 8-port" | 8P-IMOD | From Attribute, To Attribute= Memory, To value = ' ' |
| C | "Item = 4P-IMOD" AND "Memory = 128 MB" | MEM-128 | Copy No Attributes |
| D | "Item = 4P-IMOD" AND "Memory = 256 MB" | MEM-256 | Copy No Attributes |
| E | "Item = 8P-IMOD" AND "Memory = 128 MB | MEM-128 | Copy No Attributes |
| F | "Item = 8P-IMOD" AND "Memory = 256 | MEM-256 | Copy No Attributes |

TABLE I-continued

| Reference in the Diagram | Parent SAD Group | Subordinates SKU | Copy Instructions |
|---|---|---|---|
| G | "Item = ROUTER-A" MB" | ASSY-MAIN | Copy No Attributes |
| H | "Item = ASSY-MAIN" | C1 | Copy No Attributes |
| I | "Item = ASSY-MAIN" | C2 | Copy No Attributes |

Assume there is an order of 50 units of ROUTER-A required in 10 weeks and the order has the configuration options: 1) Interface=8-port; and 2) Memory=128 MB. Assume further that the inventory positions of the various parts in the system are as the following table II.

TABLE II

| Item/SAD Group | Inventory |
|---|---|
| Item = ROUTER-A AND Interface = 8-port AND Memory = 128 MB | 25 |
| Item = ROUTER-A AND Interface = 4-port AND Memory = 128 MB | 50 |
| ASSY-MAIN | 50 |
| MEM-128 | 10 |
| Item = 8P-IMOD AND Memory = 128 MB | 20 |
| Item = 8P-IMOD AND Memory = 256 MB | 30 |

Assume that all parts have the same lead-time=1 week and no substitutes configured for any part in the system. Suppose that 50 units of ROUTER-A with Interface=8-port and Memory=128 MB by 10 weeks are needed, and 25 units of ROUTER-A with 8-port Interface Module and 128 Memory are available on-hand, which means only 25 units are needed. Therefore, the needed 25 units for ROUTER-A with interface=8-port and Memory=128 MB are transferred into dependent demand of (25 units, Week 9) for all its immediate subordinates.

From the BOM table, it can be seen that only two parent SAD groups B and G apply to "ROUTER-A with Interface= 8-port and Memory=128 MB", in which the subordinate SKU of group B is 8P-IMOD and that of group G is ASSY-MAIN. Therefore, the ABP system 100 may attempt to find a source of supply for these two subordinates. Finding supply can be done either by netting available inventory or by manufacturing these parts. They are described by the followings:

(1) Finding supply from Group G: Group G is a standard assembly that is there in the router irrespective of options configured on the router. Therefore, there is no need to know order specific attributes for this group while looking for inventory or replenishing ASSY-MAIN. From table II, it is known that the parent SAD group with subordinate ASSY-MAIN has 50 units in inventory, which is sufficient to cover the demand of 25 units. Therefore, the subordinate ASSY-MAIN is feasibly by Week 9.

(2) Finding supply from Group B: From Table II, there are 20 units of inventory and 30 units of inventory for "Item= 8P-IMOD and Memory=128 MB" and "Item=8P-IMOD AND Memory=256 MB", respectively. As mentioned above, the inventory in this group is differentiated by attributes. Although there are in total 50 units of 8-port interface module available on hand, not all of it can be netted to meet demand. Only 20 units are available on hand and there are 5 units remaining required. Using copy instructions in the BOM table allows the completion of the remaining 5 units. Copy instructions copy attributes down the BOM levels but do not help us resolve inventory shortages.

In Table I, the parent SAD group B shows the copy instruction is "From Attribute=Memory, To Attribute= Memory, To Value=''". The interpretation of the copy instructions is "carrying the Memory attribute to the Subordinate SKU and copying the value on the Memory attribute on the order to the Memory Attribute on the Subordinate SKU". We copy to the order not the SKU. The output of this operation is a subordinate object, i.e., a "Subordinate SKU with attribute". In this example, the Subordinate SKU is 8P-IMOD and the subordinate object is "80-IMOD with Memory=128 MB". Next, the inventory check is done against the Subordinate Object, by matching attributes on the inventory against the attributes on the Subordinate Object. Since there are already 20 units on hand, the ABP system 100 needs to replenish 5 units of the Subordinate Object "8P-IMOD with Memory=128 MB". It can find out from Table I that parent SAD group E meets the requirement because that group has Subordinate SKU "8P-IMOD". In addition, the copy instruction of Group E is "Copy No Attribute", which means no attributes are to be copied. Therefore, after checking Table II, it is found that the Item/SAD group "MEM-128" has 10 units on hand, which is sufficient to cover the remaining demand of 5 units.

According to the supply method mentioned above, the ABP system 100 gets supply for subordinate SKU and calls a Get Supply Method for SubSKUwithATTribs$_{ijk}$, in step 1040. The outputs of step 1040 are available Quantity (SubSKUwith Attribs$_{ijk}$) and available Date (SubSKU with attribs$_{ijk}$).

The ABP system 100 then updates the available Date and availably Quantity by the outputs determined by the above step, as shown in step 1045. In accordance with the present invention, the updating may be performed by the following ways:

Available Date (Config $_{ij}$)=Max [Available Date (Subordinate SKU$_{ijk}$)+Lead Time (parent SAD group$_j$)−Offset (Subordinate SKU$_{ijk}$), Available Date (config $_{ij}$)]

Available Qty (Config $_{ij}$)=Min [Available Qty (Subordinate SKU$_{ijk}$)/Draw Qty (Subordinate SKU$_{ijk}$), Available Qty (Config $_{ij}$)]

Moreover, the feasible flag is determined by:

Feasible Flag (Config $_{ij}$)=YES if both the following conditions are met:

(a) Available Date (Config $_{ij}$)≦Replenish Need Date; and (b) Available Qty (Config $_{ij}$)=Replenish Need Qty.

Or, Feasible Flag (Config $_{ij}$)=NO.

In step 1050, the ABP system 100 checks if the configuration available Quantity equals to zero. If so, the system will not look at any more subordinates in this configuration and the process goes back to step 1020 to get next configuration list. If not, the system continues to check if there are more subordinates in this list, in step 1055.

If there are more subordinates (i.e., k<R) in the present configuration list, the process goes to step 1030 to retrieve next subordinate (k←k+1) from the list, otherwise goes to step 1060 to determine the configuration search mechanism.

In accordance with one preferred embodiment of the present invention, the ABP system 100 provides two mechanisms for search and optimization when there are multiple configurations. One mechanism is called "greedy feasible" and the other is called "best-fit." In greedy feasible, the process (of FIGS. 10A and 10B) selects the first configuration that is feasible (defined as the Need Quantity for the parent SAD group can be fulfilled on or before the Need Date). In best fit, the ABP system 100 will not stop searching even if the system finds a feasible configuration. Instead, the ABP system 100 search through all the configurations for the parent SAD group and selects the best configuration with respect to the scheduling goal. If the search mechanism is the greedy feasible type, the process determines, in step 1065, if the configuration feasible flag indicates that the configuration is feasible. If, however, the search mechanism is the best-fit type, the process goes to step 1070, where the ABP system 100 remembers the best configuration that has been found so far. In step 1090 determine whether there is more configurations for the current parent SAD group. If there are more configurations then the process returns to step 1020 to get the next configuration. In step 1065, a determination is made as to whether a feasible configuration has been found [as indicated by a feasible flag (Config$_{ij}$)]. If the feasible flag indicates that a feasible configuration has been found then at step 1075, the ABP system 100 selects the current configuration as the best configuration based on the greedy-feasible-type mechanism, and then goes to step 1080. If there is no feasible flag, which means no feasible configuration has been found so far (under the greedy mechanism), the ABP system 100 then goes to step 1070 and remembers the best configuration so far (however, since the greedy mechanism is selected, none of the configuration checked so far should be feasible). The process then moves to step 1090 to check if there are more configurations on the list. If there are more configurations on the list then the process returns to step 1020 to evaluate and process the next configuration on the list. Otherwise, if there are no more configurations on the list then the process moves to step 1080 as well, where the system calculates and updates the available date and available quantity for the current configuration. In this embodiment, the available date of the current parent SAD group is the available date of the best configuration and the available quantity is the available quantity of the best configuration.

The ABP system 100 then updates replenish available date and replenish available quantity in step 1085. In accordance with one preferred embodiment of the present invention, the Replenish Available Date is the larger one between the available date for the current parent SAD group and the current Replenish Available Date. The Replenish Available Quantity is the smaller one between the Available Quantity for the current parent SAD group and the current Replenish Available Quantity. The replenish flag=Yes only if the following two conditions are both met: 1) Replenish Available Date≦Replenish Need Date+ML; and 2) Replenish Available Quantity=Replenish Need Quantity.

In step 1092, determine if the calculated Replenish Available Quantity after step 1085 equals to zero. If it is not zero, there is no need to process any more SKUs for the current configuration and the process moves to step 1096 where the ABP system 100 returns (i.e., outputs) the Replenish Available Date, Replenish Available Quantity and Replenish Feasible Flag and ending the replenishment by manufacture process at step 1098. If the replenish available Quantity is determined to be zero at step 1092, then the ABP system 100 checks if there are more recipes on the BOM 1094. If there are more, then the system at step 1010 retrieves the next parent recipe (i.e., SAD group) for processing. Otherwise, the system exits the BOM recipe and returns a Replenish Available Date, Replenish Available Qty and the Replenish Feasible Flag at step 1096. The process 1000 then ends at 1098.

Replenishment Through Purchase

Figure 11:
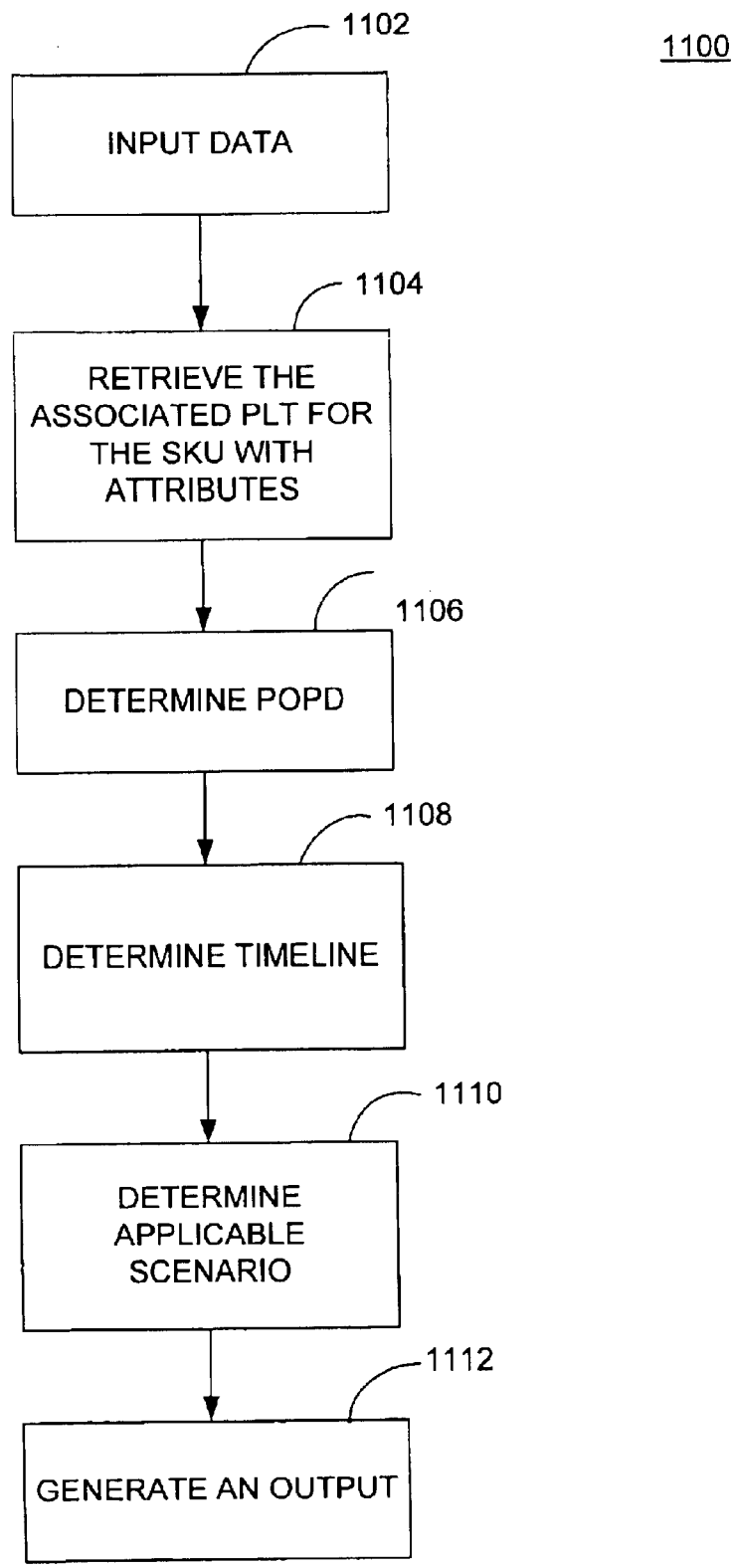
FIG. 11 is a flow diagram depicting a flow process for replenishment by purchase.
Figure 12A:
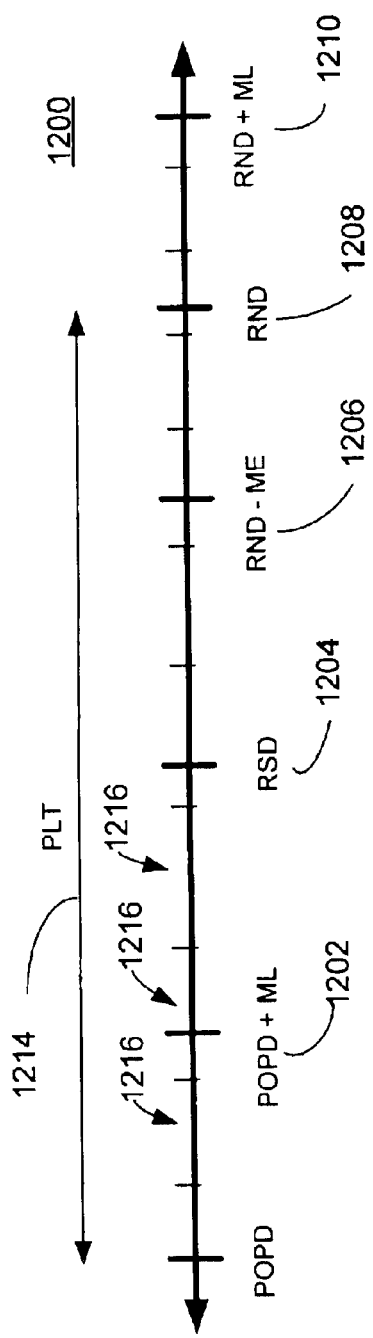
FIGS. 12A to 12D are timelines that depict exemplary time events.

Referring to FIG. 11, which is a general flow process 1094 for replenishment by purchase (as represented by step 610 of FIG. 6). The process generates outputs by attempting to plan replenishment need quantities into available time buckets along a timeline. The outputs may be in the form of quantitative and/or qualitative reports. The process begins when relevant data is initially inputted and/or retrieved and parsed at step 102. Relevant data may include, for instance, data relating to attributes of an order object and timing information such as replenish need quantity, replenish need date, maximum earliness ("ME"), maximum lateness "ML"), length of time buckets, period maximums, and the like. Further, a purchase lead-time ("PLT") that depends on order attributes for purchasing "replenish need quantity" is defined at step 1104. The PLT is the lag time required to replenish after a purchase order ("PO") has been placed. Given the time needed to obtain the materials, the PLT may be used to determine when the order needs to be placed. In the ABP system 100, this is constrained by the replenishment start parameter. Recall that there is a planning horizon start/end, thus no orders will be planned before the horizon start or after the horizon end. Note also that a "replenishment start" determines the earliest time of any replenishment. The soonest any replenishment can occur is [replenishment start time+PLT]. The date on which the PO must be submitted (called a "purchase order placement date" or "POPD") in order to receive the "replenish need quantity" on the "replenish need date" may then be calculated:

POPD=Replenish Need Date–Purchase Lead Time (RNQ), whereby RNQ denotes Replenishment Need Quantity At step 1108, create a timeline for the SKU with attribute. The timeline is a timeline that defines the sequence of relevant events. These time events, as depicted in FIGS. 12A to 12D, includes for example, purchase order placement date ("POPD"), replenish start date ("RSD"), purchase order placement date plus maximum lateness date ("POPD+ML"), replenish need date minus maximum earliness ("RND–ME"), replenish need date ("RND"), replenish start date plus PLT ("RSD+PLT"), replenish need date plus maximum earliness ("RND+ME"), and the like. Based on the timeline created in step 1108, at least four general types of scenarios are possible. At step 1110, determine the applicable scenario. Based on the applicable scenario, an output is generated. The output generated will depend upon the sequencing of relevant time events (i.e., scenarios) and the ability to schedule the needed replenishment quantities in buckets of time along the timeline. The various possible scenarios and the resulting outputs are described below. FIGS. 12A is a timeline 1200 that depicts time events, which help define these scenarios. These events include the purchase order placement date ("POPD") 1202, purchase order placement date plus maximum lateness ("POPD+ML") 1204, replenish start date ("RSD") 1206, replenish need date minus maximum earliness ("RND–ME") 1208, replenish need date ("RND") 1210, and replenish need date plus maximum lateness ("RND+ML") 1212. Note that these time events do not necessarily have to fall according to the timeline 1200 of FIG. 12A but rather the sequencing of these events will depend on the specific circumstances. For example, the selection of ML and ME is typically arbitrary. Therefore, it is possible for the RSD date at 1206 to actually precede the POPD+ML date at 1204. The process of purchasing for replenishment often begins when a purchase order is submitted. Generally, for any purchase order ("PO"), there is a lag time from the time that a PO is actually submitted to the date when the PO has been fulfilled. This time difference, as discussed previously, is called a purchase lead-time or "PLT" 1214. A purchase order placement date ("POPD") 1202 is the date that a PO must be placed for the PO to be fulfilled precisely on the replenishment need date 1210. Many businesses will accept replenishment purchases earlier and/or later than the need date 1210. Therefore, the earliest acceptable date (replenish need date−maximum earliness or RND−ME) at 1208 and latest acceptable date (replenish need date+maximum lateness or RND+ML) at 1212 is also defined. The replenish start date or RSD at 1206 is the actual or contemplated purchase order date. The timeline may be divided into buckets 1216. The timeline 1200 is shown to be divided into time intervals representing buckets 1216 that are time dependent. In addition to being time dependent, these buckets may be defined by other factors such as quantity or qualitative factors. Note also that the term "date" is broadly used here so that it may be interpreted to cover precise points in time including, for instance, down to the seconds of a day.

Many businesses have numerous constraints that prevent them from having infinite capacity. In order to reflect realistic limitations more accurately, capacity limitations are preferably represented in the replenishment by a purchase model. One approach is to model by defining "capacity maximums" based on time. These maximums are called "period maximums." These period maximums may be used to restrict the amount of materials or items that a resource, such as a supplier, can produce or sell at any given time interval. Other rules may also be included such as the concept of "carry-overs," which allows models of suppliers to carry over any excess products, produced over an earlier time period, to be available for use in succeeding time periods.

The following is a brief summary of three basic cases followed by a more detailed description of the various scenarios. The three basic cases are when the replenishment of the full quantity is on time, when replenishment of the full quantity is late, and when replenishment is infeasible.

Case 1: The replenishment is marked feasible and the soonest available date is recorded. No further processing needs to be done.

Case 2: The replenishment is marked feasible, the amount available on the need date is recorded and the soonest available date is recorded. The user can set a flag that allows the system to look for one or more substitutes to improve the timeliness.

Case 3: The replenishment is marked infeasible and the amounts available on the need date and the need date+maximum lateness are recorded. In this case, the ABP system 100 will try to substitute as in case 2 to try to make up the difference at the need date+maximum lateness. The user may set a flag that allows the ABP system 100 to look for additional quantity for one or more substitutes to improve the timeliness. If substitutes cannot be found to make the configuration feasible, the configuration is marked infeasible and skipped.

Period maximums are used when a user cannot get all of the material the user wants in a given time frame. This can occur with commodity products such as iron ore or components in high demand such as computer CPUs. The user, for example, may get an allocation of no more than 10 tons in a week, or 50 CPUs in a month. In this case, the user needs to determine how to use these parts to make the most money.

If a lack of capacity pushed the assignment out, the ABP system 100 may ensure that the minimum amount of substitute is used. This can occur in Case 2 or Case 3.

Figure 12B:
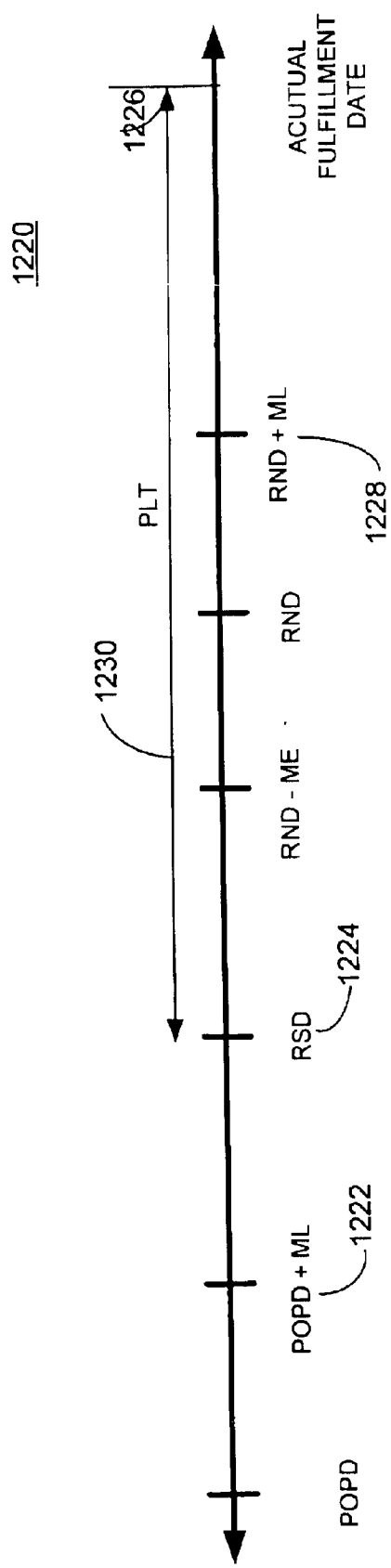

What follows is a detailed description of various scenarios. The first general scenario is the situation when POPD+ML<RSD. The replenish start date ("RSD") is the date when the actual replenishment purchase order is submitted. Referring to FIG. 12B, which is a timeline 1220 depicting the first scenario. In this scenario, the POPD+ML date at 1222 precedes the RSD date at 1224. Therefore, the completion date at 1226 of the order is after the RND+ME date at 1228 based on the PLT 1230. In this case, the materials or items being purchase will not be available until after the latest acceptable date. Thus, if it is determine in step 1110 that it is a case 1 scenario, then an output (Output 1.1) may be generated.

Output 1.1

Replenishment Available Quantity=0

Replenishment Available Date=Maximum Date

Replenishment Flag=False

Figure 12C:
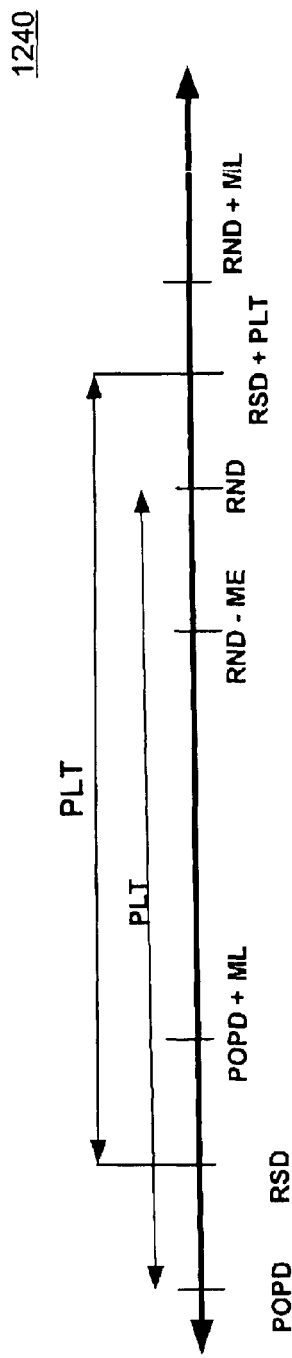

The second scenario is the situation whereby the POPD date is earlier than or the same as the RSD date which is earlier than or the same as the sum of POPD and ML dates: POPD≦RSD≦POPD+ML. Referring to FIG. 12C, which is a timeline 1240 depicting the second scenario. The interval between the POPD date at 1242 and the RND date at 1244 defines the PLT at 1246. Unlike the timelines depicted in FIGS. 12A and 12B, the RSD at 1248 precedes the POPD+ML date at 1250. The interval between the RSD date at 1248 and POPD+ML date at 1250 is a potential interval for placing the PO. This interval is called "potential PO placement interval" 1252. An available date interval 1254 corresponding to this potential PO placement interval 1252 is located between the RSD+PLT date at 1256 and RND+ML date at 1258. This interval is checked from left to right (starting at RSD+PLT at 1256) to find buckets that do not violate period maximum on the purchase. If necessary, splitting of quantities may be done across multiple buckets. If it is determined that this scenario is applicable then a determination is made to see which sub-scenarios under the second scenario is applicable. There are three sub-scenarios under the second scenario resulting in three possible outputs, Outputs 2.1, 2.2 and 2.3.

The first sub-scenario for the second scenario is when 100 percent of the replenish need quantity can be placed in buckets that span the end points of the interval (RSD+PLT at 1156, RND+ML at 1258), the following output may be generated:

Output 2.1

Replenish Available Date ("RAD") End Date of the last bucket by which replenish quantity was fully placed. There are two exceptions: If this bucket contains RSD+PLT, then the RSD+PLT will be the RAD date or if this bucket contains RND+ML, then the RND+ML will be the RAD date.

Replenish Available Quantity=Replenish Need Quantity

Replenish Feasible Flag=Feasible

The second sub-scenario for the second scenario is when a quantity X, which is greater than zero but less than one hundred percent of the replenish need quantity, can be placed in buckets that span the end points of the interval (Replenish Start Date+PLT, Replenish Need Date+ML), the following output may be generated:

Output 2.2

Replenish Available Date ("RAD")=End Date of the last bucket by which the quantity X was fully placed. There are two exceptions: If this bucket contains Replenish Start Date+PLT, then RAD equals the Replenish Start Date+PLT or if this bucket contains Replenish Need Date+ML, the RAD equals Replenish Need Date+ML.

Replenish Available Qty=X

Replenish Feasible Flag=Feasible

The third sub-scenario for the second scenario is when nothing can be placed in the buckets that span the end points of the interval (Replenish Start Date+PLT, Replenish Need Date+ML) due to violations of period. If the third sub-scenario apples then the following output may be generated:

Output 2.3

Replenish Available Date=Maximum Date

Replenish Available Qty=0

Replenish Feasible Flag=unfeasible.

The third scenario is when the POPD−ME date is earlier than or equal to the RSD date, which is earlier than or equal to the POPD date, which is earlier than or equal to the POPD+ML date: POPD−ME≦Replenish Start Date≦POPD≦POPD+ML. This scenario is essentially identical to the third sub-scenario of second scenario above. Thus, the interval (Replenish Start Date+PLT, Replenish Need Date+PLT) may be checked to determine whether the buckets in the interval will be sufficient. The outputs for the third scenario will be the same as the outputs for the third sub-scenario of the second scenario.

Figure 12D:
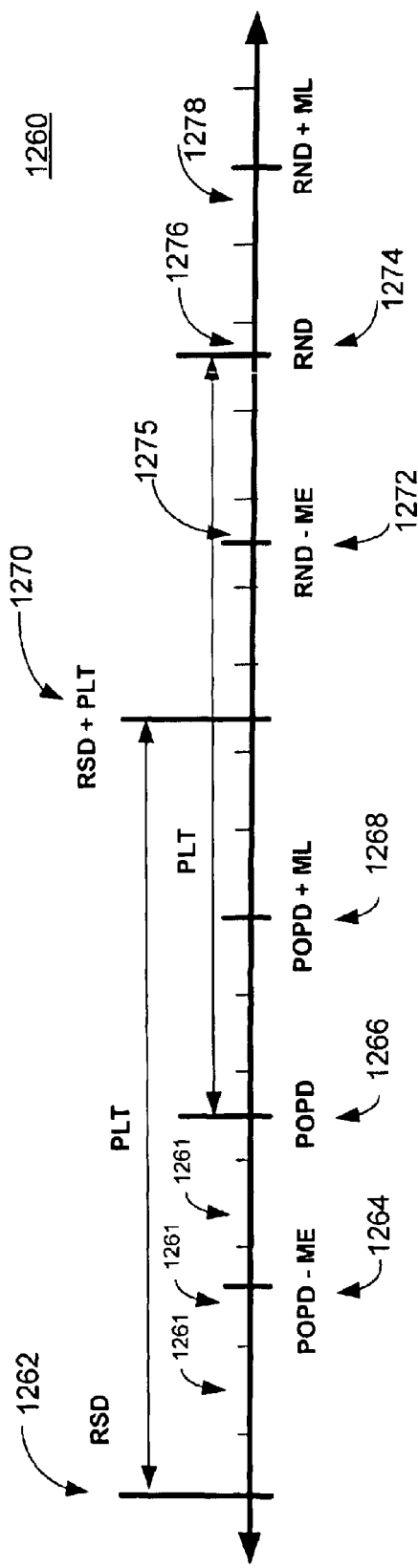

The fourth scenario occurs when the replenish start date is less than or equal to the purchase order placement date minus the maximum earliness, which is less than or equal to the purchase order placement date, which is less than or equal to purchase order placement date plus maximum lateness: RSD≦POPD−ME≦POPD≦POPD+ML. Referring to FIG. 12D, which is a timeline 1260 depicting the fourth scenario. The timeline 1260 is divided into buckets 1261. The buckets 1261 are defined by increments of time and capacity. In this timeline 1260, the fourth scenario requires that the RSD date at 1262 is earlier or the same as the POPD−ME date at 1264, which is earlier or the same as the POPD date at 1266, which is earlier or the same as the POPD+ML date at 1268: RSD≦POPD−ME≦POPD≦POPD+ML. Further, this timeline 1260 depicts that the RSD+PLT date at 1270 precedes the RND−ME and RND dates at 1272 and 1274.

Figure 13:
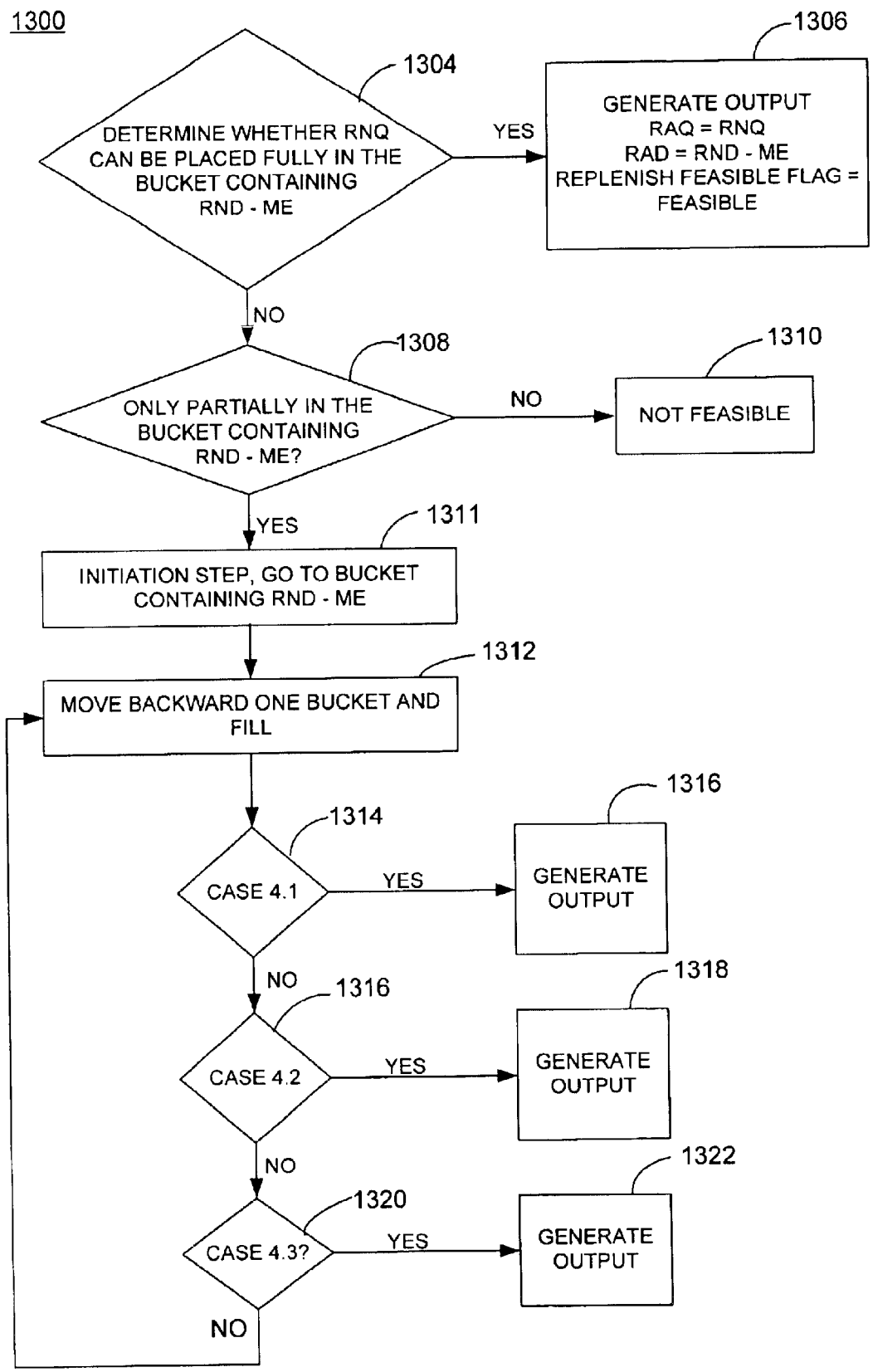
FIG. 13 is a flow diagram depicting a process for generating outputs based on particular scenarios.

Referring to FIG. 13, which is a flow process 1300 for generating outputs for the fourth scenario. The process 1300 begins when a determination is made whether the replenishment need quantity can be fully accommodated by the bucket that contains the [RND−ME] date at step 1304. If successful, the following output is generated at step 1306:

Replenish Available Quantity=Replenish Need Quantity

Replenish Available Date=Replenish Need Date−ME

Replenish Feasible Flag=feasible

At step 1308, determine whether at least a partial amount of the quantity can be placed in the bucket 1275 (see FIG. 12D) containing (RND−ME). If not, then at step 1310 generate an output indicating unfeasible output. If a partial (e.g., greater than zero but less than the replenish need quantity) quantity could be placed in the bucket containing, then scan multiple successive buckets in the backward direction, one bucket at a time, placing as much as possible in each bucket without violating period maximums. It is preferable to move backward until one of three conditions are met:

Case 4.1: The replenish need quantity is only partly in the bucket containing (Replenish Start Date+PLT).

Case 4.2: The replenish need quantity has been completely placed but are not in the bucket containing (Replenish Start Date+PLT).

Case 4.3: The replenish need quantity have been placed completely in the bucket containing (Replenish Start Date+PLT).

Figure 14A:
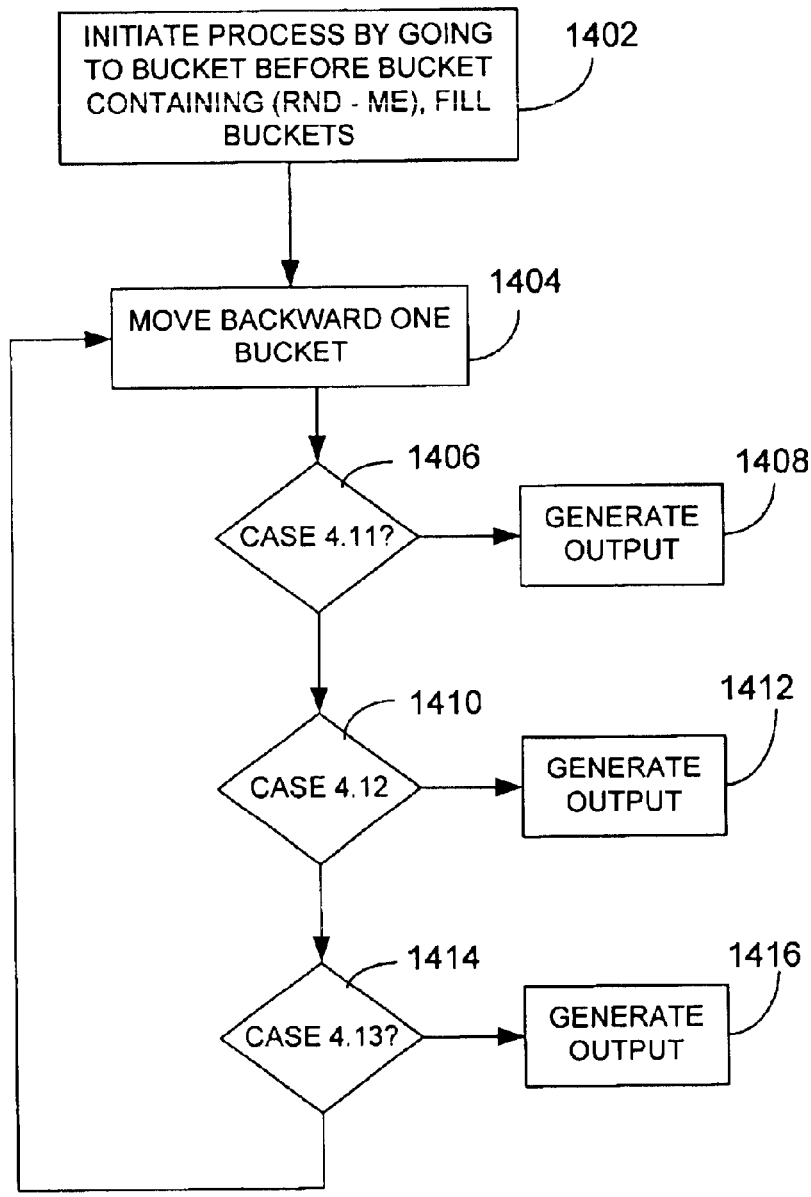
FIG. 14A is a flow diagram depicting a process for generating outputs based on particular scenarios.

At step 1311 initialize the process by going to the time bucket 1274 containing (RND−ME). At step 1312, move backward one bucket and fill the bucket as much as possible. At step 1314, determine whether it is a case 4.1 situation. If so, then generate an output based on specific factors at step 1316. FIG. 14A is a flow process 1400 for generating an output for case 4.1 (represented as step 1316 in FIG. 13). Multiple successive buckets in the forward direction may be checked starting with the bucket 1276 (in FIG. 12D) that is after the bucket 1274 in which (RND−ME) occurs, placing as much as possible in each bucket without violating period maximums. Moving backward (e.g., towards earlier time buckets), one bucket at a time, until one of the following three conditions are met:

Case 4.11: The replenish need quantity is not completely in the bucket containing (replenish need date+ML).

Case 4.12: The replenish need quantity have been completely been placed in one or more buckets but is not in the bucket containing (replenish need date+ML)

Case 4.13: The replenish need quantity have been completely placed and is in the bucket containing (replenish need date+ML)

The process 1400 begins at step 1402 by going to bucket 1276, which is before the bucket 1274 in which (replenish need date−ML) occurs, placing as much as possible in each bucket without violating period maximums. This means that an attempt is made to try to fill each bucket forward in time beyond the bucket 1474 in which (replenish need date−ML) occurs and up to the bucket before the bucket that contains the (replenish need date+ML) date or the bucket 1278 that ends on the (replenish need date+ML) date (bucket 1378 in FIG. 12D). At step 1404, move backward one bucket to the next earlier time bucket. At step 1406, review timeline and determine whether it is a 4.11 case scenario. If so, then generate the following output at step 1408:

Replenish Available Date=End Date of the latest bucket in which a non-zero quantity was placed.

Replenish Available Qty=Total Quantity that could be placed

Replenish Feasible Flag=Not Feasible

If it is not a 4.11 case, then at step 1410, determine whether it is a 4.12 case. If it is a 4.12 case, then at step 1412, generate an output as follows:

Replenish Available Date=End Date of the latest bucket in which a non-zero quantity was placed.

Replenish Available Quantity=Replenish Need Quantity

Replenish Feasible Flag=Feasible

If it is not a 4.12 case, then at step 1414 determine whether it is a 4.13 case. If it is a 4.13 case then generate an output as follows:

Replenish Available Date=Replenish Need Date+ML

Replenish Available Qty=Replenish Need Quantity

Replenish Feasible Flag=Feasible

If it is not a 4.13 case, then return to step 1404 and move backward one bucket to start the process over again. Returning to FIG. 13, if the not a 4.1 case situation then determine if it is a 4.2 case at step 1316. If it is a 4.2 case situation then generate the following output at step 1318:

Replenish Available Date=End Date of the latest bucket in which a non-zero quantity was placed.

Replenish Available Qty=Replenish Need Quantity

Replenish Feasible Flag=Feasible

If it is not a 4.2 case situation, then determine if it is a 4.3 case situation at step 1320. If it is a 4.3 case situation then generate output at step 1322 as follows:

Replenish Available Date=Replenish Start Date+PLT
Replenish Available Qty=Replenish Need Quantity
Replenish Feasible Flag=Feasible If it is not a 4.3 case situation then return to step 1312 and move backward one bucket to restart the process again until an output has been produced.

Replenish by Substitution

If after the attempt to replenish by manufacture and/or purchase fails to fully satisfy the replenishment step 610 (FIG. 6) of the material feasibility process 600, the ABP system 100 may attempt to make up the difference between the needed replenishment quantity and the total quantity available by manufacture and/or purchase by substitution. Substitution may be used for any type of SKUs including FG SKUs, SKU with attributes, subordinate SKUs, and the like. A substitution model may be created to facilitate the substitution of SKU with attributes. Whenever substitutes are needed for SKUs with attributes, the ABP system 100 may attempt to substitute for missing SKUs after it attempts to manufacture a child item using one of the defined BOM configurations. The substitutions are processed in priority order, and either all substitutions are tested for existing inventory before any manufactured configurations are tried on the substitutes, or else the higher priority substitutes' manufactured configurations are tried first. Substitutes may be modeled by creating a substitute table. Substitutions may be defined for all child items [a child item is a subordinate item to a parent item, for example, a car would be a parent item and the car seats would be the child items]but not generally for finished goods. Multilevel substitutes may also be allowed such as substitutes for substitutes.

Figure 14B:
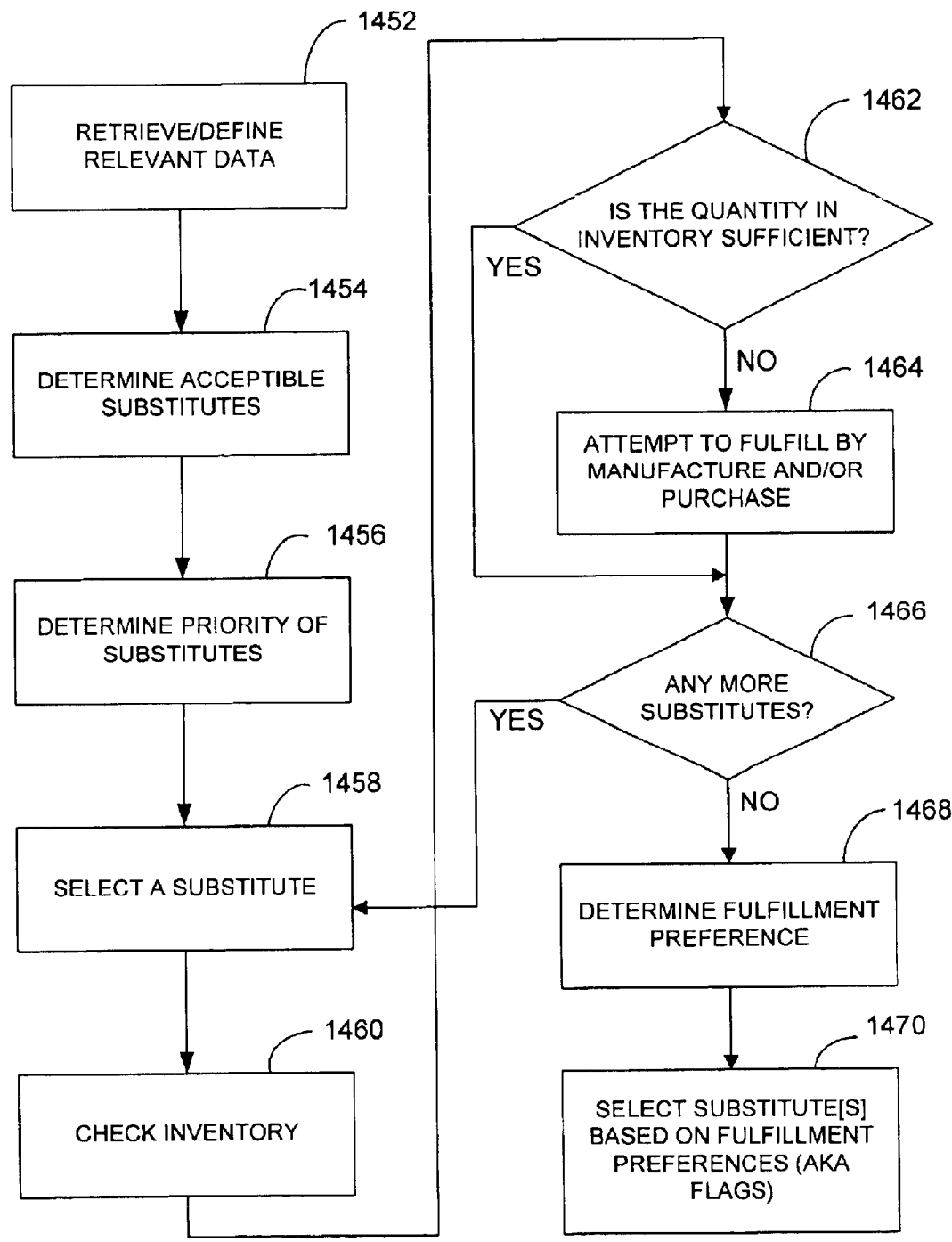
FIG. 14B is a flow diagram depicting a process for replenishment by substitution.

In steps 614 and 616 (FIG. 6), an attempt is made to try to satisfy any replenishment need quantity that have not been fulfilled by the replenishment step of 610 with substitutes. Referring to FIG. 14B, which is a flow process 1450 for replenishment by substitution. The process begins when certain data/parameters are retrieved and defined. The data that is retrieved may include information relating to parent SKU with attributes (the parent SKU with attributes, this may be optional), subordinate SKU, original need quantity (subordinate need quantity), substitute need quantity and date, maximum earliness (ME), maximum lateness (ML), and the like. The ABP system 100 uses this information, along with any substitution preferences, to fulfill the amount of substitutes needed called "substitute need quantity" or "SNQ." The SNQ is for substitute SKU with attributes that are available on or before the latest acceptable date (substitute need date+ML). The output of the substitution function (as depicted in step 614 of FIG. 6) includes substitute available quantity, substitute availability date, and substitute feasibility flag. Based on the information provided, acceptable substitutes may be determined at step 1454. If more than one acceptable substitute exists then determine the priorities of each substitutes at step 1456. Typically, some substitutes will be more preferable than others. Thus, it is preferable that the acceptable substitutes be prioritized. At step 1458, select one of the acceptable substitutes for determining feasibility. To determine if the selected substitute is available for replenishment, a check of the inventory is first done at step 1460. Determine if the inventory can fully satisfy the need amount by the need date at step 1462. If not, then attempt to fulfill any inventory shortfall by either manufacture or purchase at step 1464. The process of replenishment by manufacturing and/or purchasing substitutes may be accomplished using the processes described above for replenishment by manufacture or purchase. If there are any more acceptable substitutes then return to step 1458 to determine feasibility of the next acceptable substitute at step 1466. At step 1468, select substitution preferences. This may be accomplished by the use of flags, which are described below. At step 1470, select one or more substitutes based on substitute priority, feasibility and substitute preferences.

Replenishment by substitution may be modeled by creating a substitution table. This table may have one or more columns, which govern the manner in which the ABP system 100 may implement substitutions. The table may be used to define a number of items.

If a parent SAD group is specified, the associated substitution will only be allowed if the order matches the SAD group. If this is not specified for a give row, the substitution rule defined by the row is valid for all subordinate SKU with attributes, which are described by the Subordinate SAD Group. In other words, the substitution can be globally applicable for a SKU regardless of the parent (when the parent column is blank) or it can be applicable only to certain parent child relationships. In doing so, the user is allowed to use a SAD Group to further constrain when a substitute is allowed.

A column in the substitution table may define a subordinate SAD group. The subordinate SAD group describes the subordinate SKU that is to be substituted. Another column may define a substitute SKU. This column (may be implemented as two separate columns: Substitute Item and Substitute SKU) describes the SKU that is an acceptable substitute for subordinate SKU with attributes.

Copy Instructions may be defined. This column contains a reference to the Copy Instructions table that specifies the attributes that have to be copied over to the Subordinate SKU. For example, the record in the substitution table may be as follows:

Parent SAD Group: Item=Router A
Subordinate SAD Group: Item=Interface Module AND Interface Type=4-port
Substitute SKU: Item=Interface Module AND Location= Atlanta
Copy Instructions: From Attribute='Interface Type', To Attribute='Interface Type' (or the user can leave this blank), To Value='8-port'.

The substitution relationship modeled above may translate to the following exemplary business rule:

For parent Router A, a 4-port interface module is always substitutable with an 8-port interface module. Although it is not illustrated in this example, the user can specify additional attributes to be copied to the Subordinate SKU using the copy instructions.

Priority may be defined by one of the columns. A given subordinate SKU with attribute (assuming that this is just a SKU) can have several substitutes. This column models the relative priority of each of these substitutes. For example, the subordinate SKU "Y" may have three different substitutes (each substitute being a different record in the table), SKU "A," SKU "B" and SKU "C." Using the priority column, the user can model relative preferences among these different substitutes. For example, the user can specify that the SKU A is the most preferred (Priority=1), SKU B is the second most preferred (Priority=2) and that SKU C is least preferred (Priority=3).

Other columns may be created and designated for other purposes. For example, a column may be designated for an Effective Date. The Effective Date is the earliest point in time at which the substitution relationship is valid. A column may be designated for Discontinue Date. The Discontinue Date is the latest point in time at which a substitution relationship is valid. A column for draw quantity may be created. The substitution feature may allow a user to model a different BOM draw quantity when a substitute is used. By specifying a draw quantity in this column, the user can override the BOM draw quantity between the parent and the subordinate (which is being substituted) when the substitute is used. For example, the parent may be SKU "X," the subordinate may be SKU "Y" , and the draw qty on the BOM relationship may be 4. If subordinate SKU Y is being substituted by substitute SKU Z, the user can specify a different draw quantity (say 5) to be used. This feature is especially useful in chemical industry applications.

A column may be created and designated for sequence number[s]. Multiple parent SAD Group—subordinate SAD Group combinations (modeling different substitution options/rules) in the substitution table may apply to the parent SKU with attribute—subordinate SKU with attribute' combination that is in memory. In this case, the substitution option/rule with the lowest sequence number is preferably used.

There are also factors that are specific to a parent SAD group—subordinate SAD group Combination (as opposed to Parent SAD Group—Subordinate SAD Group— Substitute SKU combination) that may be modeled in the substitution table (note that the rows in the substitution table may be specific to parent SAD group—subordinate SAD group—substitute SKU combination, factors which are often difficult to model in the substitution table. The BOM table may be a better table to model these factors.). For example, the ABP system 100 allows for several types of "flags," which allows users to easily implement pre-defined business rules. These flags include, for example, a "partial fulfillment" flag, a "fulfillment mode" flag, a "use until exhaust" flag and a "multi-level substitution" flag. If the partial fulfillment flag indicates that only partial fulfillment has been achieved, this indicates that a substitute can be used only if the original need quantity (before netting out/manufacturing/purchasing the original subordinate) can be fully satisfied from inventory/replenishment of that substitute alone. If the original need quantity is not fully nettable/replenishable using the substitute, this substitute will not be used. If no substitute can be found for the subordinate SKU that can fully satisfy the original need quantity (subordinate need quantity) even after trying multi-level substitution, the substitution is not feasible.

The fulfillment mode flag provides fulfillment functionality and governs the netting/replenishment behavior as the substitution function searches across multiple substitutes. There are two allowable settings for this flag: "net across all substitutes before replenishing any" and "net and replenish according to the priority of the substitutes." The manner in which the fulfillment mode flag influences the behavior of the planning process may be explained by the following example.

Suppose that SKUs A, B and C are configured as substitutes for subordinate SKU 'Y'. A is preferred over B and B is preferred over C. Assume further that the substitute need quantity is 50 and the original need quantity is 80 (indicating that 30 units were fulfilled using inventory/replenishment of subordinate SKU 'X'. Assume that the on-hand inventory positions for SKUs A, B and C is as follows:

SKU A: 20 units
SKU B: 10 units
SKU C: 10 units

Further, there are no more scheduled receipts anywhere in the horizon for SKUs A, B and C and that the partial fulfillment flag is set to YES. Based on the above example, if the fulfillment mode flag is set to "net across all substitutes before replenishing any," the manner in which the substitution function fulfils the substitute need quantity may be as follows:

1. Net Inventory of 20 units of A (after this point, 50−20=30 more units will be needed)
2. Net inventory of 10 units of B (after this point, 30−10=20 more units will be needed)
3. Net inventory of 10 units of C (after this point, 20−10=10 more units will be needed)
4. Returning now to A and try to replenish 10 units of A. Assume that only 5 units of A can be reasonably replenished. At this point we need 5 more units
5. Next, see if 5 units of B can be used to replenish. Since this is possible, the substitution algorithm fulfils the substitute need quantity using the following supplies:
   20 units of Inventory of A
   10 units of Inventory of B
   10 units of Inventory of C
   Planned Order for 5 units of A
   Planned Order for 5 units of B If the fulfillment mode flag is set to "not net across all substitutes before replenishing any," the manner in which the substitution function fulfils the substitute need quantity may be as follows:

1. Net Inventory of 20 units of A (after this point we need 50−20=30 more units)
2. Try to replenish 30 units of A. Let us assume that we can only feasibly replenish 5 units of A. After this point, we need 25 more units.
3. Net Inventory of 10 units of B (after this point we need 25−10=15 more units).
4. Replenish 15 units of B. Let us assume that this is possible. At this point, we do not need to look any further. So substitute C is not even touched.

The "use until exhaust" flag may be used to determine which source the replenishment may be sourced from. If this flag is set to 'YES', no new planned order will be created for the primary (subordinate) before exhausting all the substitution options. This flag is set to YES if there is a desire to minimize the tendency to make any new replenishments for the subordinate. In other words, if this flag is set to 'YES', the behavior of the algorithm may be as follows:

1. Net any inventory/scheduled receipts of the subordinate.
2. Attempt to fulfill the remaining quantity (if there is any remaining quantity) via substitution by invoking the substitution process. The substitution process will attempt to fulfill this need by exhausting all possible substitutes for the subordinate (including multi-level substitutes, if configured).
3. If the substitution process cannot completely fulfill the remaining quantity, attempt to replenish the subordinate by creating a planned order for the subordinate for the quantity that was still left after substitution.

The "multi-level substitution" flag directs the substitution process to use recursive techniques. If the multi-level substitution flag is set to 'YES', the ABP system may try to fulfill the substitute need quantity by calling the substitution process in a recursive fashion. If this flag is configured (i.e., set), the substitution process may look for substitutes of substitutes, or substitutes of substitutes, which are substitutes of other substitutes, and so forth.

The ABP system 100 may seek out potential scheduling opportunity for each resource on the list of admissible resources generated in Step 410 of FIG. 4. As discussed above, the system 100 may iterate through the list of locations for a given order. At every location, the system may iterate through the list of admissible resources, evaluating potential scheduling opportunities as the list is being iterated. An order may be finally scheduled using the best scheduling opportunity across all the resource-location combinations that the system has iterated through.

In order to evaluate a potential scheduling opportunity on a given resource, the system 100 will preferably first identify a potential scheduling opportunity on the resource. A potential scheduling opportunity may be defined as a bucket in time that satisfies all the constraints applicable to the order. In other words, the order can be scheduled in that bucket without violating any constraint. The potential scheduling opportunity on any given resource is a function of three different entities, material availability, resource capacity constraints and auxiliary constraints.

Essentially there are two kinds of resources, primary and auxiliary. The primary resource determines whether there is enough capacity to make or not to make the needed quantity. This is modeled at the finest granularity (for example at the day level). The auxiliary resources may also be required. These cannot be modeled at a lower level of granularity than the primary resource. All resources and material associated with an order must be simultaneously feasible.

The resource capacity constraint is generally the most fundamental constraint associated with resources. Typically, every resource will explicitly have a capacity constraint associated with it. Any order that is scheduled on a resource will be checked against the resource capacity constraint. Also, it may be assumed that the time buckets on the capacity constraint have the finest granularity. In order to model a capacity constraint for a resource, a capacity calendar may be created and associated with a resource or several resources via, for example, a resource group.

Unlike resource capacity constraints, auxiliary constraints are "abstract" constraints that may or may not apply to a given order. Auxiliary constraints may be implemented with Boolean triggers, which define the applicability of the constraint to the order. In addition to the resource capacity constraint, orders are checked for feasibility with respect to other constraints. These auxiliary constraints are triggered by presence or absence of attributes (or combination of attributes). An example of an auxiliary constraint is:

Number of Red Cars with Sunroofs<100

This is an auxiliary constraint that applies to orders that have both the following attributes: Color=Red and Sunroof=Yes.

To create an auxiliary constraint, specified entities may be "tied" together. The three entities are a SAD group, a resource or a resource group and a calendar of maximums. To illustrate this concept, the following example is provided. Suppose that no more than 50 cars a day can be produced and each week is defined by seven workdays at the Atlanta factory. If we decided to model the primary capacity constraint at the daily level, it would have a maximum of 50 cars per day. If we decided to model the primary capacity constraint at the weekly level, it would have 50*7=350 cars per week. Suppose the number of red cars with sunroof manufactured at Atlanta should not exceed 50 cars per week. Next, the user would create an auxiliary constraint, a SAD Groups that specified (Color=Red and Sunroof=YES), and specify the maximum on the constraint to be 50 cars per week. An auxiliary constraint can be specific to a resource, specific to a resource group or global. If the constraint is specific to a resource, the constraint applies only when an attempt is made to schedule the order on that resource. If the constraint is global, the constraint applies regardless of which resource the order is being scheduled on. In the example above, the constraint is specific to all resources based at Atlanta. In implementing an auxiliary constraint, a calendar that is associated with a constraint may be created. Each constraint may have a mechanism for specifying how much of the capacity of one of its states (buckets) will be used by an order if that order is scheduled in that state (bucket). There are several ways in which an order may decrement the capacity of a constraint:

Case 1: (qty) Decrement the capacity of the bucket by the required quantity on the order. In this case, always decrement the quantity of the order. For instance, if five cars are needed, then decrement by five. Used for the constraints concerning the number of allowable units.

Case2: (1) Decrement the capacity of the bucket by one unit for each order. In this case, always decrement 1 for an order. Used for constraints limiting the total number of orders allowed as opposed to the quantity being produced.

Case 3: (UDA) Lookup a configured numerically valued attribute of the order/item/SKU and decrement the capacity of the bucket by the value of the order/item/SKU attribute. In this case, use the value in a User Defined Attribute ("UDA") to determine how much to decrement. Typically used when a user wants to constrain the total order quantity and another attribute modeled externally at the same time. For example, assume that a shipping company is limited to how units can be shipped on a vehicle, and also desires to constrain the total weight of the shipment. In this case, one could put the total weight of the order in a UDA.

Case 4: (UDA*qty) Lookup an order/item/SKU attribute value and decrementing zero against the capacity if the value is distinct from the values for that attribute on orders previously scheduled in the state, and decrementing one otherwise. In this case, use the value in a UDA,* the order quantity to determine how much to decrement. Assume a factory that is limited to how many vehicles can be produced in a day, and also constraining on the number of hours it takes to make a car. In this case, one could put the number of hours that it takes to make a single car in a UDA and multiple by the number of cars in the order to get the total number of assembly hours needed.

Case 5: (set) Lookup an order attribute value and determining if this value was present in orders in the previous (or next) states; decrement one unit if the attribute value is not present in the previous (or next) state and decrement zero otherwise. Decrement 1 if the SKU/attribute value is not in the bucket already, otherwise decrement 0. Typically used to limit the number of types of things that can be done in a bucket.

Case 6: (ons) Decrement 1 if the SKU/attribute value is not in the previous bucket but is in the current bucket and decrement 0 otherwise. Typically used to constrain how many new types of things can be done when moving from bucket to bucket.

Case 7: (offs) Decrement 1 if the SKU/attribute value is in the previous bucket but is not in the current bucket and decrement 0 otherwise. Typically used to constrain how many types of things can be removed when moving from bucket to bucket.

Figure 15A:
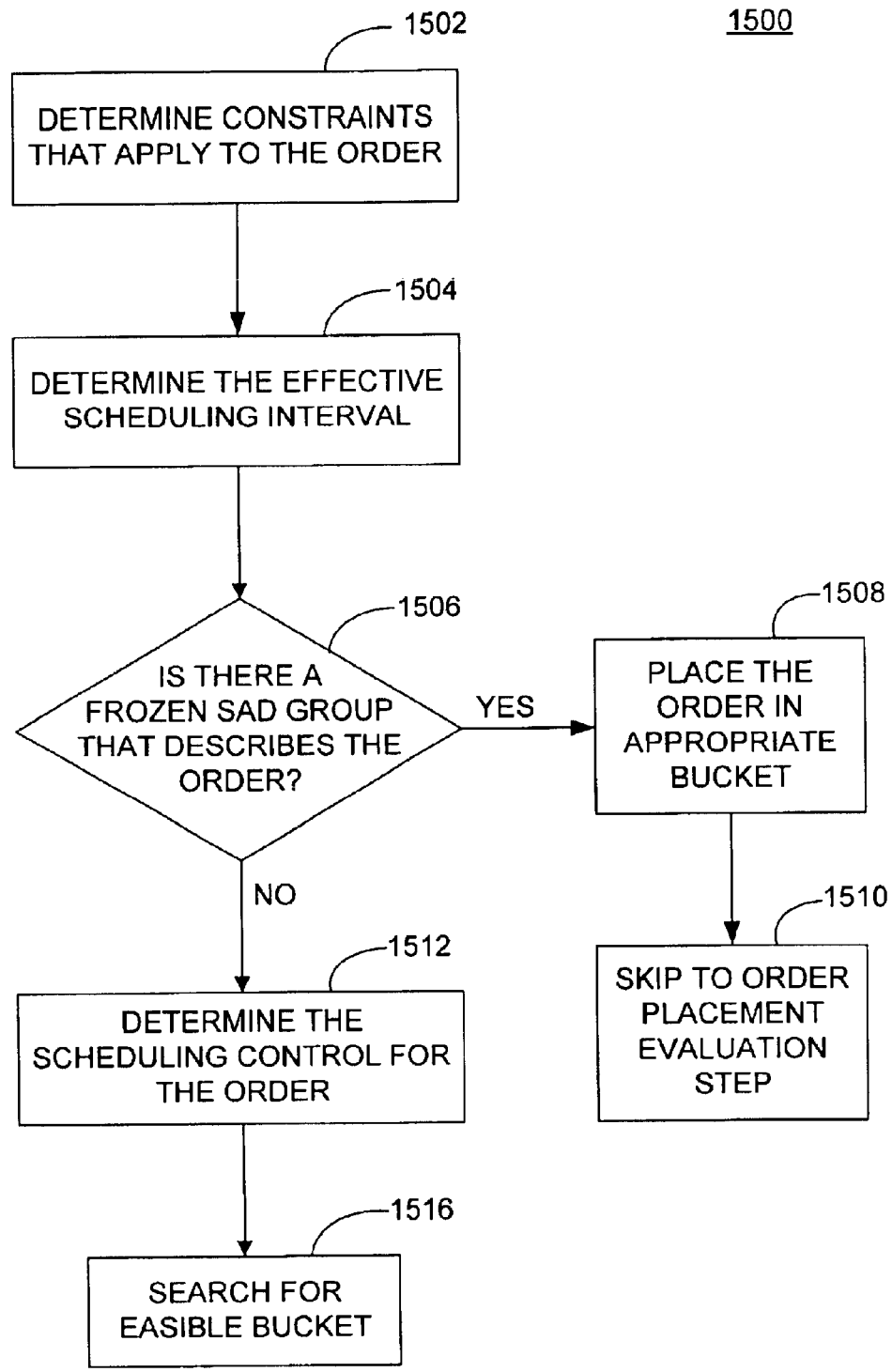
FIG. 15A is a flow diagram depicting a process for determining constraint feasibility.
Figure 15B:
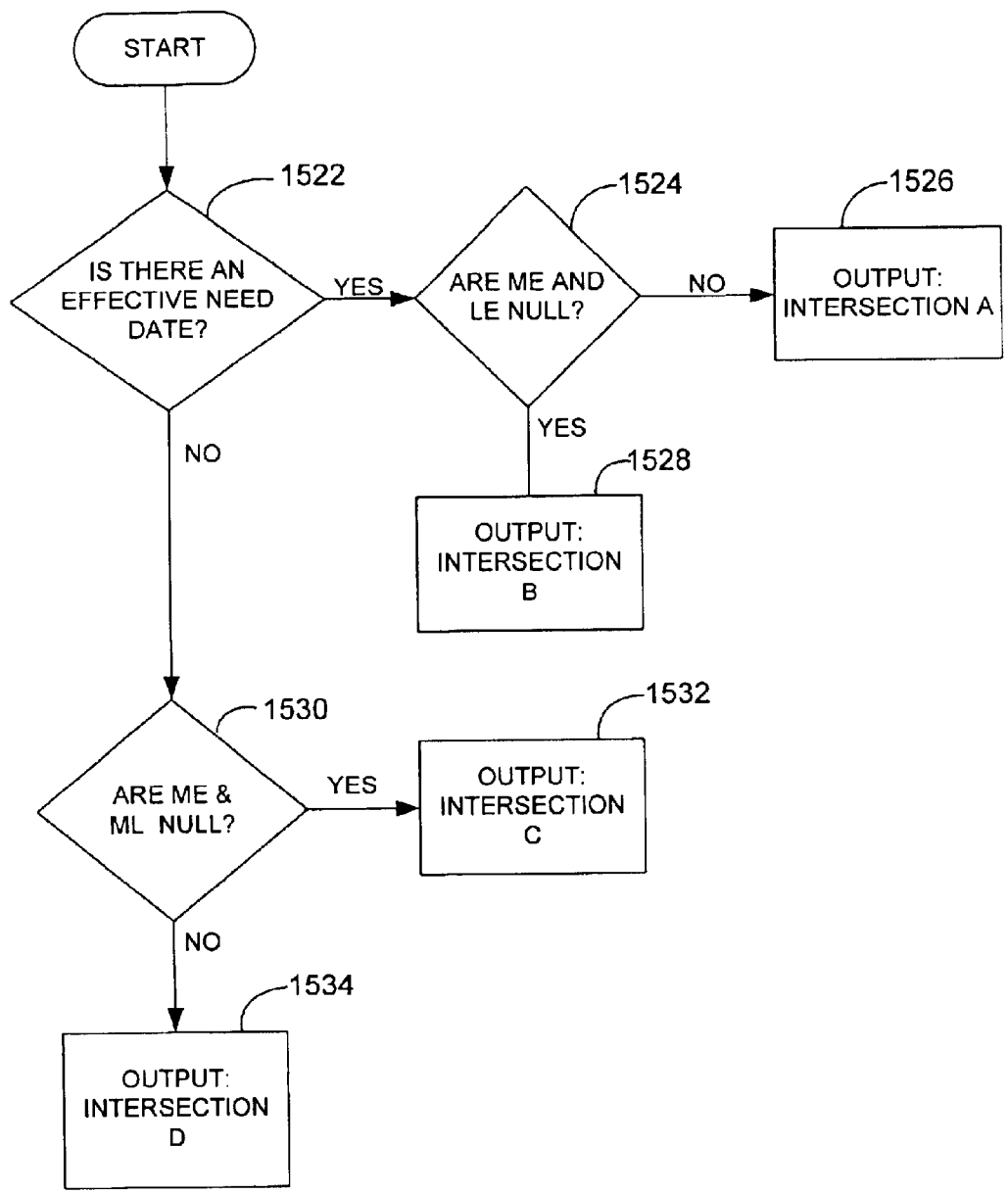
FIG. 15B is a flow diagram for a process for determining an effective scheduling interval.

Referring to FIG. 15A, which is a flow process 1500 for determining constraint feasibility. The constraint feasibility flow process 1500 attempts to find a bucket on the capacity constraint in which the order is feasible across all constraints (capacity and auxiliary) that apply to it. There are several steps involved in the constraint feasibility process 1500. The process 1500 is based on the fact that several parameters are known prior to implementing the process. For instance, the required quantity of the order to be manufactured and the material available date for the order are assumed to be available from previous steps. Also, as a result of the previous steps, the scheduling interval for the order is known. Based also on the previous steps, the targeted resources (e.g., admissible resources) are known. A brief description of the flow process 1500 is provided below followed by a more detailed description of some of the steps in FIG. 15A. The process 1500 begins at step 1502 when a set of constraints that apply to the order being planned is determined. The set of constraints that apply to the order include the capacity and auxiliary constraints for the resource[s]. At step 1504 determine the effective scheduling interval. In other words, narrow the valid scheduling interval using the earliest material availability of the configuration. At step 1506, determine if a frozen SAD group describes the order. If a frozen SAD group describes this order, the order is placed in the bucket on the capacity constraint in which the effective need date falls at step 1508. The term "placed" is used because the order is not scheduled yet. The resource on which the current attempt to place the order into is just one of the resources in the set of admissible resources. Note also that an order placement evaluation process, which is described below, is used to evaluate the scheduling opportunity (placement) on the current resource. The order is scheduled only after the best scheduling opportunity is found. At step 1510, the process skips the rest of the steps in the constraint feasibility process 1500 and goes directly to the order placement evaluation step at step 421. If there is no frozen SAD group that describes the order then determine the scheduling control for the order at step 1512. At step 1514, search for a feasible bucket. In step 1504 of FIG. 15A, a determination was made to determine the effective scheduling interval. The scheduling interval may be defined by the intersection of one or more time intervals. The time intervals will depend upon various factors associated with the order. At least four types of effective scheduling intervals are possible. Referring to FIG. 15B, which is a process for determining an effective scheduling interval based on certain parameters. In step 1522, determine whether there is an effective need date. For example, did the step 402 (of FIG. 4) yield a non-NULL effective need date? If so, then an effective need date is present and the process moves to step 1524. At step 1524, determine whether maximum earliness ("ME") and maximum lateness ("ML") are NULL. If both are NULL then the effective scheduling interval is intersection A. Intersection A is defined as the intersection of the following intervals:

The interval between Material Available Date and Plan End Date.

The interval between Plan Start Date and Plan End Date.

The interval between (Effective Need Date−Max Earliness) and (Effective Need Date+Max Lateness).

The interval between Start Date of the first bucket on the capacity constraint and End Date of the last bucket on the capacity constraint.

If both ME and ML are NULL, then the effective scheduling interval is intersection B at step 1528. Intersection B is defined as the intersection of the following intervals:

The interval between the Material Available Date and the Plan End Date.

The interval between the Plan Start Date and the Plan End Date.

The interval between the Start Date of the first bucket on the capacity constraint and the End Date of the last bucket on the capacity constraint.

If the order has no effective date then at step 1530, determine whether ME and ML are NULL. If both are NULL, then the effective scheduling interval will be intersection C at step 1532. Intersection C is defined as the intersection of the following intervals:

The interval between the Material Available Date and the Plan End Date.

The interval between the Plan Start Date and the Plan End Date.

The interval between the Start Date of the first bucket on the capacity constraint and the End Date of the last bucket on the capacity constraint.

If the order has no effective need date, and ML and ME are not NULL, then the effective scheduling interval is intersection D at step 1534. Intersection D is defined as the intersection of the following intervals:

The interval between the Material Available Date and the Plan End Date.

The interval between the Plan Start Date and the Plan End Date.

The interval between the Start Date of the first bucket on the capacity constraint and the End Date of the last bucket on the capacity constraint.

Figure 15C:
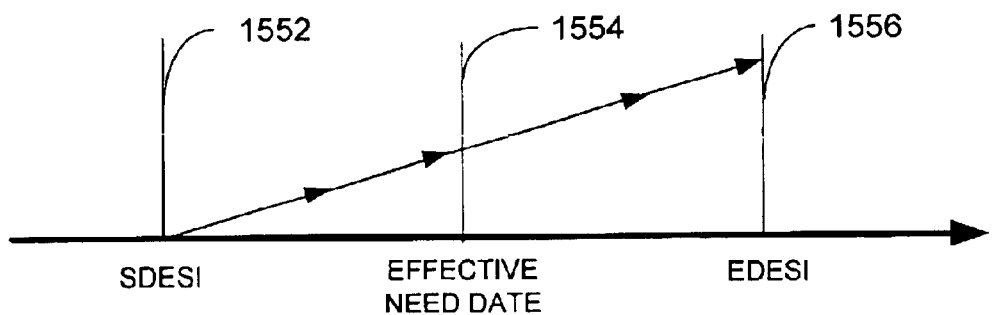
FIGS. 15C to 15F are timelines depicting various scheduling control concepts.
Figure 15D:
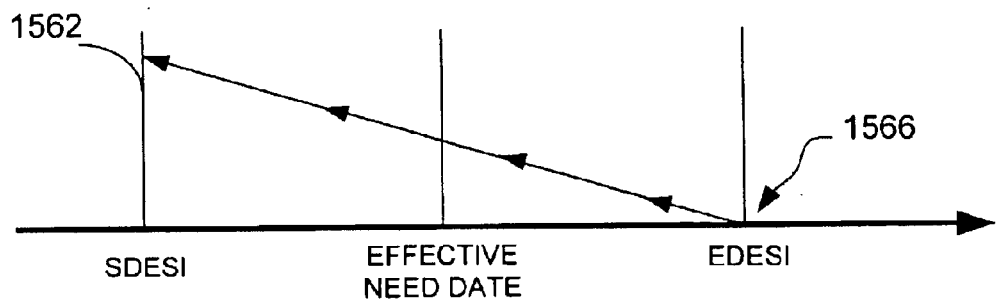
Figure 15E:
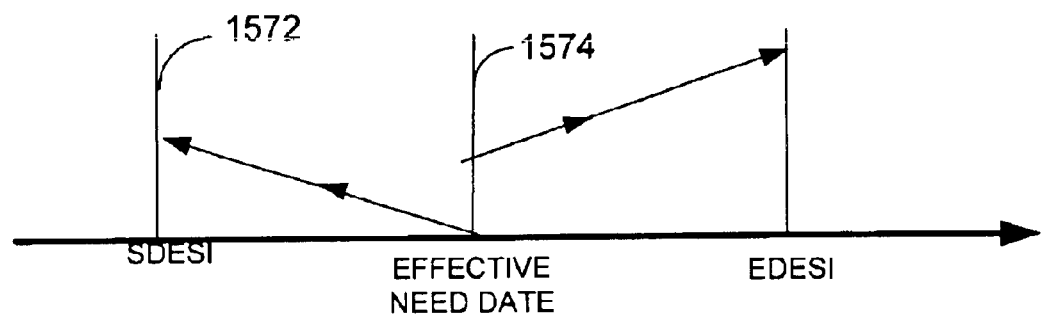
Figure 15F:
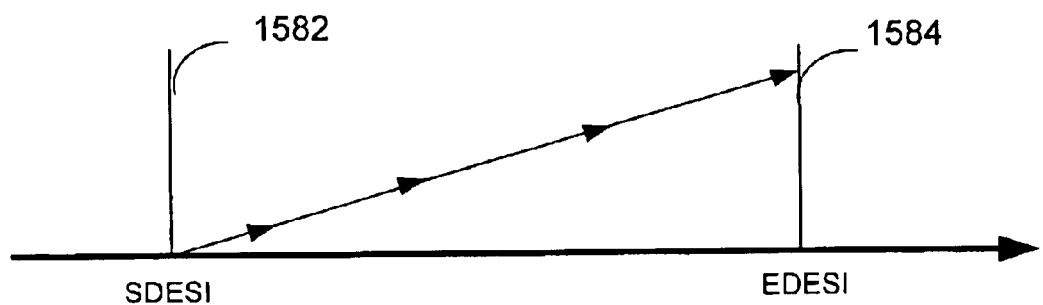

In step 1512, the scheduling control for the order is determined. Scheduling controls affect the manner in which the search for a feasible bucket is conducted by the process. Four types of scheduling controls or goals may be supported by the process, forward, backward, just-in-time ("JIT"), and "do not schedule." Referring to FIG. 15C, which is a timeline 1550 illustrating the forward scheduling control concept. In this timeline 1550, the relevant points of time are start date of the effective scheduling interval ("SDESI") 1552, the effective need date 1554 and the end date of the effective scheduling interval ("EDESI"). The timeline moves from the left side (earlier time periods) to the right side (later time periods). If the scheduling control for the order is "forward," the search for a feasible bucket (that satisfies the capacity constraint and all applicable auxiliary constraints) begins at the bucket on the capacity constraint in which the start date of the effective scheduling interval 1502 falls and move forward from there. The order is placed in the first bucket that satisfies all the constraints. If we cannot find a single feasible bucket in the interval between SDEDI 1552 and EDEDI 1556 interval, then the order fails to schedule. FIG. 15D is a timeline 1560 that illustrates the backward control concept. If the scheduling control for the order is "backward," the search for a feasible bucket (that satisfies the capacity constraint and all applicable auxiliary constraints) starts at the bucket on the capacity constraint in which the end date of the effective scheduling interval falls and moves in the backward direction (e.g., towards the left side of the timeline 1560). The order is placed in the first bucket that satisfies all the constraints. If a feasible bucket in the SDESI 1562 and EDESI 1566 interval is not found then the order fails to schedule. FIGS. 15E and 15F are timelines 1570 and 1580 that illustrate two different cases of JIT scheduling control concept. In the first case FIG. 15E, the order has an effective need date 1574. If the order has an effective need date 1574, the system first tries to place the order in the bucket on the capacity constraint in which the effective need date falls. If this bucket is not feasible, the system proceeds in the backward direction (schedule early) until it reaches the SDESI 1572 date. If it is determined that no bucket in the interval between SDESI 1572 and effective need date 1574 is feasible, the system then proceeds in the forward direction starting from the effective need date 1574. If it is determined that no bucket in the interval between the effective need date 1574 and EDESI 1576, then the order fails to schedule. FIG. 15F is a timeline 1580 that illustrates the second JIT case in which the order has no effective need date. If the order has no effective need date and if the scheduling control type is JIT, the behavior is very similar to "forward scheduling." In this case, the system begins looking for a feasible bucket by looking first at the bucket on the capacity constraint in which the SDESI 1582 falls and proceeds to search for a feasible bucket (that satisfies the capacity constraint and all applicable auxiliary constraints) in the forward direction. The order is placed in the first bucket that satisfies all the constraints. If a feasible bucket is not found in the interval between the SDESI 1582 and EDESI 1584, then the order fails to schedule.

The determination of the scheduling control to be applied to the order will typically be based on user preferences. For example, to reduce storage costs, many manufacturers prefer JIT approaches. Alternatively, some users may use more than one type of control depending upon the situation.

At step 1516 (FIG. 15A), a search is made for a feasible bucket. Once the scheduling control that applies to the order has been determined, a feasible bucket, which the order can be placed, may be determined based on the scheduling control and other factors described above such as resource constraints. The ABP system 100 places the order in a bucket only after ensuring feasibility across all constraints (capacity and applicable auxiliary). The search behavior may be guided by te4h scheduling control applicable to the order. While there are several mechanisms available for searching across all the buckets in the scheduling interval, the mechanism adopted should primarily emphasize speed. The basic principles behind this approach are as follows.

The resource capacity constraint is used as the "anchor constraint" in the search mechanism. It may be assumed that the capacity constraint has the finest granularity among all constraints. The process may begin by checking for capacity in a desired bucket on the capacity constraint. Several rules may determine which buckets will be the desired buckets.

If sufficient capacity is available in the desired bucket then the first auxiliary constraint may be reviewed to check for feasibility (such a movement across constraint may be termed a "vertical move"). If sufficient capacity is available for the first auxiliary constraint, a "vertical move" may be made to the second auxiliary constraint. Similarly, if sufficient capacity is available for the second auxiliary constraint, a vertical move may be made to a third auxiliary constraint. These vertical move steps may then, of course, continue repeat with other auxiliary constraints. If, at any point in time, a constraint is found that does not have sufficient capacity in the bucket that we first look in, a search may be made either backward or forward (depending on the scheduling control and the bucket that is being looked at) across multiple buckets on the constraint. This may be done until a bucket on the constraint that satisfies the required quantity on the order is found. Such a movement across multiple buckets on a single constraint is called a "lateral move." There are various rules that may apply to both lateral and vertical moves.

Whenever there is a lateral move on an auxiliary constraint, in order to find a feasible bucket, the capacity constraint must be rechecked again. For example, whenever there is a "lateral move" on an auxiliary constraint in order to find a feasible bucket, the capacity constraint is preferably rechecked again. As a result, the system "vertically move" to the capacity constraint, "laterally move" on the capacity constraint if necessary, vertically move to the first "auxiliary constraint", laterally move on the first auxiliary constraint if necessary, "vertically move" to the capacity constraint again if there was a "lateral movement" on the first auxiliary, and so forth. For example, suppose there are three constraints, A, B, and C, 10 buckets, A is always available, B is available buckets 3, 4, 7, 8, 9, 10 and C is available buckets 1, 2, 5, 6, 7, 8, 9, 10 and material is feasible starting with bucket 1. Suppose further that it is desirable to scheduling forward, and there is no order start date. Then the system will preferably start checking constraints at bucket 1. In this case, A1 is first checked, and if okay then do a vertical move and check B1 and find a problem. Next, there may be a choice to check constraint A2 or B2. The ABP system 100 finds the next available bucket for B before it goes back and checks A. In this case, it would find bucket 3 is available for B, and then it would restart the check with A3. It is in the user's best interest to place constraint B before C if B is, in general, more constrained than C. This may reduce the amount of checking.

In essence, the search generally comprises a combination of "vertical moves" across constraints and "lateral moves" across buckets on a constraint. The search continues until one of the two conditions are satisfied:

1. A feasible bucket on the capacity constraint that satisfies all the auxiliary constraints is found. In this case, the order may be placed in the feasible bucket that was found and proceed to the order placement evaluation step.
2. Not a single feasible bucket is found in a search through the entire scheduling interval. In this case, the order cannot be feasibly placed on the current resource. So the system attempts to place the order on the next resource in the list of admissible resources. This involves the repetition of the constraint feasibility assessment on the next resource. If the current resource is the last resource in the list of admissible resources, the system exits the resource loop, fetches the next SKU from the list of admissible SKUs, and repeats the process from step 408 (FG SKU initialization) onwards using the next SKU.

The following example is provided illustrating the above concepts. In this example, an attempt is made to schedule an order on resource R1. The order has the following characteristics:

Effective Need Date: Day 3 of Week 6
Effective Scheduling Interval: (Start Date of Week 4, End Date of Week 8)
Order Qty=1
Scheduling Control=JIT Constraints that apply are the following:

Resource capacity constraint for Resource R1
Two auxiliary constraints (Constraints A and B)

Figure 16:
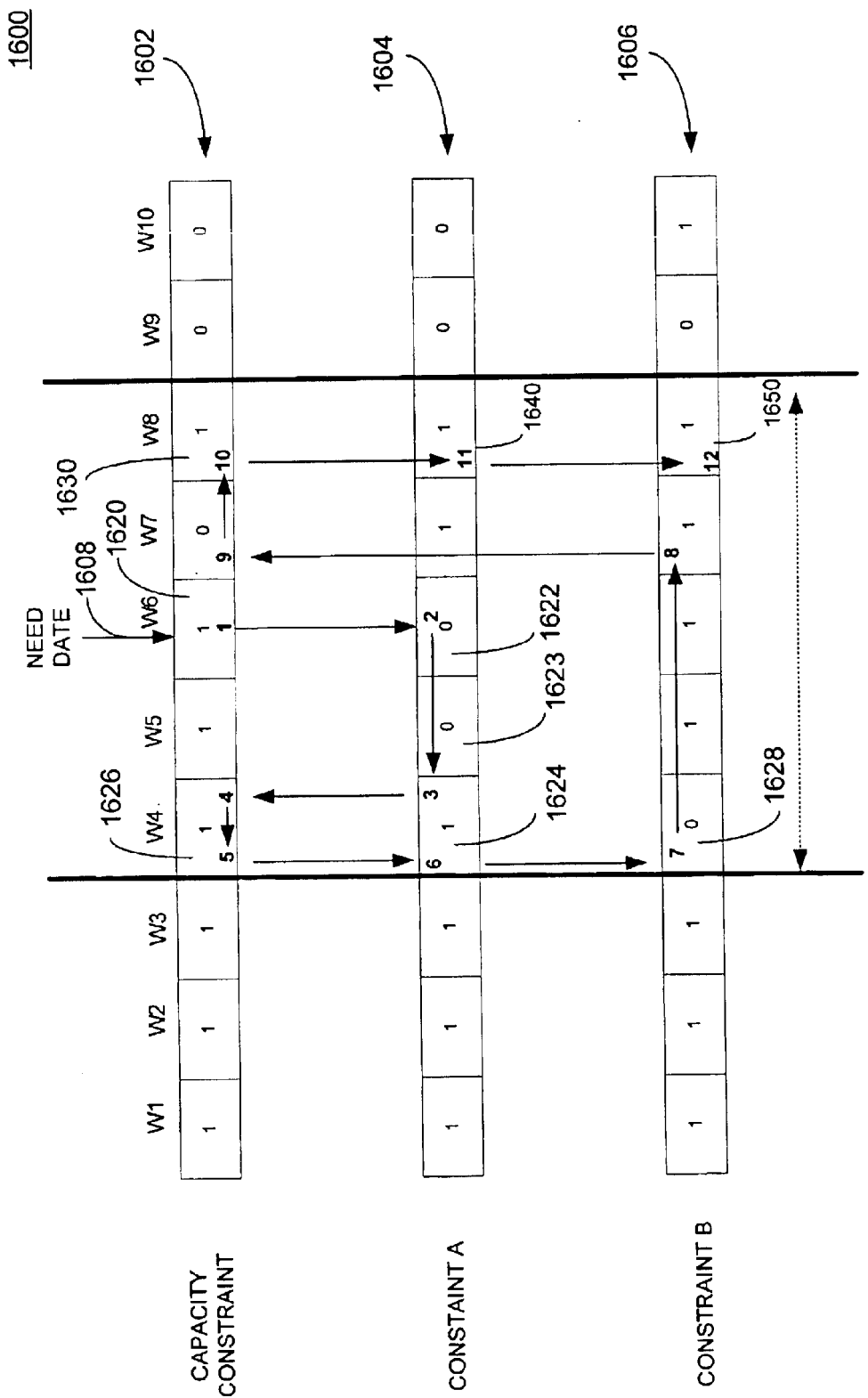
FIG. 16 is a block diagram depicts a visual representation of an exemplary search process for finding a satisfactory time bucket.

Referring to FIG. 16, which is a block diagram 1600 that is a visual representation of an exemplary search process for finding a satisfactory time bucket based on the characteristics and constraints listed above. The diagram 1600 consists of three rows 1602 to 1606 of constraints divided into weekly time periods represented by boxes. The three constraints represented are capacity constraint 1602, and two auxiliary constraints, constraint A 1604 and constraint B 1606. Here, the weekly time periods 1607 represents buckets. The top row 1602 represents the available quantities (i.e., capacities) under capacity constraint for each week (as represented by the number within each box). The middle row 1604 represents the available quantities (i.e., capacities) under constraint A for each week. The bottom row 1606 represents the available quantities (i.e., capacities) under constraint B for each week. To satisfactorily place an order in a specific time bucket (in this case, the buckets are weekly intervals), there must be sufficient capacity for each constraint for the given bucket. The need date falls in the middle of week 6 as indicated by 1608. The effective scheduling interval 1610 starts on week 4 and ends on week eight. Since the scheduling control is set at JIT, the system attempts to schedule the order nearest to the need date. Therefore, the search begins at the time bucket 1620 where the need date 1608 falls as indicated by "1." Since the order quantity (=1) is the same as the quantity available under the capacity constraint (as indicated in box 1620), the capacity for the capacity constraint for week six is satisfactory. Next, a "vertically move" to box 1622 is made. Box 1622 represents the capacity of constraint A in week 6. The vertical move is made to determine whether the capacity of constraint A is sufficient. In this case, the capacity of box 1622 is zero. Therefore, the capacity of constraint A is not satisfactory and the system "horizontally moves" to earlier buckets to locate a bucket having sufficient capacity. The time bucket for week 5 is also not satisfactory since the capacity for constraint A in week five, as indicated in box 1623, is zero. In this example, the system finds that the capacity of box 1624, which represents the capacity of constraint A in week four, is sufficient. However, because the system had to leave the previous bucket (i.e., week 6), the system must return to the base constraint (i.e., capacity constraint) and review the capacity for week four of the capacity constraint. Thus, from box 1624, the system vertically moves to fox 1626 to determine whether the capacity of the capacity constraint in week four is sufficient. In this case, there is sufficient capacity in box 1626 (as indicated by quantity "1" in box 1626). Therefore, the system goes through box 1624 to recheck and see if the capacity for constraint A in week 4 is sufficient (which it established earlier). Alternatively, the step of rechecking the capacity of box 1624 may be disregarded since the capacity of box 1624 was already determined to be satisfactory. The system then vertically moves on to box 1628 to determine if the capacity of constraint B in week four is sufficient. Since, the capacity of week four for constraint B is zero, the system must move to another bucket in the bottom row. However, because the effective scheduling interval 1610 ends on week 4, the system may not move to an earlier bucket. Therefore, it must move to the right or to later time buckets. The system then skips weeks five and six (boxes 1630 and 1632) since it found that the capacities for constraint A in those weeks were insufficient (as shown in boxes 1622 and 1623). Week 7's capacity for constraint B, however, is sufficient as indicated by box 1634. The system then moves back to capacity constraint to determine if the capacity for capacity constraint in week 7 is sufficient. Box 1636, which is the capacity for capacity constraint in week seven, indicates that there is zero capacity for capacity constraint for that bucket. Therefore, the system moves to the next (later) bucket. At box 1630, the system determines that the capacity of capacity constraint for week eight is satisfactory. Therefore, the system moves down to box 1640, which represents the capacity of constraint A for week 8 and determines that that capacity has also been satisfied. The system then moves down to box 1650, which represents capacity of constraint B for week 8, and finds that that capacity is also satisfactory. Thus, all three constraints 1602 to 1606 are satisfactory in week 8 and the search ends.

Rules for finding the "desired" bucket may also be implemented. A desired bucket is the bucket that is most desirable. Therefore, in most situations, it is the first bucket to be checked for feasibility (in the above example, it was the bucket for week 6). The identity of the desired bucket will depend upon several factors such as scheduling control. For example, the desired bucket will be the bucket containing the effective need date of the order if the scheduling control is JIT and if the order has a non-NULL effective need date as demonstrated above. The desired bucket will be the bucket containing the start date of the effective scheduling date if the scheduling control is set at "forward" or if the scheduling control is Jit and the order has no effective need date. Finally, the desired bucket will be the bucket containing the end date of the effective scheduling interval if the scheduling control is backward.

In step 416 of FIG. 4, the ABP system 100 checks the material capacity compatibility. This means that the system 100 rechecks the feasibility of the configuration/resource bucket opportunity by recursively creating any necessary scheduled receipts for the finished good SKUs and its subordinates. The receipts are use to order material for the replenishment steps of the planning process. The receipts for the finished good SKU should preferably be created at the beginning of the bucket for which manufacturing capacity is found. For subordinate SKUs, the scheduled receipts should be pushed backward based on the lead-time of the parent SKUs. If, for any SKU, more quantity needs to be ordered in a bucket than the period maximum for the SKU, scheduled receipts are created for the previous bucket. There should be at least one period or set of periods where the material can be ordered because of the period maximum check performed during the material feasibility step. If the minimum/increment/maximum rules cause material to be non-feasible here then the configuration/resource/bucket combination will also be non-feasible. In such a case, the system 100 will continue to the next configuration. If, for any subordinate, the BOM relationship for the SKU and that subordinate is invalid for the period in which the SKU is to be manufactured or replenished, the configuration is non-feasible. The process may then continue to the next configuration.

In step 418, the ABP system 100 evaluates each bucket/resource opportunity for the FG SKU and selects the best bucket/resource combination (as depicted in step 422). This may be generally accomplished by grading each opportunity and selecting the opportunity with the best grade.

Preferably before commencing the actual evaluation of a bucket/resource opportunity the multi-level objective function will be defined. An objective function computes a vector (or a grade) whose entries are the grades for each level of the objective. At each level, the grade is a weighted sum of grades given by the metrics. A metric table may be created and used to define each of the metrics. The table may further define thresholds for each level of the objective, and tolerances to determine whether two different grades at a given level should be considered equal. Once the table has been established, the resource/bucket opportunity may be graded using the multi-level objective function.

The ABP system 100 preferably incorporates a multi-level objective function to determine the best placement for an order. If the ABP system 100 finds multiple opportunities for planning an order, the objective function is used to measure each opportunity and choose the best one. Each opportunity may be graded based on each object of the multilevel object function. An objective function is made up of a set of metrics. At least three metrics are available, Lateness (a measure of where the order was planned versus the effective need date for the order), total use (a measure of how full the bucket on the capacity constraint in which the order is planned), and transportation (the transportation cost between the location of the resource on which the order is manufactured and the customer location on the order). The metrics that make up an objective may be grouped into tiers, or levels. Each metric within a level may be weighted. An objective may use one or more metrics. For example, to model a business practice of minimizing the number of late orders, an objective made up of just the lateness metric would be appropriate. The lateness metric would be a level one metric with a weight of one. A more sophisticated object might be to minimize the number of late orders and if an order can be made on more than one resource and the lateness metric is the same for each resource, pick the resource that minimizes the transportation cost to the customer location. To model this business practice, an objective with two metrics and two levels can be created. The lateness metric is a level one metric. The transportation metric is a level two metric. This means that if there is an opportunity for using two locations, if one location could improve the timeliness of an order (specified by the user as a tolerance), it will be used regardless of the transportation cost. On the other hand, if both locations can meet the order needs, the location with the smallest transportation cost is used. A tolerance can be defined for each level of the objective. The tolerance for a level is used when comparing objectives. If the difference of the two numbers being compared is less than the tolerance, the numbers are considered to be equal. For instance, the primary metric of an objective is transportation cost, but if the cost of producing an order at one location versus another is within ten dollars, use a lateness metric to choose the best location. A grade, which is a vector, is computed by the objective. Each element of the vector is a weighted-sum of the grades computed by the metrics for a single tier. Two vector grades are compared element-by-element. The first pair of elements is compared. If they are equal (within a defined tolerance for that tier) the next pair of elements is compared. And so forth. If they are not equal, the element that is lower is considered better and the subsequent tiers are not checked.

Once all of the resources at an acceptable location are evaluated and the best resource has been selected for the location, the process 400 may repeat the steps of evaluating each bucket/resource opportunities at each of the other acceptable locations if there are any at step 424. If there are no more acceptable locations then the process selects the best location/resource/bucket opportunity at step 426 and assigns the order to that opportunity at step 428. The process 400 then determines whether there is any more unscheduled order at step 430. If there are more unscheduled orders, then the next highest priority unscheduled order is selected and the process of evaluating and selecting the best location/resource/bucket opportunity for that order is repeated. If, however, there are no more orders to plan then the process 400 ends.

Figure 17:
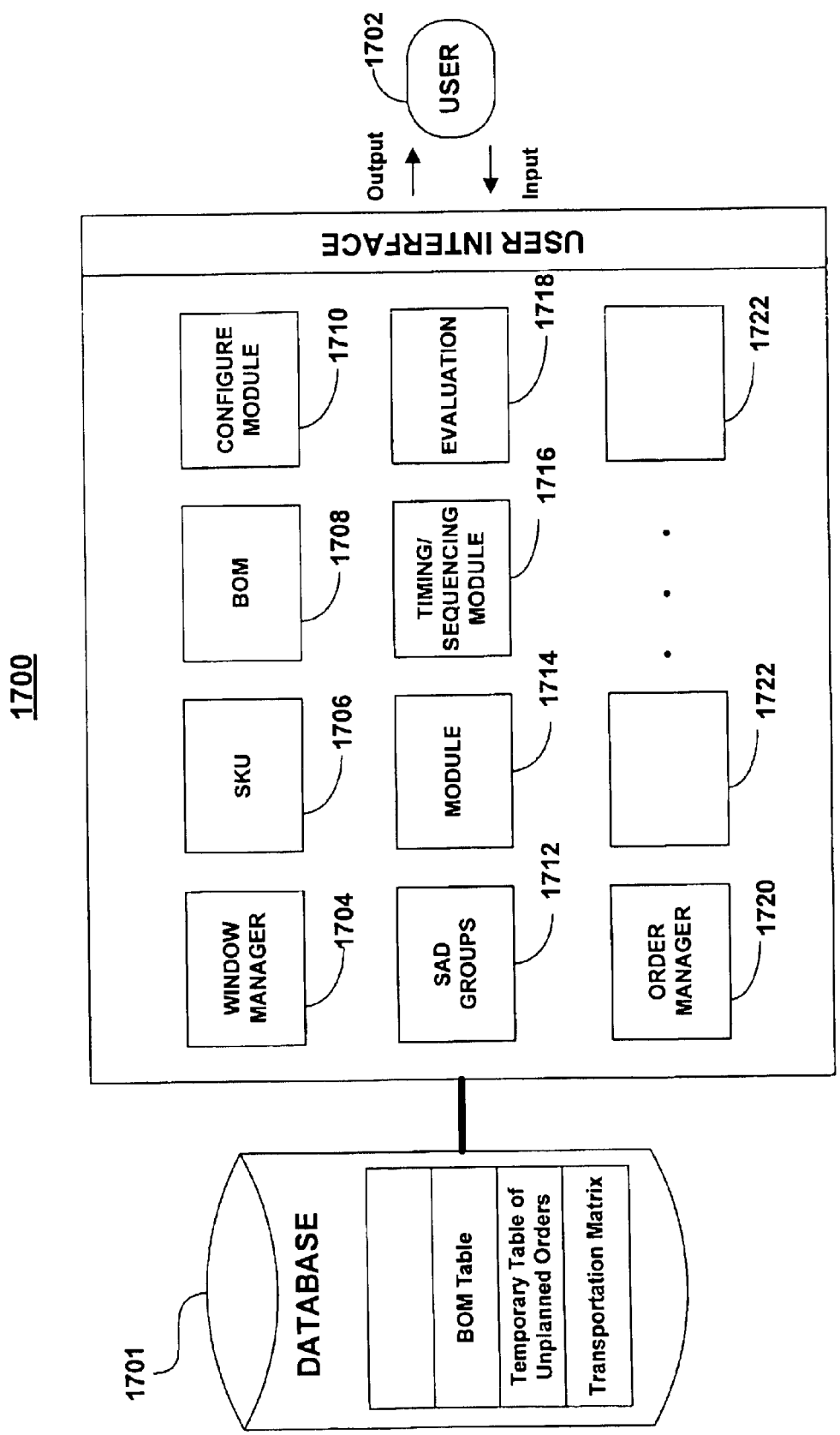
FIG. 17 is a block diagram depicting an attribute base planning system according to one embodiment of the present invention.

Referring now to FIG. 17, which is a block diagram depicting the ABP system according to one embodiment of the present invention. The system 1700 may include a computer device such as personal computers, workstations, servers or any other devices having a microprocessor. The system 1700 may include a database 1701 which may comprise of a number of tables including a temporary table for unplanned orders, BOMs, configurations, orders, and the like, and may include a transportation matrix. The system 1700 receives inputs from user[s] 1702 and generates planning outputs. The system 1700 may comprise a number of modules 1704 to 1722 to provide a number of functionalities. For example, the system 1700 may include a window manager module 1704 for managing an order window. The module 1704 may be use to organize and manage the order window. For example, window manager module 1704 may select the orders that are to be placed in to a window and prioritize those orders in the window. It may then be used to select the highest priority order for planning purposes. The SKU module 1706 may be used to organize, maintain, process and manage SKUs. Similarly, the BOM, configuration and SAD group modules 1708 to 1712 are used to create, process and manage BOMs, configurations and SAD groups. The model module 1714 is used to create and manage models, which may be defined by the network resources, constraints and business rules, time buckets, and the like. The time/sequencing module 1716 may be used to create timelines and determine, process and manage timing events and time items. The evaluation module 1718 is used to evaluate and selecting various alternatives that may arise during the process according to the present invention. For example, the module 1718 may evaluate alternative opportunities, to evaluate alternative configurations, and the like. An order module 1720 for reviewing and parsing the data of an order. Based on the above descriptions, those skilled in the art will recognize that a number of other modules 1722 may also be included in the system 1700. These may include, for example, modules for managing and implementing business rules, searching goals, multi-level object function, and the like. Accordingly, the process and system in accordance with one embodiment of the present invention may be implemented using a combination of both software and hardware.

It will be apparent to those skilled in the art that various modifications and variations can be made to the process and system for planning the utilization of network resources of the present invention without departing from the spirit or scope of the invention. Thus, it is intended that the present invention cover the modifications and variations of this invention provided that they come within the scope of any claims and their equivalents.

What is claimed is:

1. A method for planning the replenishment of a supply chain network resource by purchase in order to fulfill demand as defined by an order, wherein said order defining a stock keeping unit with attribute, comprising the steps:

determining time items, wherein said time items are specific points in time or time periods relating to said order and wherein at least one of said items is a purchase lead time based on said stock keeping unit with attribute, and wherein said time items further comprising a purchase order placement date, a replenish start date, a replenish need date, a maximum lateness, and a maximum earliness, wherein said purchase lead time is defined as amount of time needed to make available requested replenish material;

determining timing events based on said time items;

creating a timeline comprising of said timing events and time items;

selecting an applicable scenario based on said timeline from a group of predetermined scenarios; and generating an output based on said applicable scenario.

2. The method of claim 1, wherein said purchase order placement date is defined as the difference between said replenish need date and said purchase lead time.

3. The method of claim 1, wherein said time events comprising of a date as defined by the sum of purchase order placement date and maximum lateness.

4. The method of claim 1, wherein said time events comprising of a date as defined by the difference between said replenish need date minus maximum earliness.

5. The method of claim 1, wherein said time events comprising of a date as defined by the sum of said replenish need date and said maximum lateness.

6. The method of claim 1, wherein said time events comprising of a date as defined by the sum of said replenish start date and purchase lag time.

7. The method of claim 1, wherein said time events comprising of a date as defined by the difference between purchase order placement date minus maximum earliness.

8. The method of claim 1, wherein said time events comprising of dates as defined by the sum of purchase order placement date and maximum lateness, the difference between said replenish need date minus maximum earliness, the sum of said replenish need date and said maximum lateness, the sum of said replenish start date and purchase lag time, and the difference between purchase order placement date minus maximum earliness.

9. The method of claim 8, wherein said scenarios are based on sequencing of said timing items and time events.

10. The method of claim 9, wherein said scenarios are each associated with specific outputs.

11. The method of claim 1, wherein said outputs generated will be full replenishment is possible and on time, full replenishment is not possible on time, or replenishment is infeasible.

12. The method of claim 1, further comprising the step of creating a purchase model, wherein said purchase model is modeled by defining period maximums to restrict the amount of materials that a resource may produce over a time period.

13. A method for planning the replenishment of one or more supply chain network resources in order to fulfill demand as defined by orders, wherein said orders having attributes, comprising the steps:

prioritizing said orders according to said order attributes;

selecting highest priority order, wherein said highest priority order defining a stock keeping unit with attribute;

selecting one of said resources for fulfilling said order;

replenishing said resources in order to completely fulfill said order, wherein said replenishment step further comprising the steps:

determining time items, wherein said time items are specific points in time or time periods relating to said order and wherein at least one of said items is a purchase lead time based on said stock keeping unit with attribute;

determining timing events based on said time items;

creating a timeline comprising of said timing events and time items;

selecting an applicable scenario based on said timeline from a group of predetermined scenarios; and generating an output based on said applicable scenario.

14. The method of claim 13, wherein said time items further comprising a purchase order placement date, a replenish start date, a replenish need date, a maximum lateness, and a maximum earliness, wherein said purchase lead time is defined as amount of time needed to make available requested replenish material.

15. The method of claim 14, wherein said purchase order placement date is defined as the difference between said replenish need date and said purchase lead time.

16. The method of claim 14, wherein said time events comprising of a date as defined by the sum of purchase order placement date and maximum lateness.

17. The method of claim 14, wherein said time events comprising of a date as defined by the difference between said replenish need date minus maximum earliness.

18. The method of claim 14, wherein said time events comprising of a date as defined by the sum of said replenish need date and said maximum lateness.

19. The method of claim 14, wherein said time events comprising of a date as defined by the sum of said replenish start date and purchase lag time.

20. The method of claim 14, wherein said time events comprising of a date as defined by the difference between purchase order placement date minus maximum earliness.

21. The method of claim 14, wherein said time events comprising of dates as defined by the sum of purchase order placement date and maximum lateness, the difference between said replenish need date minus maximum earliness, the sum of said replenish need date and said maximum lateness, the sum of said replenish start date and purchase lag time, and the difference between purchase order placement date minus maximum earliness.

22. The method of claim 21, wherein said scenarios are based on sequencing of said timing items and time events.

23. The method of claim 22, wherein said scenarios are each associated with specific outputs.

24. The method of claim 13, wherein said outputs generated will be full replenishment is possible and on time, full replenishment is not possible on time, or replenishment is infeasible.

25. The method of claim 13, further comprising the step of creating a purchase model, wherein said purchase model is modeled by defining period maximums to restrict the amount of materials that a resource may produce over a time period.

26. A system for planning replenishment of a supply chain network resource by purchasing material in order to fulfill demand as defined by an order, said order defining a stock keeping unit with attribute, comprising:

a computer device;

a database in communication with said device;

a module for determining time items, wherein said time items are specific points in time or time periods relating to said order and at least one of said time items is a purchase lead time based on said stock keeping unit with attribute, and wherein said time items comprise a purchase order placement date, a replenish start date, a replenish need date, a maximum lateness, and a maximum earliness, wherein said purchase lead time is defined as amount of time needed to make available requested replenish material;

a module for determining timing events based on said time items;

a module for creating a timeline comprising of said timing events and time items; a module for selecting an applicable scenario based on said timeline from a group of predetermined scenarios;

and a module for generating an output based on said applicable scenario.

27. The system of claim 26, wherein said purchase order placement date is defined as the difference between said replenish need date and said purchase lead time.

28. The system of claim 26, wherein said time events comprising of a date as defined by the sum of purchase order placement date and maximum lateness.

29. The system of claim 26, wherein said time events comprising of a date as defined by the difference between said replenish need date minus maximum earliness.

30. The system of claim 26, wherein said time events comprising of a date as defined by the sum of said replenish need date and said maximum lateness.

31. The system of claim 26, wherein said time events comprising of a date as defined by the sum of said replenish start date and purchase lag time.

32. The system of claim 26, wherein said time events comprising of a date as defined by the difference between purchase order placement date minus maximum earliness.

33. The system of claim 26, wherein said time events further comprising of dates as defined by the sum of purchase order placement date and maximum lateness, the difference between said replenish need date minus maximum earliness, the sum of said replenish need date and said maximum lateness, the sum of said replenish start date and purchase lag time, and the difference between purchase order placement date minus maximum earliness.

34. The system of claim 33, wherein said scenarios are based on sequencing of said timing items and time events.

35. The system of claim 34, wherein said scenarios are each associated with specific outputs.

36. The system of claim 26, wherein said outputs generated will be full replenishment is possible and on time, full replenishment is not possible on time, or replenishment is infeasible.

37. The system of claim 26, further comprising a module for creating a purchase model, wherein said purchase model is modeled by defining period maximums to restrict the amount of materials that a resource may produce over a time period.

38. A program storage device readable by a machine, tangibly embodying a program of instructions executable by a machine to perform method steps of planning for the replenishment of supply chain network resources in order to fulfill demand as defined by one or more orders, wherein said one or more orders having attributes and each said orders defining a stock keeping unit with attribute, comprising the steps:

prioritizing said orders according to said order attributes;

selecting highest priority order;

selecting one of said resources for fulfilling said order;

replenishing said resources in order to completely fulfill said order, wherein said replenishment step further comprising the steps:

determining time items, wherein said time items are specific points in time or time periods relating to said order and wherein at least one of said time items is a purchase lead time based on said stock keeping unit with attribute;

determining timing events based on said time items;

creating a timeline comprising of said timing events and time items;

selecting an applicable scenario based on said timeline from a group of predetermined scenarios; and generating an output based on said applicable scenario.

39. The program storage device of claim 38, wherein said time items further comprising a purchase order placement date, a replenish start date, a replenish need date, a maximum lateness, and a maximum earliness, wherein said purchase lead time is defined as amount of time needed to make available requested replenish material.

40. The program storage device of claim 39, wherein said purchase order placement date is defined as the difference between said replenish need date and said purchase lead time.

41. The program storage device of claim 39, wherein said time events comprising of a date as defined by the sum of purchase order placement date and maximum lateness.

42. The program storage device of claim 39, wherein said time events comprising of a date as defined by the difference between said replenish need date minus maximum earliness.

43. The program storage device of claim 39, wherein said time events comprising of a date as defined by the sum of said replenish need date and said maximum lateness.

44. The program storage device of claim 39, wherein said time events comprising of a date as defined by the sum of said replenish start date and purchase lag time.

45. The program storage device of claim 39, wherein said time events comprising of a date as defined by the difference between purchase order placement date minus maximum earliness.

46. The program storage device of claim 39, wherein said time events comprising of dates as defined by the sum of purchase order placement date and maximum lateness, the difference between said replenish need date minus maximum earliness, the sum of said replenish need date and said maximum lateness, the sum of said replenish start date and purchase lag time, and the difference between purchase order placement date minus maximum earliness.

47. The program storage device of claim 46, wherein said scenarios are based on sequencing of said timing items and time events.

48. The program storage device of claim 47, wherein said scenarios are each associated with specific outputs.

49. The program storage device of claim 38, wherein said outputs generated will be full replenishment is possible and on time, full replenishment is not possible on time, or replenishment is infeasible.

50. The program storage device of claim 38, further comprising the step of creating a purchase model, wherein said purchase model is modeled by defining period maximums to restrict the amount of materials that a resource may produce over a time period.

* * * * *